US011610039B2

(12) United States Patent
Sloss et al.

(10) Patent No.: US 11,610,039 B2
(45) Date of Patent: Mar. 21, 2023

(54) CREATING AND/OR ENHANCING HARDWARE OBSCURITY VIA RANDOMIZATION POINTS

(71) Applicant: Arm Limited, Cambridge (GB)

(72) Inventors: Andrew Neil Sloss, Kirkland, WA (US); Christopher Neal Hinds, Austin, TX (US); Hannah Marie Peeler, Austin, TX (US); Gary Dale Carpenter, Austin, TX (US)

(73) Assignee: Arm Limited, Cambridge (GB)

( * ) Notice: Subject to any disclaimer, the term of this patent is extended or adjusted under 35 U.S.C. 154(b) by 230 days.

(21) Appl. No.: 16/836,859

(22) Filed: Mar. 31, 2020

(65) Prior Publication Data
US 2021/0303764 A1    Sep. 30, 2021

(51) Int. Cl.
*G06F 30/33*        (2020.01)
*G06F 21/62*        (2013.01)

(52) U.S. Cl.
CPC .......... *G06F 30/33* (2020.01); *G06F 21/6254* (2013.01)

(58) Field of Classification Search
CPC ...... G06F 30/33; G06F 21/6254; G06F 21/64; G06F 21/71
See application file for complete search history.

(56) References Cited

U.S. PATENT DOCUMENTS

| 11,017,140 | B1 | 5/2021 | Sloss et al. | |
| 2009/0271761 | A1* | 10/2009 | Reynolds | G06F 8/30 717/106 |
| 2014/0344569 | A1* | 11/2014 | Li | H04L 63/062 726/26 |
| 2020/0042662 | A1 | 2/2020 | Krieg et al. | |
| 2021/0303764 | A1 | 9/2021 | Sloss et al. | |

FOREIGN PATENT DOCUMENTS

| EP | 3382580 A1 * | 10/2018 | ..... G01R 31/318357 |
| EP | 3382580 A1 | 10/2018 | |

OTHER PUBLICATIONS

Michael Fenton et al., PonyGE2: grammatical evolution in Python, published on Jul. 15, 2017 https://dl.acm.org/doi/10.1145/3067695.3082469 (Year: 2017).*
Peter Adam, Introduction to PonyGE2 for Grammatical Evolution published on Jul. 5, 2017 https://towardsdatascience.com/introduction-to-ponyge2-for-grammatical-evolution-d51c29f2315a (Year: 2017).*

(Continued)

*Primary Examiner* — Carl G Colin
*Assistant Examiner* — Andrew Suh
(74) *Attorney, Agent, or Firm* — Berkeley Law & Technology Group, LLP

(57) ABSTRACT

Briefly, example methods, apparatuses, and/or articles of manufacture are disclosed that may be implemented, in whole or in part, using one or more computing devices to facilitate and/or support one or more operations and/or techniques for creating and/or enhancing hardware obscurity via one or more randomization points, such as implemented in connection with one or more computing and/or communication networks and/or protocols.

24 Claims, 24 Drawing Sheets

(56) References Cited

OTHER PUBLICATIONS

Notification of Transmittal of the International Search Report and the Written Opinion of the International Searching Authority, or Declaration, App. No. PCT/EP2021/025123, dated Jul. 6, 2021, 1 Page.
International Search Report, App. No. PCT/EP2021/025123, dated Jul. 6, 2021, 5 Pages.
Written Opinion of the International Searching Authority, App. No. PCT/EP2021/025123, dated Jul. 6, 2021, 14 Pages.
Poorghanad, et al, "Generating High Quality Pseudo Random Number Using Evolutionary Methods," DOI 10.1109/CIS.2008.220, IEEE, Dec. 13-17, 2008, https://ieeexplore.ieee.org/abstract/document/4724668, 5 Pages.
Fenton, "PonyGE2: Grammatical Evolution in Python," https://duckduckgo.com/?t=ffab&q=PonyGE2%3A+Grammatical+Evolution+in+Python%2C%22&atb=v262-1&ia=web, Jul. 15, 2017, 8 Pages.
Notification of Transmittal of the International Search Report and the Written Opinion of the International Searching Authority, or Declaration, App. No. PCT/EP2021/025119, dated Jul. 2, 2021, 1 Page.
International Search Report, App. No. PCT/EP2021/025119, dated Jul. 2, 2021, 5 Pages.
Written Opinion of the International Searching Authority, App. No. PCT/EP2021/025119, dated Jul. 2, 2021, 13 Pages.
Beaugnon, "Efficient code generation for hardware accelerators by refining partially specified implementation," https://tel.archives-ouvertes.fr/tel-02385303v2, Nov. 26, 2020, 129 Pages.
Office Action, U.S. Appl. No. 16/836,841, dated Jan. 27, 2022, 28 pages.
Response to Office Action, U.S. Appl. No. 16/836,841, filed Apr. 26, 2022, 14 pages.
Notice of Publication, U.S. Appl. No. 16/836,841, dated Sep. 30, 2021, 1 page.
Fenton, et al, "PonyGE2: Grammatical Evolution in Python," arXiv: 1703.08535, Apr. 2017, 13 pages.
Poorghanad, et al, "Generating high quality pseudo random number using evolutionary methods," DOI:10.1109/CIS.2008.220, SourceIEEE Xplore; Jan. 2009, 6 pages.
Office Action, U.S. Appl. No. 16/836,851, dated Oct. 5, 2020, 9 pages.
Response to Office Action, U.S. Appl. No. 16/836,851, filed Jan. 5, 2021, 31 pages.
Notice of Allowance, U.S. Appl. No. 16/836,851, dated Jan. 25, 2021, 5 pages.
Issue Fee as Filed U.S. Appl. No. 16/836,851, filed Apr. 26, 2021, 10 pages.
Notice of Allowance, U.S. Appl. No. 16/836,841, dated Aug. 25, 2022, 15 pages.
Issue Fee as Filed, U.S. Appl. No. 16/836,841, filed Nov. 21, 2022, 19 pages.
Corrected Notice of Allowability, U.S. Appl. No. 16/836,841, dated Nov. 30, 2022, 10 pages.
Issue Notification, U.S. Appl. No. 16/836,841, dated Dec. 21, 2022, 1 page.

\* cited by examiner

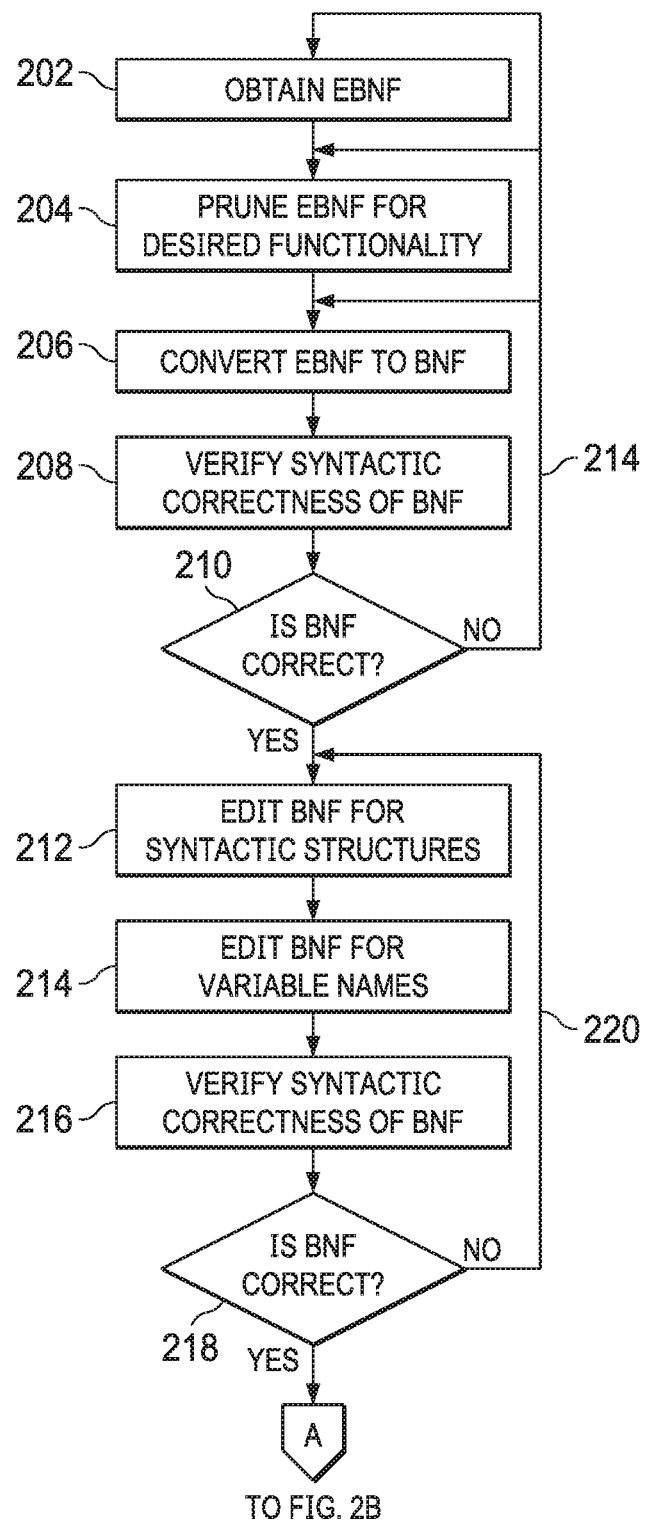

FIG. 11A

```
////////////////////////////////////////////////////////
// Description:
// A LFSR or Linear Feedback Shift Register is a quick and easy way to generate
// pseudo-random data inside of an FPGA.  The LFSR can be used for things like
// counters, test patterns, scrambling of data, and others. This module
// creates an LFSR whose width gets set by a parameter. The o_LFSR_Done will
// pulse once all combinations of the LFSR are complete.  The number of clock
// cycles that it takes o_LFSR_Done to pulse is equal to 2^g_Num_Bits-1.For
// example setting g_Num_Bits to 5 means that o_LFSR_Done will pulse every
// 2^5-1 = 31 clock cycles. o_LFSR_Data will change on each clock cycle that
// the module is enabled, which can be used if desired.
//
// Parameters:
// NUM_BITS - Set to the integer number of bits wide to create your LFSR.
////////////////////////////////////////////////////////
module LFSR #(parameter NUM_BITS)
 (
        input i_Clk,
        input i_Enable, // Optional Seed Value
        input i_Seed_DV,
        input [NUM_BITS-1:0] i_Seed_Data, output [NUM_BITS-1:0] o_LFSR_Data,
        output o_LFSR_Done
        );

reg [NUM_BITS:1] r_LFSR = 0;
  reg  r_XNOR;

// Purpose: Load up LFSR with Seed if Data Valid (DV) pulse is detected.
  // Othewise just run LFSR when enabled.
  always @(posedge i_Clk)
     begin
            if (i_Enable == 1'b1)
                begin
                    if (i_Seed_DV == 1'b1)
                        r_LFSR <= i_Seed_Data;
                    else
                        r_LFSR <= {r_LFSR[NUM_BITS-1:1], r_XNOR};
                end
     end // Create Feedback Polynomials.  Based on Application Note:
  // http://www.xilinx.com/support/documentation/application_notes/xapp052.pdf
  always @(*)
     begin
            case(NUM_BITS)
                3: begin
                    r_XNOR = r_LFSR[3] ^~ r_LFSR[2];
                end
```

```
4:  begin
        r_XNOR = r_LFSR[4] ^~ r_LFSR[3];
    end
5:  begin
        r_XNOR = r_LFSR[5] ^~ r_LFSR[3];
    end
6:  begin
        r_XNOR = r_LFSR[6] ^~ r_LFSR[5];
    end
7:  begin
        r_XNOR = r_LFSR[7] ^~ r_LFSR[6];
    end
8:  begin
        r_XNOR = r_LFSR[8] ^~ r_LFSR[6] ^~ r_LFSR[5] ^~ r_LFSR[4];
    end
9:  begin
        r_XNOR = r_LFSR[9] ^~ r_LFSR[5];
    end
10: begin
        r_XNOR = r_LFSR[10] ^~ r_LFSR[7];
    end
11: begin
        r_XNOR = r_LFSR[11] ^~ r_LFSR[9];
    end
12: begin
        r_XNOR = r_LFSR[12] ^~ r_LFSR[6] ^~ r_LFSR[4] ^~ r_LFSR[1];
    end
13: begin
        r_XNOR = r_LFSR[13] ^~ r_LFSR[4] ^~ r_LFSR[3] ^~ r_LFSR[1];
    end
14: begin
        r_XNOR = r_LFSR[14] ^~ r_LFSR[5] ^~ r_LFSR[3] ^~ r_LFSR[1];
    end
15: begin
        r_XNOR = r_LFSR[15] ^~ r_LFSR[14];
    end
16: begin
        r_XNOR = r_LFSR[16] ^~ r_LFSR[15] ^~ r_LFSR[13] ^~ r_LFSR[4];
    end
17: begin
        r_XNOR = r_LFSR[17] ^~ r_LFSR[14];
    end
18: begin
        r_XNOR = r_LFSR[18] ^~ r_LFSR[11];
    end
19: begin
        r_XNOR = r_LFSR[19] ^~ r_LFSR[6] ^~ r_LFSR[2] ^~ r_LFSR[1];
    end
```

```
          20: begin
                  r_XNOR = r_LFSR[20] ^~ r_LFSR[17];
              end
          21: begin                                              1100
                  r_XNOR = r_LFSR[21] ^~ r_LFSR[19];
              end
          22: begin
                  r_XNOR = r_LFSR[22] ^~ r_LFSR[21];
              end
          23: begin
                  r_XNOR = r_LFSR[23] ^~ r_LFSR[18];
              end
          24: begin
                  r_XNOR = r_LFSR[24] ^~ r_LFSR[23] ^~ r_LFSR[22] ^~ r_LFSR[17];
              end
          25: begin
                  r_XNOR = r_LFSR[25] ^~ r_LFSR[22];
              end
          26: begin
                  r_XNOR = r_LFSR[26] ^~ r_LFSR[6] ^~ r_LFSR[2] ^~ r_LFSR[1];
              end
          27: begin
                  r_XNOR = r_LFSR[27] ^~ r_LFSR[5] ^~ r_LFSR[2] ^~ r_LFSR[1];
              end
          28: begin
                  r_XNOR = r_LFSR[28] ^~ r_LFSR[25];
              end
          29: begin
                  r_XNOR = r_LFSR[29] ^~ r_LFSR[27];
              end
          30: begin
                  r_XNOR = r_LFSR[30] ^~ r_LFSR[6] ^~ r_LFSR[4] ^~ r_LFSR[1];
              end
          31: begin
                  r_XNOR = r_LFSR[31] ^~ r_LFSR[28];
              end
          32: begin
                  r_XNOR = r_LFSR[32] ^~ r_LFSR[22] ^~ r_LFSR[2] ^~ r_LFSR[1];
              end
        endcase // case (NUM_BITS)
    end // always @ (*)

assign o_LFSR_Data = r_LFSR[NUM_BITS:1];

// Conditional Assignment (?)
    assign o_LFSR_Done = (r_LFSR[NUM_BITS:1] == i_Seed_Data) ? 1'b1 : 1'b0;

endmodule // LFSR
```

```
module LFSR #(parameter fheiw47324d)
(
    input huinl,
    input yrwgaav, input hufbrk,
    input [fheiw47324d-1:0] fds372371, output [fheiw47324d-1:0] bhudaipfe,
    output tyruejw
);
reg [fheiw47324d:1] duir654nejq2 = 0;
reg  gdsewfeqfsa;

always @(posedge huinl)
        begin
            if (yrwgaav == 1'b1)
                begin
                    if (hufbrk == 1'b1)
                        duir654nejq2 <= fds372371;
                    else
                        duir654nejq2 <= {duir654nejq2[fheiw47324d-1:1], gdsewfeqfsa};
                end
        end
    always@(*)
        begin
            case (fheiw47324d)
                3: begin
                    gdsewfeqfsa = duir654nejq2[3] ^~ duir654nejq2[2];
                end
                4: begin
                    gdsewfeqfsa = duir654nejq2[4] ^~ duir654nejq2[3];
                end
                5: begin
                    gdsewfeqfsa = duir654nejq2[5] ^~ duir654nejq2[3];
                end
                6: begin
                    gdsewfeqfsa = duir654nejq2[6] ^~ duir654nejq2[5];
                end
                7: begin
                    gdsewfeqfsa = duir654nejq2[7] ^~ duir654nejq2[6];
                end
                8: begin
                    gdsewfeqfsa = duir654nejq2[8] ^~ duir654nejq2[6] ^~ duir654nejq2[5] ^~ duir654nejq2[4];
                end
                9: begin
                    gdsewfeqfsa = duir654nejq2[9] ^~ duir654nejq2[5];
                end
                10: begin
                    gdsewfeqfsa = duir654nejq2[10] ^~ duir654nejq2[7];
                end
```

```
11: begin
        gdsewfeqfsa = duir654nejq2[11] ^~ duir654nejq2[9];
    end
12: begin
        gdsewfeqfsa = duir654nejq2[12] ^~ duir654nejq2[6] ^~ duir654nejq2[4] ^~ duir654nejq2[1];
    end
13: begin
        gdsewfeqfsa = duir654nejq2[13] ^~ duir654nejq2[4] ^~ duir654nejq2[3] ^~ duir654nejq2[1];
    end
14: begin
        gdsewfeqfsa = duir654nejq2[14] ^~ duir654nejq2[5] ^~ duir654nejq2[3] ^~ duir654nejq2[1];
    end
15: begin
        gdsewfeqfsa = duir654nejq2[15] ^~ duir654nejq2[14];
    end
16: begin
        gdsewfeqfsa = duir654nejq2[16] ^~ duir654nejq2[15] ^~ duir654nejq2[13] ^~ duir654nejq2[4];
    end
17: begin
        gdsewfeqfsa = duir654nejq2[17] ^~ duir654nejq2[14];
    end
18: begin
        gdsewfeqfsa = duir654nejq2[18] ^~ duir654nejq2[11];
    end
19: begin
        gdsewfeqfsa = duir654nejq2[19] ^~ duir654nejq2[6] ^~ duir654nejq2[2] ^~ duir654nejq2[1];
    end
20: begin
        gdsewfeqfsa = duir654nejq2[20] ^~ duir654nejq2[17];
    end
21: begin
        gdsewfeqfsa = duir654nejq2[21] ^~ duir654nejq2[19];
    end
22: begin
        gdsewfeqfsa = duir654nejq2[22] ^~ duir654nejq2[21];
    end
23: begin
        gdsewfeqfsa = duir654nejq2[23] ^~ duir654nejq2[18];
    end
24: begin
        gdsewfeqfsa = duir654nejq2[24] ^~ duir654nejq2[23] ^~ duir654nejq2[22] ^~ duir654nejq2[17];
    end
```

```
            25: begin
                    gdsewfeqfsa = duir654nejq2[25] ^~ duir654nejq2[22];
                end
            26: begin
                    gdsewfeqfsa = duir654nejq2[26] ^~ duir654nejq2[6] ^~ duir654nejq2[2] ^~ duir654nejq2[1];
                end 27: begin
                    gdsewfeqfsa = duir654nejq2[27] ^~ duir654nejq2[5] ^~ duir654nejq2[2] ^~ duir654nejq2[1];
                end
            28: begin
                    gdsewfeqfsa = duir654nejq2[28] ^~ duir654nejq2[25];
                end
            29: begin
                    gdsewfeqfsa = duir654nejq2[29] ^~ duir654nejq2[27];
                end
            30: begin
                    gdsewfeqfsa = duir654nejq2[30] ^~ duir654nejq2[6] ^~ duir654nejq2[4] ^~ duir654nejq2[1];
                end
            31: begin
                    gdsewfeqfsa = duir654nejq2[31] ^~ duir654nejq2[28];
                end
            32: begin
                    gdsewfeqfsa = duir654nejq2[32] ^~ duir654nejq2[22] ^~ duir654nejq2[2] ^~ duir654nejq2[1];
                end
            endcase
        end assign bhudaipfe = duir654nejq2[fheiw47324d:1];
    assign tyruejw = (duir654nejq2[fheiw47324d:1] == fds372371) ? 1'b1: 1'b0;
endmodule
```

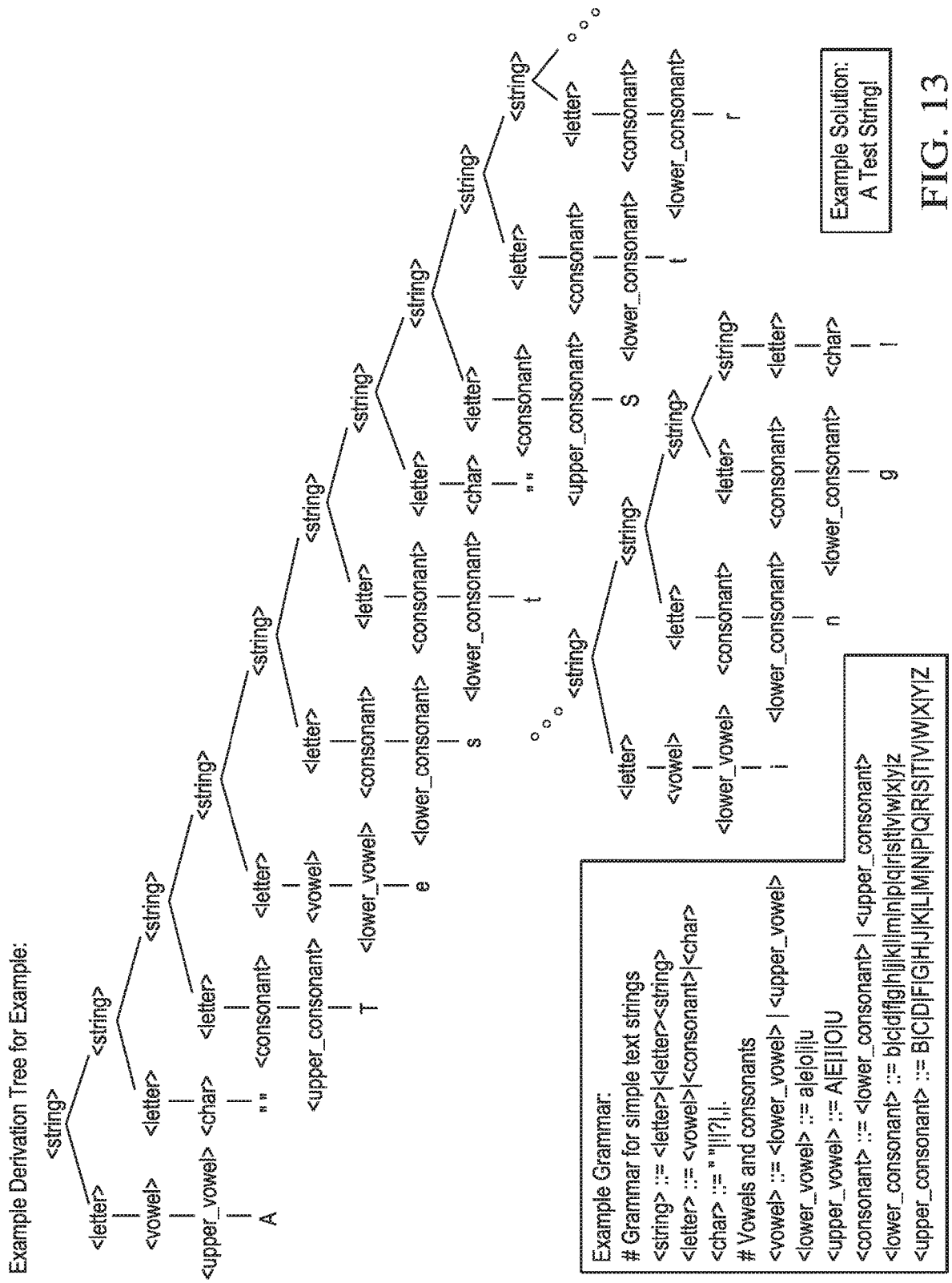

FIG. 14A

```
always @(*)
    begin
        case (NUM_BITS)                                              1400
        3: begin
                r_XNOR = r_LFSR[3] ^~ r_LFSR[2];
            end
        4: begin
                r_XNOR = r_LFSR[4] ^~ r_LFSR[3];
            end
        5: begin
                r_XNOR = r_LFSR[5] ^~ r_LFSR[3];
            end
        6: begin
                r_XNOR = r_LFSR[6] ^~ r_LFSR[5];
            end
        7: begin
                r_XNOR = r_LFSR[7] ^~ r_LFSR[6];
            end
        8: begin
                r_XNOR = r_LFSR[8] ^~ r_LFSR[6] ^~ r_LFSR[5] ^~ r_LFSR[4];
            end
        9: begin
                r_XNOR = r_LFSR[9] ^~ r_LFSR[5];
            end
        10: begin
                r_XNOR = r_LFSR[10] ^~ r_LFSR[7];
            end
        11: begin
                r_XNOR = r_LFSR[11] ^~ r_LFSR[9];
            end
        12: begin
                r_XNOR = r_LFSR[12] ^~ r_LFSR[6] ^~ r_LFSR[4] ^~ r_LFSR[1];
            end
        13: begin
                r_XNOR = r_LFSR[13] ^~ r_LFSR[4] ^~ r_LFSR[3] ^~ r_LFSR[1];
            end
        14: begin
                r_XNOR = r_LFSR[14] ^~ r_LFSR[5] ^~ r_LFSR[3] ^~ r_LFSR[1];
            end
        15: begin
                r_XNOR = r_LFSR[15] ^~ r_LFSR[14];
            end
        16: begin
                r_XNOR = r_LFSR[16] ^~ r_LFSR[15] ^~ r_LFSR[13] ^~ r_LFSR[4];
            end
        17: begin
                r_XNOR = r_LFSR[17] ^~ r_LFSR[14];
            end
        18: begin
                r_XNOR = r_LFSR[18] ^~ r_LFSR[11];
            end
```

FIG. 14B

```
        19: begin
                r_XNOR = r_LFSR[19] ^~ r_LFSR[6] ^~ r_LFSR[2] ^~ r_LFSR[1];
        end
        20: begin                                                              1400
                r_XNOR = r_LFSR[20] ^~ r_LFSR[17];
        end
        21: begin
                r_XNOR = r_LFSR[21] ^~ r_LFSR[19];
        end
        22: begin
                r_XNOR = r_LFSR[22] ^~ r_LFSR[21];
        end
        23: begin
                r_XNOR = r_LFSR[23] ^~ r_LFSR[18];
        end
        24: begin
                r_XNOR = r_LFSR[24] ^~ r_LFSR[23] ^~ r_LFSR[22] ^~ r_LFSR[17];
        end
        25: begin
                r_XNOR = r_LFSR[25] ^~ r_LFSR[22];
        end
        26: begin
                r_XNOR = r_LFSR[26] ^~ r_LFSR[6] ^~ r_LFSR[2] ^~ r_LFSR[1];
        end
        27: begin
                r_XNOR = r_LFSR[27] ^~ r_LFSR[5] ^~ r_LFSR[2] ^~ r_LFSR[1];
        end
        28: begin
                r_XNOR = r_LFSR[28] ^~ r_LFSR[25];
        end
        29: begin
                r_XNOR = r_LFSR[29] ^~ r_LFSR[27];
        end
        30: begin
                r_XNOR = r_LFSR[30] ^~ r_LFSR[6] ^~ r_LFSR[4] ^~ r_LFSR[1];
        end
        31: begin
                r_XNOR = r_LFSR[31] ^~ r_LFSR[28];
        end
        32: begin
                r_XNOR = r_LFSR[32] ^~ r_LFSR[22] ^~ r_LFSR[2] ^~ r_LFSR[1];
        end
        endcase // case (NUM_BITS)
    end // always @ (*)
```

```
base = []

print('Entering top loop (i)')
# Run evolution 50 times, getting 20 individuals each time and evaluating each individual 10 times
for i in range(8):

individuals = params['SEARCH_LOOP']()
    run_count = run_count + 1
    ind_count = 0 print('Entering loop to go through individuals in run', run_count)
    #for ind in individuals:
    for i in range(1):
        ind_count = ind_count + 1;
        ind = individuals[0]
        # ready r_LFSR for alteration
        r_LFSR = []
        del r_LFSR[:]

for j in range(8):
            r_LFSR.append(bool(getrandbits(1)))

# print initial
        for q in r_LFSR:
            print(int(q), end = ' ')
        print()

for p in range(500):
            num_count = num_count + 1
            print('Loop', p, 'for individual', ind_count, 'in run', run_count)

# ind.phenotype will be a string, including function definitions etc.
            # When we exec it, it will create a value XXX_output_XXX, but we exec
```

```
# inside an empty dict for safety.
p = ind.phenotype
d = locals()

# Exec the phenotype.
exec(p, d)

# Get the output
s = d['XXX_output_XXX']  # this is the program's output: a number, either 1 or 0.

# augment the 1 and 0 counters
if (s == 1):
        count_ones = count_ones + 1
else:
        count_zeroes = count_zeroes + 1 add values to plot
num.append(num_count)
percent.append(round(((count_ones / (count_zeroes + count_ones)) * 100), 2))
base.append(50.0)

# edit the actual r_LFSR value and print to screen
r_LFSR = roll(r_LFSR, -1)
r_LFSR[-1] = s for p in r_LFSR:
        print(int(p), end = ' ')
print()

print('Number of zeroes so far:', count_zeroes)
print('Number of ones so far:', count_ones)

# Print outcomes of number of zeroes and ones
```

```
    print('Number of zeroes in total:', count_zeroes)
    print('Number of ones in total:', count_ones)

print()

plot_items = [num, percent, base]
    return plot_items if __name__ == "__main__":
    set_params(sys.argv[1:])  # exclude the ponyge.py arg itself
    plot_items = top()

#print('num:', plot_items[0])
    #print('percent:', plot_items[1])
    #print('base:', plot_items[2])

plt.plot(plot_items[0], plot_items[1], label='actual')
    plt.plot(plot_items[0], plot_items[2], linestyle='--', color='r', label='ideal')

plt.xlabel('# of Runs')
    plt.ylabel("Percentage of 1's out of total numbers")
    plt.title('Percentage of Random Numbers')

#plt.ylim([min(plot_items[1]) - 0.5, max(plot_items[1]) + 0.5])
    plt.ylim([40.0, 60.0])

plt.legend()
    plt.show()
```

CACHE: True
CODON_SIZE: 100000
CORES: 4
CROSSOVER: variable_onepoint
CROSSOVER_PROBABILITY: 0.75
DATASET_DELIMITER: None
DATASET_TEST: None
DATASET_TRAIN: Vladislavleva4/Train.txt
DEBUG: False
ELITE_SIZE: 0
ERROR_METRIC: None
EXPERIMENT_NAME: None
FITNESS_FUNCTION: verilog
GENERATIONS: 20
GENERATION_SIZE: 50
GRAMMAR_FILE: verilog_bnfs\case_statement_v4.pybnf
HILL_CLIMBING_HISTORY: 1000
INITIALISATION: PI_grow
INIT_GENOME_LENGTH: 500
INTERACTION_PROBABILITY: 0.5
INVALID_SELECTION: True
LOAD_STATE: None
LOOKUP_BAD_FITNESS: False
LOOKUP_FITNESS: False
MAX_GENOME_LENGTH: 500
MAX_INIT_TREE_DEPTH: 15
MAX_TREE_DEPTH: 17
MAX_TREE_NODES: None
MAX_WRAPS: 0
MIN_INIT_TREE_DEPTH: None MULTIAGENT: False
MULTICORE: False
MUTATE_DUPLICATES: False
MUTATION: int_flip_per_codon
MUTATION_EVENTS: 1
MUTATION_PROBABILITY: None
NO_CROSSOVER_INVALIDS: False
NO_MUTATION_INVALIDS: False
OPTIMIZE_CONSTANTS: False
PERMUTATION_RAMPS: 5
POPULATION_SIZE: 50
REPLACEMENT: generational
REVERSE_MAPPING_TARGET: None
RUNS: 1
SAVE_ALL: True
SAVE_PLOTS: True
SAVE_STATE: True
SAVE_STATE_STEP: 2
SCHC_COUNT_METHOD: count_all
SEARCH_LOOP: search_loop
SEED_INDIVIDUALS: []
SELECTION: tournament
SELECTION_PROPORTION: 0.5
SILENT: False
STEP: step
TARGET: ponyge_rocks
TARGET_SEED_FOLDER: None
TOURNAMENT_SIZE: 2
VERBOSE: False
WITHIN_USED: True

CREATING AND/OR ENHANCING HARDWARE OBSCURITY VIA RANDOMIZATION POINTS

RELATED APPLICATIONS

This patent application is related to U.S. Ser. No. 16/836,841 entitled "AUTONOMOUS PSEUDO-RANDOM SEED GENERATOR FOR COMPUTING DEVICES" and U.S. Ser. No. 16/836,851 entitled "AUTONOMOUS VERIFICATION OF CIRCUIT DESIGN FOR COMPUTING DEVICES," all filed concurrently herewith, and all hereby expressly incorporated by reference in their entirety.

BACKGROUND

1. Field

The present disclosure relates generally to embedded computing devices, such as, for example, Internet of Things (IoT)-type devices and, more particularly, to creating and/or enhancing hardware obscurity via one or more randomization points for use in and/or with embedded computing devices, which may include, for example, IoT-type devices operating in resource constrained or like environments.

2. Information

The Internet is widespread. The World Wide Web or simply the Web, provided by the Internet, is growing rapidly, at least in part, from the large amount of content being added seemingly on a daily basis. A wide variety of content in the form of stored signals, such as, for example, text files, images, audio files, video files, web pages, measurements of physical phenomena, or the like is continually being acquired, identified, located, retrieved, collected, stored, communicated, etc. Increasingly, content is being acquired, collected, communicated, etc. by a number of embedded computing devices leveraging existing Internet or like infrastructure as part of the so-called "Internet of Things" or IoT, such as via a variety of protocols, domains, and/or applications. The IoT is typically a system of interconnected and/or internetworked physical computing devices capable of being identified, such as uniquely via an assigned Internet Protocol (IP) address, for example, and in which computing is embedded into hardware so as to facilitate and/or support devices' ability to acquire, collect, and/or transmit content over one or more communications networks. IoT-type devices may comprise a wide variety of embedded devices, such as, for example, automobile sensors, biochip transponders, heart monitoring implants, thermostats, kitchen appliances, locks or like fastening devices, solar panel arrays, home gateways, controllers, or the like.

In some instances, the nature of IoT-type devices, such as by virtue of having an embedded computing and/or communication capability, which may include a capability to automatically access the Internet, for example, may make the IoT-type devices vulnerable. For example, at times, IoT-type devices may be prone to hacking, nefarious log-in exploits, or like security risks that may give on-line attackers access to and/or control of the devices and, as a consequence, compromise associated services, systems, networks, infrastructures, or the like. However, in some instances, more traditional security measures, such as anti-virus, malware, or like defenses, for example, may not be suitable for and/or applicable to IoT-type devices. For example, in contrast to more advanced computing platforms with more sophisticated anti-virus, malware, or like defenses, many IoT-type devices may comprise peripheral or end-point and/or resource-constrained embedded devices that utilize lower-cost hardware and/or software solutions lacking computing and/or processing power to run a sufficient security software. In addition, a vulnerability of IoT-type devices may include a design pattern that may be indicative of their expected functionality and/or behavior and, as such, may be more easily understood by a malicious party, thus, making these devices more prone to tampering and/or manipulation. Thus, how to create and/or enhance security of IoT-type devices, including those operating in resource constrained or like environments, for example, continues to be an area of development.

BRIEF DESCRIPTION OF THE DRAWINGS

Claimed subject matter is particularly pointed out and distinctly claimed in the concluding portion of the specification. However, both as to organization and/or method of operation, together with objects, features, and/or advantages thereof, it may best be understood by reference to the following detailed description if read with the accompanying drawings in which:

FIGS. 2A-2B is a flow diagram illustrating an implementation of an example process for creating and/or enhancing hardware obscurity via one or more randomization points.

FIGS. 11A-11C illustrate an implementation of an example syntactically correct LFSR-tailored Verilog code with typical coding conventions.

FIGS. 12A-12C illustrate an implementation of an example randomized Verilog code.

FIG. 13 illustrates an implementation of an example grammar, example solution, and example derivation tree.

FIGS. 14A-14B illustrate an implementation of example syntactically correct LFSR-tailored Verilog code.

FIGS. 15A-15D illustrate an implementation of an example fitness function.

FIG. 16 illustrate an implementation of example evolutionary criteria.

Figure 1:
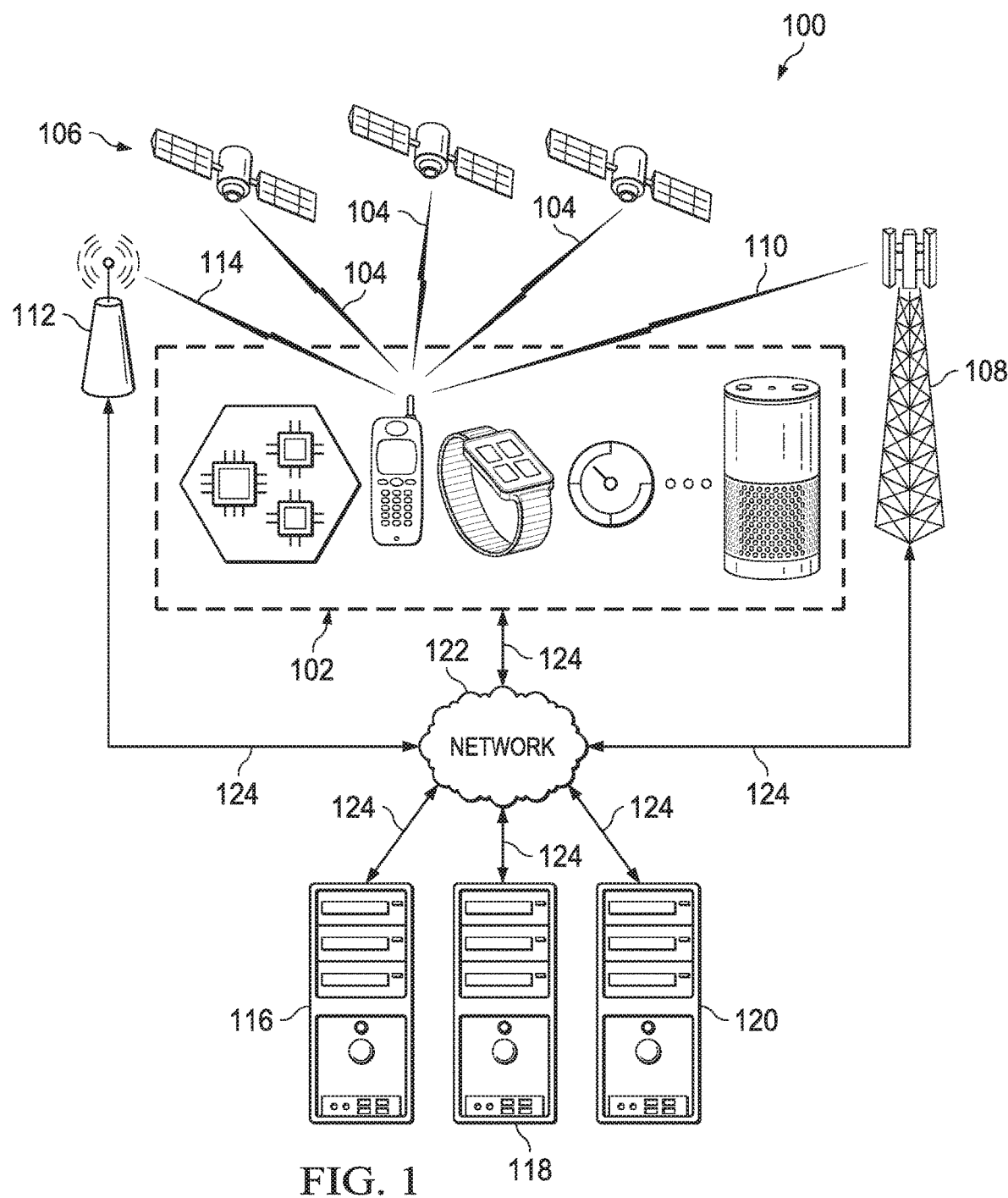
FIG. 1 is a schematic diagram illustrating features associated with an implementation of an example operating environment for creating and/or enhancing hardware obscurity via randomization points.

Reference is made in the following detailed description to accompanying drawings, which form a part hereof, wherein like numerals may designate like parts throughout that are corresponding and/or analogous. It will be appreciated that the figures have not necessarily been drawn to scale, such as for simplicity and/or clarity of illustration. For example, dimensions of some aspects may be exaggerated relative to others, one or more aspects, properties, etc. may be omitted, such as for ease of discussion, or the like. Further, it is to be understood that other embodiments may be utilized. Furthermore, structural and/or other changes may be made without departing from claimed subject matter. References throughout this specification to "claimed subject matter" refer to subject matter intended to be covered by one or more claims, or any portion thereof, and are not necessarily intended to refer to a complete claim set, to a particular combination of claim sets (e.g., method claims, apparatus claims, etc.), or to a particular claim. It should also be noted that directions and/or references, for example, such as up, down, top, bottom, and so on, may be used to facilitate discussion of drawings and are not intended to restrict application of claimed subject matter. Therefore, the following detailed description is not to be taken to limit claimed subject matter and/or equivalents.

DETAILED DESCRIPTION

References throughout this specification to one implementation, an implementation, one embodiment, an embodiment, and/or the like means that a particular feature, structure, characteristic, and/or the like described in relation to a particular implementation and/or embodiment is included in at least one implementation and/or embodiment of claimed subject matter. Thus, appearances of such phrases, for example, in various places throughout this specification are not necessarily intended to refer to the same implementation and/or embodiment or to any one particular implementation and/or embodiment. Furthermore, it is to be understood that particular features, structures, characteristics, and/or the like described are capable of being combined in various ways in one or more implementations and/or embodiments and, therefore, are within intended claim scope. In general, of course, as has always been the case for the specification of a patent application, these and other issues have a potential to vary in a particular context of usage. In other words, throughout the disclosure, particular context of description and/or usage provides helpful guidance regarding reasonable inferences to be drawn; however, likewise, "in this context" in general without further qualification refers at least to the context of the present patent application.

Some example methods, apparatuses, and/or articles of manufacture are disclosed herein that may be used, in whole or in part, to facilitate and/or support one or more operations and/or techniques for creating and/or enhancing hardware obscurity via one or more randomization points, such as implemented in connection with one or more computing and/or communication networks and/or protocols (e.g., network protocols) discussed herein, for example. As discussed below, in some instances, these or like one or more operations and/or techniques may be implemented, in whole or in part, to facilitate and/or support one or more approaches for a more secure deployment and/or operation of embedded computing devices including, for example, IoT-type devices operating in resource constrained or like environments. As will be seen, at times, these or like one or more operations and/or techniques may include, for example, creating and/or introducing randomness into hardware solutions, such as via grammatically evolving particular domain knowledge so as to generate a suitable or sufficient number of these or like hardware solutions with an appropriate or otherwise suitable distribution of randomness. As will also be seen, in some instances, these or like one or more operations and/or techniques may also include enhancing and/or injecting obscurity into these or like hardware solutions, such as via one or more specific and/or tailored randomization approaches capable of introducing more randomness into particular places within the solutions, for example, thus, making the solutions more difficult to exploit by a malicious party.

As will also be seen, in some instances, these or like hardware solutions may comprise, for example, linear feedback shift registers (LFSRs) that may be incorporated into an appropriate number of IoT-type devices and capable of creating sufficient or otherwise suitable distribution randomness in these devices, such as via generating start state initialization numbers and/or continually evolving a unique open-ended fixed instruction sequence. For purposes of explanation, typically, an LFSR may comprise a digital logic circuit, such as a sequential bi-stable logic circuit, just to illustrate one particular example, capable of storing and/or transferring (e.g., shifting, etc.) applicable digital signal values and whose at least one input value comprises a linear function of its previous state. As also discussed below, at times, particular domain knowledge may, for example, be represented via a subset of a grammar comprising an applicable computer programming language, such as via computer-readable code or instructions that perform a specific task. As will also be seen, in at least one implementation, a particular computer programming language, such as a hardware description language (HDL), such as Verilog, for example, may be utilized herein, in whole or in part, or otherwise considered. As such, here, a "computer programming language" should be interpreted broadly, such as represented via computer-readable code or instructions capable of being executed via a number of sequential and/or parallel operations. Thus, here, one or more lines of code may be executed one at a time, such as following a top-to-bottom organization, for example, and/or in parallel, such as to facilitate and/or support a simultaneous operation of separate portions of digital hardware, if appropriate or applicable, despite corresponding lines of code being written using a top-to-bottom organization. Particular examples of IoT-type devices, LFSRs, applicable computer programming language, etc. will be discussed in greater detail below.

"Electronic content," as the term used herein, should be interpreted broadly and refers to signals, such signal packets, for example, and/or states, such as physical states on a memory device, for example, but otherwise is employed in a manner irrespective of format, such as via any expression, representation, realization, and/or communication, for example. Content may comprise, for example, any information, knowledge, and/or experience, such as, again, in the form of signals and/or states, physical or otherwise. In this context, "electronic" or "on-line" content refers to content in a form that although not necessarily capable of being perceived by a human, (e.g., via human senses, etc.) may nonetheless be transformed into a form capable of being so perceived, such as visually, haptically, and/or audibly, for example. Non-limiting examples may include text, audio, images, video, security parameters, combinations, or the like. Thus, content may be stored and/or transmitted electronically, such as before or after being perceived by human senses. In general, it may be understood that electronic content may be intended to be referenced in a particular discussion, although in the particular context, the term "content" may be employed for ease of discussion. Specific examples of content may include, for example, computer code, metadata, message, text, audio file, video file, data file, web page, or the like. Claimed subject matter is not intended to be limited to these particular examples, of course.

As alluded to previously, at times, securing and/or maintaining IoT-type devices may, for example, present a number of challenges, which may be due, at least in part, to the devices' inherent ability to automatically access and/or communicate on a network, such as the Internet, as one possible example. Typically, although not necessarily, in contrast to more advanced computing platforms with more sophisticated anti-virus, malware, or like security mechanisms or defenses, many IoT-type devices may comprise, for example, resource constrained edge or peripheral embedded devices that utilize hardware and/or software solutions lacking computing and/or processing power to run a security software, implement secure updates and/or communication, or the like. As such, in some instances, IoT-type devices may be vulnerable to, for example, brute-force attacks and/or other nefarious on-line attacks, log-in exploits, etc. that may give on-line attackers access to and/or control of these devices and, as a consequence, compromise associated services, systems, networks, infrastructures, or the like.

In some instances, to address these or like challenges, one or more security approaches may be utilized. For example, since IoT-type devices typically utilize Internet or like network communications exchange protocols (e.g., SSL/TLS, SSH, IKE, etc.), at times, more secure operation of such devices may depend, at least in part, on cryptographic or like security features, such as in the form of pseudo-random number generators (PRNGs). As a way of illustration, in some instances, PRNGs may, for example, be capable of mitigating a threat of unauthorized device intrusions, such as via introducing randomness into one or more associated security parameters. By way of explanation, typically, a PRNG comprises a computing device and/or process capable of generating a sequence of numbers whose properties approximate one or more properties of sequences of random numbers. A PRNG is typically initialized via a special random input value, called a "seed," which is generated by some source of randomness that may comprise an IoT-type device. Such a seed may determine and/or facilitate an output of a random sequence by a PRNG, which may be used, in whole or in part, to protect confidentiality and/or integrity of an IoT-type device and/or electronic content, implement more secure network communications, updates and/or other appropriate and/or applicable operations, or the like. As such, at times, a security of a PRNG and, thus, of an associated IoT-type device may, for example, depend, in whole or in part, on randomness of a seed. Thus, in some instances, it may, for example, be useful for more secure operation of IoT-type devices to employ an appropriate or otherwise suitable source of randomness.

At times, however, determining and/or employing an appropriate or otherwise suitable source of randomness, such as for outputting a random seed value, for example, may present challenges. To illustrate, since real-time clocks (RTCs) are typically, although not necessarily, run with a fixed frequency, certain IoT-type devices, such as those employing an RTC as a source of randomness to produce a seed, for example, may be prone or otherwise susceptible to generating readable and/or predictable pseudo-random patterns and, as such, may deliver a discoverable output. Also, in some instances, RTCs may not be available for certain IoT-type devices, for example, and, if present, may be operationally expensive, less than sufficient or suitable to properly initialize a PRNG due, at least in part, to hardware and/or environmental limitations inherent to IoT-type devices, or the like. In addition, at times, vulnerability of an IoT-type device may include or be manifested via a design pattern that may be indicative of an expected functionality of one or more associated solutions and, as such, may be more easily processed, followed, understood, etc. by a malicious party, thus, making these or like devices more prone to tampering and/or manipulation. For example, a particular hardware design, IoT-related or otherwise, may follow a standard and/or typical well-documented, well-defined, well-formed, etc. design pattern and, as such, may reveal specific knowledge to a malicious party, such as with respect to one or more associated functionalities, cryptographic or like security features, or the like. As such, even though a well-documented, well-defined, well-formed, etc. design pattern may be referenced so as to furnish useful knowledge to an innocent party, for example, in some instances, such a standard and/or typical design pattern may, however, be more easily exploited by a malicious party and, thus, may create security issues and/or problems. Accordingly, it may be desirable to develop one or more methods, systems, and/or apparatuses that may facilitate and/or support randomness in a number of hardware solutions, such as via producing an appropriate seed value without reliance on an RTC, for example, and/or injecting obscurity into these or like hardware solutions, such as via one or more specific and/or tailored randomization approaches capable of precluding or reducing readable and/or predictable design patterns.

Thus, as will be described in greater detail below, in an implementation, an extended Backus-Naur form (EBNF) representation of a particular HDL grammar, such as a Verilog grammar, for example, may be electronically obtained and subsequently pruned, such as for a suitable functionality, which may include an LFSR functionality. To facilitate and/or support more effective and/or more efficient processing, at times, a pruned EBNF grammar may be converted to a Backus-Naur form (BNF), for example, and used, at least in part, as input to a suitable grammatical evolution tool, such as PonyGE2, just to illustrate one particular example. As will also be seen, in some instances, one or more evolutionary criteria may be defined and used, at least in part, in connection with one or more PonyGE2 runs, such as to incorporate and/or grammatically evolve appropriate knowledge via a genotype encouraging a suitable and/or sufficient variety of patterns of behavior inherent to LFSRs, for example. In addition, at times, a particular syntactical structure and/or variable naming may be built into a BNF grammar, such as also in connection with one or more PonyGE2 runs, for example, so as to generate or produce a genetic representation of a particular phenotype, such as a final solution comprising LSFR-tailored grammar rules in a particular hierarchy, as also described below. In certain implementations, these or like LFSRs may be part of one or more SoC design flows, for example, so as to comprise one or more PRNGs substantially corresponding to a suitable or desirable number of IoT-type devices, as was indicated.

Thus, PRNGs may, for example, be capable of facilitating a predetermined variation of starting states across these or like IoT-type devices, such as via generating and/or providing seeds for start-state initialization numbers capable of introducing appropriate or otherwise suitable distribution of randomness, as will also be seen. In operative use, an instruction sequence may take input from an PRNG portion of an LFSR, for example, and may run through a random sequence to produce a seed, which may then be placed into a pseudo-random generator initialization function of an IoT-type device, such as part of one or more SoC design flows. In some instances, an instruction sequence may also be continually evolved, such as via one or more linear genetic programming approaches, for example, so as to generate a new or different seed value once a random input is called (e.g., every time a random input is called, etc.). In addition, removal of an RTC may, for example, save computing and/or processing power, which may be beneficial at an IoT scale, as was also indicated. As will be seen, at times, a particular hierarchy comprising a grammar-based genetic representation of a final solution generated via a grammatical evolution process may, for example, be leveraged so as to determine or identify particular places within the solution, such as represented via one or more randomization points. As will also be seen, these one or more randomization points may, for example, be used, in whole or in part, to enhance and/or inject obscurity into a final solution, thus, making the solution more difficult to exploit by a malicious party. Namely, as discussed in greater detail below, in some instances, one or more randomization operations may, for example, be performed so as to transform one or more hardware solutions into a design pattern having one or more obfuscated portions based, at least in part, on such a hierarchy, such as to at least partially obscure a target functionality of these or like one or more hardware solutions. Again, particular examples of an EBNF, BNF, LFSR, PonyGE2 runs, genotype, phenotype, randomization points, benefits, hierarchy, etc. will be discussed in greater detail below.

FIG. 1 is a schematic diagram illustrating features associated with an implementation of an example operating environment 100 capable of facilitating and/or supporting one or more operations and/or techniques for creating and/or enhancing hardware obscurity via one or more randomization points, such as for use in and/or with embedded computing devices, which may include, for example, IoT-type devices, illustrated generally herein at 102. In this context, "IoT-type devices" refer to one or more electronic or computing devices capable of leveraging existing Internet or like infrastructure as part of the so-called "Internet of Things" or IoT, such as via a variety of applicable protocols, domains, applications, etc. As was indicated, the IoT is typically a system of interconnected and/or internetworked physical devices in which computing is embedded into hardware so as to facilitate and/or support devices' ability to acquire, collect, and/or communicate content over one or more communications networks, for example, at times, without human participation and/or interaction. IoT-type devices may include a wide variety of stationary and/or mobile devices, such as, for example, automobile sensors, biochip transponders, heart monitoring implants, kitchen appliances, locks or like fastening devices, solar panel arrays, home gateways, smart gauges, smart telephones, cellular telephones, security cameras, wearable devices, thermostats, Global Positioning System (GPS) transceivers, personal digital assistants (PDAs), virtual assistants, laptop computers, personal entertainment systems, tablet personal computers (PCs), PCs, personal audio or video devices, personal navigation devices, or the like. Typically, in this context, a "mobile device" refers to an electronic or computing device that may from time to time have a position or location that changes, and a stationary device refers to an electronic or computing device that may have a position or location that generally does not change. In some instances, IoT-type devices may be capable of being identified, such as uniquely, via an assigned Internet Protocol (IP) address, as one particular example, and/or having a capability to communicate electronically, such as receive and/or transmit electronic content, for example, over one or more wired and/or wireless communications networks.

It should be appreciated that operating environment 100 is described herein as a non-limiting example that may be implemented, in whole or in part, in the context of various wired or wireless communications networks, or any suitable portion and/or combination of such networks. For example, these or like networks may include one or more public networks (e.g., the Internet, the World Wide Web), private networks (e.g., intranets), wireless wide area networks (WWAN), wireless local area networks (WLAN, etc.), wireless personal area networks (WPAN), telephone networks, cable television networks, Internet access networks, fiber-optic communication networks, waveguide communication networks, or the like. It should also be noted that claimed subject matter is not limited to a particular network and/or operating environment. Thus, depending on an implementation, one or more operations and/or techniques for an PRNG for IoT-type devices, may be performed, at least in part, in an indoor environment, an outdoor environment, or any combination thereof.

Thus, as illustrated, in an implementation, one or more IoT-type devices 102 may, for example, receive or acquire satellite positioning system (SPS) signals 104 from SPS satellites 106. In some instances, SPS satellites 106 may be from a single global navigation satellite system (GNSS), such as the GPS or Galileo satellite systems, for example. In other instances, SPS satellites 106 may be from multiple GNSS such as, but not limited to, GPS, Galileo, Glonass, or Beidou (Compass) satellite systems. In certain implementations, SPS satellites 106 may be from any one several regional navigation satellite systems (RNSS) such as, for example, WAAS, EGNOS, QZSS, just to name a few examples.

At times, one or more IoT-type devices 102 may, for example, transmit wireless signals to, or receive wireless signals from, a suitable wireless communication network. In one example, one or more IoT-type devices 102 may communicate with a cellular communication network, such as by transmitting wireless signals to, or receiving wireless signals from, one or more wireless transmitters capable of transmitting and/or receiving wireless signals, such as a base station transceiver 108 over a wireless communication link 110, for example. Similarly, one or more IoT-type devices 102 may transmit wireless signals to, or receive wireless signals from a local transceiver 112 over a wireless communication link 114. Base station transceiver 108, local transceiver 112, etc. may be of the same or similar type, for example, or may represent different types of devices, such as access points, radio beacons, cellular base stations, femtocells, an access transceiver device, or the like, depending on an implementation. Similarly, local transceiver 112 may comprise, for example, a wireless transmitter and/or receiver capable of transmitting and/or receiving wireless signals. For example, at times, wireless transceiver 112 may be capable of transmitting and/or receiving wireless signals from one or more other terrestrial transmitters and/or receivers.

In a particular implementation, local transceiver 112 may, for example, be capable of communicating with one or more IoT-type devices 102 at a shorter range over wireless communication link 114 than at a range established via base station transceiver 108 over wireless communication link 110. For example, local transceiver 112 may be positioned in an indoor or like environment and may provide access to a wireless local area network (WLAN, e.g., IEEE Std. 802.11 network, etc.) or wireless personal area network (WPAN, e.g., Bluetooth® network, etc.). In another example implementation, local transceiver 112 may comprise a femtocell or picocell capable of facilitating communication via link 114 according to an applicable cellular or like wireless communication protocol. Again, it should be understood that these are merely examples of networks that may communicate with one or more IoT-type devices 102 over a wireless link, and claimed subject matter is not limited in this respect. For example, in some instances, operating environment 100 may include a larger number of base station transceivers 108, local transceivers 112, networks, terrestrial transmitters and/or receivers, etc.

In an implementation, one or more IoT-type devices 102, base station transceiver 108, local transceiver 112, etc. may, for example, communicate with one or more servers, referenced herein at 116, 118, and 120, over a network 122, such as via one or more communication links 124. Network 122 may comprise, for example, any combination of wired or wireless communication links. In a particular implementation, network 122 may comprise, for example, Internet Protocol (IP)-type infrastructure capable of facilitating or supporting communication between one or more IoT-type devices 102 and one or more servers 116, 118, 120, etc. via local transceiver 112, base station transceiver 108, directly, etc. In another implementation, network 122 may comprise, for example, cellular communication network infrastructure, such as a base station controller or master switching center to facilitate and/or support mobile cellular communication with one or more IoT-type devices 102. Servers 116, 118, and/or 120 may comprise any suitable servers or combination thereof capable of facilitating or supporting one or more operations and/or techniques discussed herein. For example, servers 116, 118, and/or 120 may comprise one or more content servers, simulation servers, update servers, back-end servers, management servers, archive servers, location servers, positioning assistance servers, navigation servers, map servers, crowdsourcing servers, network-related servers, or the like.

In particular implementations, one or more IoT-type devices 102 may have circuitry and/or processing resources capable of determining a position fix or estimated location of one or more IoT-type devices 102, initial (e.g., a priori) or otherwise. For example, if satellite signals 104 are available, one or more IoT-type devices 102 may compute a position fix based, at least in part, on pseudorange measurements to four or more SPS satellites 106. Here, one or more IoT-type devices 102 may, for example, compute such pseudorange measurements based, at least in part, on pseudonoise code phase detections in signals 104 acquired from four or more SPS satellites 106. In particular implementations, one or more IoT-type devices 102 may receive from one or more servers 116, 118, or 120 positioning assistance data to aid in the acquisition of signals 104 transmitted by SPS satellites 106 including, for example, almanac, ephemeris data, Doppler search windows, just to name a few examples.

In some implementations, one or more IoT-type devices 102 may obtain a position fix by processing wireless signals received from one or more terrestrial transmitters positioned at known locations (e.g., base station transceiver 108, local transceiver 112, etc.) using any one of several techniques, such as, for example, Observed Time Difference Of Arrival (OTDOA), Advanced Forward Link Trilateration (AFLT), or the like. In these techniques, a range from one or more IoT-type devices 102 may, for example, be measured to three or more of terrestrial transmitters based, at least in part, on one or more positioning reference signals transmitted by these transmitters and received at one or more IoT-type devices 102, as was indicated. Here, servers 116, 118, or 120 may be capable of providing positioning assistance data to one or more IoT-type devices 102 including, for example, OTDOA reference transmitter data, OTDOA neighbor transmitter data, reference signal time difference search window, quality of service parameters, positioning reference signal configuration parameters, locations, identities, orientations, etc. of one or more terrestrial transmitters to facilitate and/or support one or more applicable positioning techniques (e.g., AFLT, OTDOA, etc.). At times, servers 116, 118, or 120 may include, for example, a base station almanac (BSA) indicating locations, identities, orientations, etc. of cellular base stations (e.g., base station transceiver 108, local transceiver 112, etc.) in one or more particular areas or regions associated with operating environment 100.

As alluded to previously, in particular environments, such as indoor or like environments (e.g., urban canyons, etc.), for example, one or more IoT-type devices 102 may not be capable of acquiring and/or processing signals 104 from a sufficient number of SPS satellites 106 so as to perform a suitable positioning technique. Thus, optionally or alternatively, one or more IoT-type devices 102 may, for example, be capable of determining a position fix based, at least in part, on signals acquired from one or more local transmitters, such as femtocells, Wi-Fi access points, or the like. For example, one or more IoT-type devices 102 may obtain a position fix by measuring ranges to three or more local transceivers 112 positioned at known locations. In some implementations, one or more IoT-type devices 102 may, for example, measure ranges by obtaining a media access control (MAC) address from local transceiver 112 using one or more appropriate techniques.

In an implementation, one or more IoT-type devices 102 may, for example, receive positioning assistance data (e.g., OTDOA, AFLT assistance data, etc.) for one or more positioning operations from servers 116, 118, and/or 120. At times, positioning assistance data may include, for example, locations, identities, orientations, positioning reference signal configurations, etc. of one or more local transceivers 112, base station transceivers 108, etc. positioned at known locations for measuring ranges to these transmitters based, at least in part, on an round-trip time (RTT), time of arrival (TOA), time difference of arrival (TDOA), etc., or any combination thereof. In some instances, positioning assistance data to aid indoor positioning operations may include, for example, radio heat maps, context parameter maps, routeability graphs, etc., just to name a few examples. Other assistance data received by one or more IoT-type devices 102 may include, for example, electronic digital maps of indoor or like areas for display or to aid in navigation. For example, if an IoT-type device comprises a mobile device, a map may be provided to the mobile device as it enters a particular area, for example, and may show applicable features such as doors, hallways, entry ways, walls, etc., points of interest, such as bathrooms, pay phones, room names, stores, or the like. By obtaining a digital map of an indoor or like area of interest, a mobile IoT device may, for example, be capable of overlaying its current location over the displayed map of the area so as to provide an associated user with additional context, frame of reference, or the like.

According to an implementation, one or more IoT-type devices 102 may access navigation assistance data via servers 116, 118, and/or 120 by, for example, requesting such data through selection of a universal resource locator (URL). In particular implementations, servers 116, 118, and/or 120 may be capable of providing navigation assistance data to cover many different areas including, for example, floors of buildings, wings of hospitals, terminals at an airport, portions of a university campus, areas of a large shopping mall, etc., just to name a few examples. Also, if memory, data transmission and/or processing resources at one or more IoT-type devices 102 make receipt of positioning assistance data for all areas served by servers 116, 118, and/or 120 impractical or infeasible, a request for such data from one or more IoT-type devices 102 may, for example, indicate a rough or course estimate of a location of one or more IoT-type devices 102. One or more IoT-type devices 102 may then be provided navigation assistance data covering, for example, one or more areas including or proximate to a roughly estimated location of one or more IoT-type devices 102.

Even though a certain number of computing platforms and/or devices are illustrated herein, any number of suitable computing platforms and/or devices may be implemented to facilitate and/or support one or more techniques and/or processes associated with operating environment 100. For example, at times, network 122 may be coupled to one or more wired and/or wireless communication networks (e.g., WLAN, etc.) so as to enhance a coverage area for communications with one or more IoT-type devices 102, one or more base station transceivers 108, local transceiver 112, servers 116, 118, 120, or the like. In some instances, network 122 may facilitate and/or support femtocell-based operative regions of coverage, for example. Again, these are merely example implementations, and claimed subject matter is not limited in this regard.

Figure 2B:
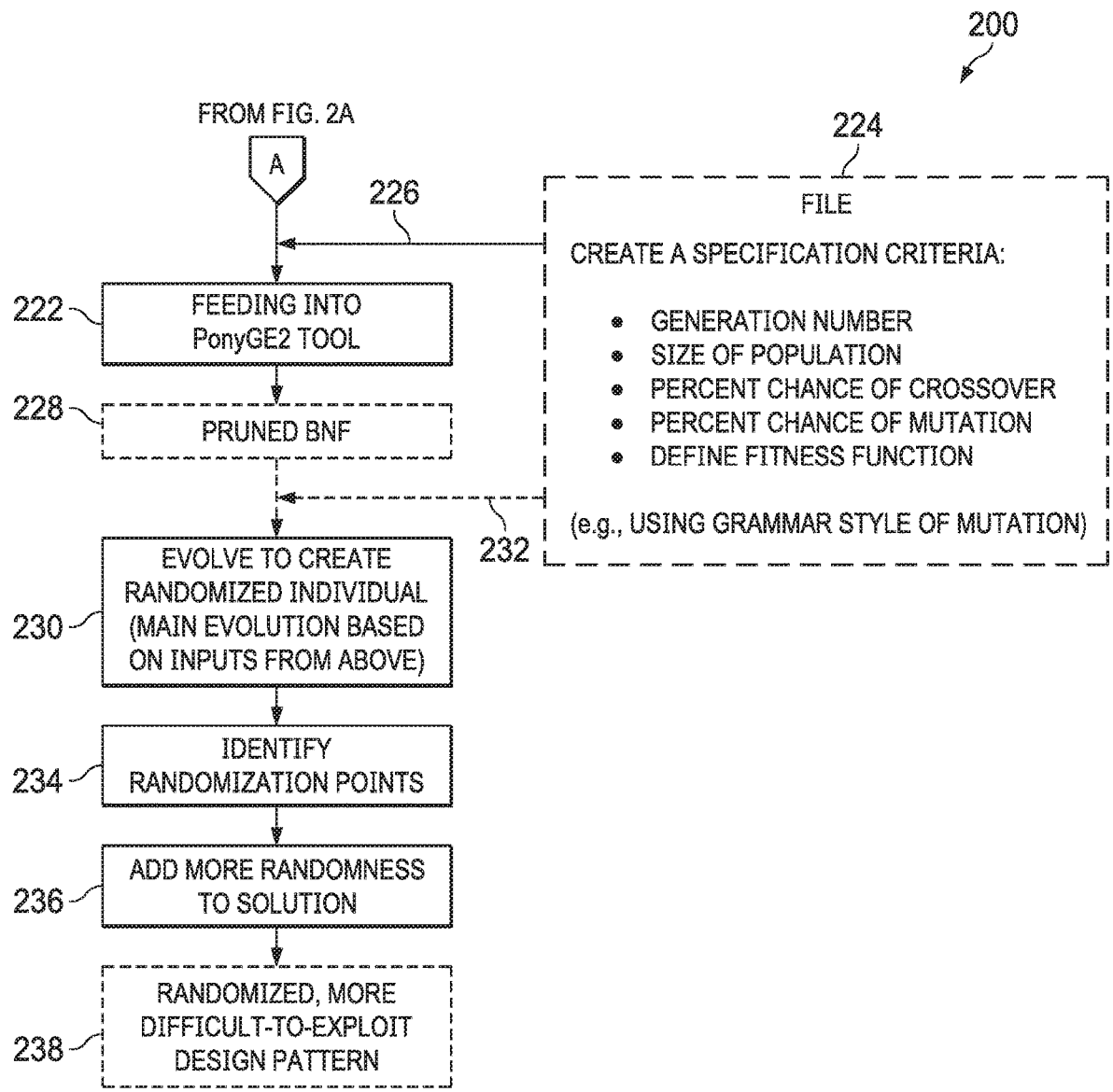

Attention is now drawn to FIGS. 2A and 2B, which is a flow diagram illustrating an implementation of an example process 200 that may be performed, in whole or in part, to facilitate and/or support one or more operations and/or techniques for creating and/or enhancing hardware obscurity via one or more randomization points, such as for use in and/or with embedded computing devices, which may include, for example, IoT-type devices. As discussed below, in some instances, these or like one or more operations and/or techniques may be implemented, in whole or in part, to facilitate and/or support one or more approaches for a more secure operation of embedded computing devices, which may include, for example, IoT-type devices operating in resource constrained or like environments. As was indicated and as will also be seen, at times, process 200 may be implemented, at least in part, in connection with a grammatical evolution tool that may be used, in whole or in part, to grammatically evolve particular domain knowledge so as encourage a suitable and/or sufficient variety of patterns of behavior inherent to a desired functionality, such as an LFSR functionality, for example. As also discussed below, in some instances, particular domain knowledge may, for example, be represented via one or more content structures comprising arrays of linear genotypic binary or integer variables, called genomes, and in which a particular arrangement may represent a candidate solution. As will also be seen, at times, particular domain knowledge may also be grammatically evolved so as to facilitate and/or support randomization of a given solution selected from one or more candidate solutions, such as via injection of randomness using one or more applicable randomization points, for example. It should be noted that content acquired or produced, such as, for example, input signals, output signals, operations, results, etc. associated with example process 200 may be represented via one or more digital signals. It should also be appreciated that even though one or more operations are illustrated or described concurrently or with respect to a certain sequence, other sequences or concurrent operations may be employed. In addition, although the description below references particular aspects and/or features illustrated in certain other figures, one or more operations may be performed with other aspects and/or features.

Thus, as illustrated in FIG. 2A, example process 200 may, for example, begin at operation 202 with obtaining an EBNF of a particular HDL grammar, such as a Verilog grammar, just to illustrate one possible implementation. Generally, a grammar may comprise a set of rules that describe syntax of sentences and/or expressions in a language. In certain simulations or experiments, it has been observed that, to facilitate and/or support grammatical evolution, it may, for example, be useful to employ a context-fee grammar, such as a grammar in which rules are not sensitive to the sentence's context. In addition, it has also been observed that a grammar of a particular computer programming language, such as a Verilog HDL grammar, for example, may be useful due, at least in part, to its syntax's suitability and/or applicability to represent a desired functionality, such as LFSR functionality and/or its expected behavior (e.g., modeling, SoC design goals, etc.). For example, a Verilog HDL or simply Verilog comprises a specialized computer programming language expressed in a textual format that may be used, at least in part, for describing or specifying a structure and/or behavior of electronic circuits, such as digital logic circuits, as one example. As such, in some instances, Verilog may, for example, be used, in whole or in part, for modeling electronic systems, for verification through simulation, timing analysis, test analysis (e.g., testability analysis, fault grading, etc.), logic synthesis, or the like. A particular example of obtaining an EBNF grammar that may be implemented, at least in part, in connection with operation 202, for example, will be discussed in greater detail below, such as with reference to FIG. 3, for example.

Having obtained an EBNF grammar, example process 200 may, for example, proceed to operation 204, such as to prune an obtained EBNF grammar for a desired functionality. For example, as was indicated, in some instances, such as instead of using a full set of an EBNF grammar, it may be useful to create a particular subset of an EBNF grammar that may tailored to implement a desired functionality, such as an LFSR functionality, just to illustrate one possible implementation. In some instances, an LFSR functionality may be useful to create sufficient or otherwise suitable distribution of randomness across a given and/or limited number of hardware solution variants, among other things, such as via shifting one or more appropriate digital signal values according to an applicable linear function, for example. Thus, at times, an EBNF grammar may, for example, be pruned, such as via extracting and/or removing syntactic items not suitable or useful for a desired functionality, for example, such as to facilitate and/or support phenotype consistency (e.g., for desired behavior, etc.). Typically, in the context of grammatical evolution, a "genotype" refers to a bit string (e.g., an array of binary variables, etc.), and a "phenotype" refers to its expression (e.g., a computer program, code, etc.). Likewise, a particular example of pruning an EBNF grammar for a desired functionality, such as an LFSR functionality, for example, will be discussed in greater detail below, such as with reference to FIG. 4, for example.

According to an implementation, example process 200 may proceed to operation 206 and may convert an EBNF grammar, such as pruned for an LFSR functionality, for example, to a BNF grammar. For example, in certain simulations or experiments, it has been observed that, in some instances, utilizing a grammar expressed via an extended version of Backus-Naur form may be less beneficial or suitable, such as for facilitating and/or supporting one or more operations or processes for grammatical evolution, among other operations. For example, it has been observed that, at times, recursive EBNF rules or functions may be less useful for specifying applicable structures, and that rule names may be more concisely or suitably defined via a BNF grammar, such as with less options or without an undue number of options within a particular rule. However, since a grammar of a current Verilog HDL is explained or specified via an EBNF, in some instances, it may be useful to convert an EBNF grammar to a simpler or otherwise more suitable BNF grammar, as was indicated. In addition, since an EBNF notation is more widely—and even universally—recognized and/or accepted, at times, it may be difficult and/or impossible to access and/or obtain a suitable standard or applicable BNF grammar, such as a BNF grammar that may be functionally equivalent or similar to an EBNF grammar tailored for a desired functionality. A particular example of converting an EBNF grammar to a BNF grammar will be discussed in greater detail below, such as with reference to FIG. 5, for example.

Thus, as further referenced at operation 208, in a particular implementation, a syntactic correctness of a BNF grammar may, for example, be verified. For example, in some instances, it may be useful to verify that a BNF grammar is constructed according to a grammar of a target language (e.g., Verilog, etc.), comprises an accurate or otherwise suitable representation of a target language, suitable for further processing (e.g., grammatical evolution, computer-readable code generation, solution verification, etc.), have no functional and/or rule errors, or the like. Depending on an implementation, it may be useful to verify a BNF after one or more initial changes to a source EBNF grammar (e.g., after operation 206, etc.), for example, and/or before it may be used, in whole or in part, for one or more subsequent applications and/or processes. For such verification, one or more appropriate techniques may, for example, be used, in whole or in part, or otherwise considered. As a way of illustration, at times, syntactic correctness of a BNF grammar may, for example, be verified via a constructor or like processing tool (e.g., a checker, etc.) capable of accepting a BNF grammar description of Verilog in Python and producing a syntax analyzer for such a description.

In some instances, a grammatical evolution tool PonyGE2, discussed in greater detail below, may, for example, be employed, at least in part, to verify syntactic correctness of a BNF grammar. For example, PonyGE2 may follow a suitable number of paths of a given grammar from a particular rule to one or more rules used within such a grammar until these paths reach terminal values. In certain simulations or experiments, it has been observed that PonyGE2 may, for example, be particularly useful for detecting circular rules. In some instances, this may, for example, be beneficial since computer-readable code or instruction generation using such rules may lead to or result in an infinite cycle of rules. At times, syntactic correctness of a BNF grammar may be verified via generating a subset of computer-readable code or instructions using rules included by a given grammar, for example, and verifying that the code or instructions are capable of being compiled and executed successfully. As a way of illustration, here, even though such a code or instructions may not be capable of implementing some measurable function, if the code or instructions compile and execute as expected, for example, then it may be determined that the grammar successfully describes its context-free version.

Thus, as referenced at 210, a decision may, for example, be made whether a particular BNF grammar is syntactically correct, such as via one or more approaches discussed above. If it is determined that a BNF grammar is syntactically correct, example process 200 may, for example, proceed to operation 212, such as to edit the BNF grammar for syntactic structures, discussed below. For example, as will be seen, in some instances, a search space defined by a BNF representation of a computer programming language, such as a Verilog HDL, to illustrate one particular implementation, may be electronically restricted so as to impose one or more context-sensitive constraints on the search space. Continuing with the above decision process, if no, however, as referenced via a loop at 214, example process 200 may loop back to operations 202, 204, 206, or 208, which may depend, at least in part, on a source of error with respect to an outputted BNF grammar. For example, if a particular source of error pertains to a source EBNF (e.g., organization, etc.), example process 200 may loop back to operation 202, just to illustrate one particular example. As another example, if a particular source of error pertains to a target application (e.g., a target language representation, etc.), example process 200 may loop back to operation 204. As yet another example, if a particular source of error pertains to changes in BNF syntax, example process 200 may loop back to operation 206. Again, it should be noted that these sources of errors are provided as non-limiting examples. A particular source of error may, for example, be identified, at least in part, via one or more appropriate techniques and/or processes, such as internal coding for error messages, performing parser checks, flagging inconsistent conventions, etc., just to name a few non-limiting examples.

Thus, at operation 214, a BNF may, for example, be electronically edited for syntactic structures. For example, as was indicated, an EBNF and/or BNF grammar is context-free, meaning that changes are typically made in a syntactic structure of strings rather than to elements therein for semantic correctness. Thus, for a more rigid grammatical structure for output of a given grammar with suitable semantic consistency, the grammar may, for example, be edited further to include this more rigid structure in rule declarations themselves. As such, a grammar of interest may be transformed from a more general grammar (e.g., describing Python's syntax formally, etc.) to a grammar tailored to a specific application that is being targeted (e.g., an LFSR functionality, etc.). For example, here, a BNF grammar may be further pruned for syntax, one or more applicable rules may be isolated and/or altered, corresponding rule changes may be made, etc. A particular example of editing a BNF grammar for one or more suitable syntactic structures will be discussed in greater detail below, such as with reference to FIG. 6, for example.

As further illustrated via operation 214, in at least one implementation, a BNF grammar may, for example, be electronically edited for variable names. For example, in certain simulations or experiments, it has been observed that, at times, such as depending on a particular target application, editing a BNF grammar so as to build context of applicable syntactic structures into it may not be sufficient to provide appropriate context. Thus, to at least partially address this, in some instances, it may, for example, be useful to implement or introduce constraints of variable naming into a search space, such as to better or more precisely represent a suitable functionality of a target application. For example, similarly to operation 212 above, here, a BNF grammar may be further pruned by changing one or more appropriate constants, one or more applicable rules may be isolated and/or altered, corresponding rule changes may be made, etc. However, as will be seen, rather than targeting entire syntactic structures, here, one or more terminal values (e.g., numerical strings, etc.) may, for example, be targeted, such as to facilitate and/or support introduction of appropriate context into a BNF grammar. Likewise, a particular example of editing a BNF grammar for one or more suitable variable names will be discussed in greater detail below.

With regard to operation 216, syntactic correctness of a BNF grammar may, for example, be verified. In at least one implementation, operation 216 may be implemented in a manned similar to operation 208 discussed above, but rather than verifying syntactic structures of a BNF grammar against original Verilog or other suitable language (e.g., at operation 208, etc.), here, syntactic structures may be verified for a specific target design. For example, depending on an implementation, a verification operation may include examining syntactic structures for consistency across a number of hardware variants implementing a target application, verifying whether syntactic structures are representative of a solution to a particular problem (e.g., introducing randomness, injecting obscurity, etc. into hardware solutions, etc.), or the like. As a way of illustration, similarly to operation 208, here, one or more applicable paths of a BNF grammar may, for example, be followed from a particular rule to one or more rules used within it until the paths reach terminal values, such as in connection with one or more PonyGE2 runs, if applicable or appropriate. At times, syntactic correctness of a BNF grammar may, for example, be verified via generating computer-readable code or instructions using rules included by a given grammar and verifying that the code or instructions are capable of being compiled and executed successfully.

Thus, in an implementation, as referenced at 218, a decision may, for example, be made with respect to syntactic correctness of a BNF grammar. If it is determined that a BNF grammar is syntactically correct, example process 200 may proceed to operation 222, discussed below with reference to FIG. 2B. If it is determined that a BNF grammar is syntactically incorrect (e.g., partially, substantially, etc.), however, example process 200 may, for example, loop back, as referenced at 220, so as to implement operations 212-218, as discussed above, such as until a positive determination with respect to syntactic correctness of a BNF grammar is made (e.g., at operation 218, etc.).

Continuing with example process 200, as illustrated at operation 222 of FIG. 2B, a syntactically correct BNF grammar may be fed, such as used as an input, for example, into a suitable grammatical evolution tool. As was indicated, in at least one implementation, a PonyGE2 tool may, for example, be utilized, in whole or in part, or otherwise considered. For purposes of explanation, a PonyGE2 tool or simply PonyGE2 is an open source implementation of grammatical evolution in Python, developed by the Natural Computing Research and Applications Group at the University College Dublin (accessible at: https://github.com/ugultopu/PonyGE2). Since PonyGE2 is built in Python, it may facilitate and/or support grammatical evolution of Python syntax, which may include Verilog syntax. More specifically, it may make outputted computer code or instructions more expressive, such as, for example, by parsing code breaks and/or making ranges in a grammar to be more concisely expressed. Depending on an implementation, PonyGE2 may grammatically evolve a BNF grammar defined via a specification of an entire language, for example, or via a subset of a grammar tailored to implement a particular functionality, such as an LFSR functionality, as was indicated.

As further referenced at 224, in some instances, a particular computer file, such as a parameter and/or configuration file may, for example, be generated and may also be used, in whole or in part, as input to PonyGE2, as illustrated generally via an arrow at 226, such as in connection with a syntactically correct BNF grammar. Depending on an implementation, file 224 may comprise an input specification comprising one or more evolutionary criteria and/or applicable parameters, such as for use in connection with one or more PonyGE2 runs, for example. It should be noted that even though file 224 is illustrated herein as an external file, in some instances, a file internal to PonyGE2, or any combination of an external and internal files, may be used herein, in whole or in part. It should also be noted that, even though a single file is illustrated herein, such as for ease of discussion, any suitable number of files may be generated and/or used herein (e.g., a parameter file, fitness function file, etc.), in whole or in part. As illustrated, in an implementation, evolutionary criteria may include, for example, a number of input parameters, such as a number of generations, size of population, type and percent chance of crossover, type and percent chance of mutation, etc. As also seen, at times, a fitness function may also be defined and used, at least in part, to evaluate a number of individual LFSR solutions via computing and/or assigning corresponding fitness values, such as to determine and/or eliminate solutions that may be prone to incorrect and/or undesirable behavior, for example, while selecting subsequent generations. As also illustrated, in some instances, a grammar style of mutation, such as mutation occurring on one or more terminals comprising end leaf options and rules within a grammar, for example, may be used, at least in part, or otherwise considered, just to illustrate one possible implementation. Likewise, a particular example of mutation will be discussed in greater detail below.

As referenced at 228, according to an implementation, based, at least in part, on the above-referenced input, a BNF representation of a syntactically correct BNF, such as pruned or tailored to implement an LFSR functionality, for example, may be generated and/or obtained, such as in the form of an appropriate output. By way of example but not limitation, a syntactically correct LFSR-tailored Verilog code or instructions 1400 that were used, at least in part, in connection with a particular simulation or experiment is illustrated in FIGS. 14A-14B. Further, a particular example of evolutionary parameters and a PonyGE2 run that may be implemented, in whole or in part, in connection with operation 222 will be discussed in greater detail below, such as with reference to FIG. 7, for example.

According to an implementation, example process 200 may proceed to operation 230, such as to implement one or more grammatical evolution operations and/or processes via PonyGE2. For example, as discussed below, in some instances, one or more grammatical evolution operations may be used, in whole or in part, to create one or more randomized individuals, such as represented via one or more optimal or sufficient LFSR solutions. As will also be seen, in some instances, a syntactically correct pruned BNF grammar may be used, at least in part, as input to PonyGE2, such as in connection with evolutionary criteria comprising file 224, as referenced via an arrow at 232, so as to grammatically evolve a suitable or otherwise sufficient number of LFSR solutions. As was indicated, at times, this may, for example, facilitate and/or support generation of start-state initialization numbers with an appropriate or otherwise suitable distribution of randomness. As will also be seen, in some instances, this may also facilitate and/or support generation of a grammar-based genetic representation of a particular LFSR solution, for example, such as based, at least in part, on an application of evolutionary criteria to a particular search space. In at least one implementation, a tournament selection approach, such as to avoid or reduce instances of premature conversion, for example, among other considerations, may be employed herein, in whole or in part. As also discussed below, an elitism strategy, such as to preserve one or more desirable aspects for use in later generations, for example, may also be employed herein, in whole or in part, or otherwise considered. Briefly, if elitism is used, a generation size may be equal to a full population size minus a number of elite individuals, which, at times, may facilitate and/or support efficiency and/or effectiveness, such as via limiting or preventing extra individuals from being generated and/or evaluated. In some instances, such as if no elitism is used, for example, a generation size may be equal to a full population size. A particular example of one or more grammatical evolution operations and/or processes implemented in connection with operation 230 will be discussed in greater detail below, such as with reference to FIGS. 8A-8B, for example.

As further illustrated at operation 234, one or more randomization points within optimal or sufficient LFSR solutions, such as definable via an evolved tailored BNF grammar, for example, may be identified. For example, having successfully implemented the above operations, example process 200 may be capable of generating an example Verilog code or instructions using grammatical evolution from a BNF grammar designed specifically for a particular target application. Since syntactical structure and/or variable naming was built into a BNF grammar itself, a grammatical evolution process may, for example, generate an optimal or sufficient solution as well as a grammar-based genetic representation of that solution, such as comprising different rules from the grammar in a hierarchy. As will be seen, in some instances, this hierarchy may be leveraged, such as to identify points where randomness may be injected, for example, so as to make hardware solutions (e.g., Verilog code or instructions, etc.) comprising a particular design pattern more difficult to exploit by malicious parties. For example, in certain simulations or experiments, it has been determined that rules comprised of a single constant value may be good or suitable candidates for adding randomness, such as by changing the constant value in question to a different, randomly generated constant value. In some instances, this may, for example, be useful for rules that were added constraints on variable naming. At times, it may also be useful to verify, for example, that identified randomization points may not have a significant or undesirable effect on expected functionality and/or behavior of a final hardware solution comprising a particular design pattern. A particular example of identifying randomization points implemented in connection with operation 234 will be discussed in greater detail below, such as with reference to FIG. 9, for example. As will also be seen, at times, a grammar-based genetic representation of a final hardware solution in a hierarchy may also be used, at least in part, to enhance hardware obscurity, such as via introducing or adding more randomness into the solution, for example, via identified randomization points.

In an implementation, at referenced via operation 236, more randomness to a final hardware solution may, for example, be added or injected. For example, as was indicated, a hierarchy of a final hardware solution produced by using a grammatical evolution tool may be leveraged to add or inject more randomness to the solution. Here, based, at least in part, on identified randomization points (e.g., via operation 236, etc.), a best or otherwise suitable approach for adding or injecting more randomness in a hardware solution may, for example, be determined, such as to make tampering with the final solution more difficult, as was indicated. For example, as will be seen, in at least one implementation, for variables that may have string names, these names may be changed from their original value (e.g., that may likely provide a clue into its meaning and/or use in a hardware solution, etc.) to a value that may offer little or no information with respect to its particular function. As such, a final hardware solution comprising a particular design pattern may be made more secure, such as via making associated IoT-type devices across a particular line of manufacturing less similar to one another, for example, by having variable names that differ from device to device. A particular example of one or more grammatical evolution operations and/or processes implemented in connection with operation 236 will be discussed in greater detail below, such as with reference to FIG. 10, for example.

Thus, as further referenced at 238, in a particular implementation, as a result of operation 236, a randomized, more difficult to exploit final hardware solution comprising a particular design pattern, for example, may be generated and/or obtained. For example, in some instances, a final hardware solution may be integrated into a particular design pattern, such as loaded into a suitable filesystem, memory, chip, etc. as part of an SoC design flow so as to comprise a suitable or otherwise sufficient number of IoT-type devices. For example, in some instances, such as for N hardware solutions, N outcomes or starting states may be implemented or achieved, meaning that the N hardware solutions may be capable of providing sufficient or otherwise suitable variability so as to make it less likely or unlikely that two randomly selected IoT-devices may produce the same outcome (e.g., a random seed, number, etc.), just to illustrate one possible implementation. Thus, at times, a particular production run of an SoC design flow may embed a particular hardware variant into a corresponding IoT-type device, for example, such as to allow for a pool of start-state initialization numbers with an appropriate or otherwise suitable distribution of randomness. In addition, at times, a hardware solution with unconventional variable naming may provide verifiable design patterns that may be sufficiently obfuscated (e.g., for additional security, etc.), for example, so as to make associated IoT-type devices across a particular production run of an SoC design flow less similar to one another, as was indicated.

At times, these or like hardware solutions may be tested and/or verified, such as part of an SoC design flow, for example, for consistency, start-state initialization numbers, appropriate or otherwise suitable distribution of randomness, ensure that a final hardware solution may be capable of functioning as intended, or the like. For example, in some instances, in order to verify that a particular hardware solution may be capable of functioning as intended for a target application, it may be useful to implement one or more post-processing operations within an appropriate script to verify that the solution satisfies representative unit tests, such as via one or more appropriate techniques, including one or more techniques discussed herein. While a resulted BNF grammar itself may ensure that a hardware solution may be capable of following a correct design pattern for a target application, at times, one or more additional unit tests may, for example, be useful so as to more fully verify that the solution may be capable of functioning as intended.

Figure 3:
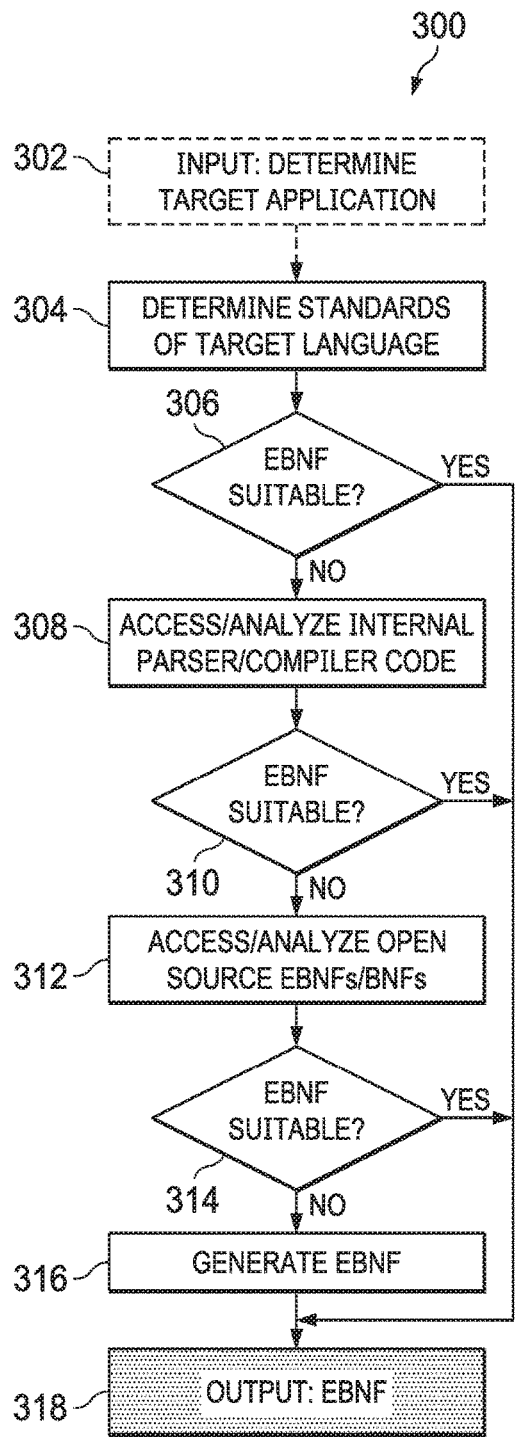
FIG. 3 is a flow diagram illustrating an implementation of an example process for obtaining an EBNF.

Referring now to FIG. 3, which is a flow diagram illustrating an implementation of an example process 300 that may be performed, in whole or in part, to facilitate and/or support one or more operations and/or techniques for creating and/or enhancing hardware obscurity via one or more randomization points, such as for use in and/or with embedded computing devices, which may include, for example, IoT-type devices. For example, as was indicated, in some instances, example process 300 may be performed, in whole or in part, to obtain an EBNF representation of a particular HDL grammar, such as a Verilog grammar, just to illustrate one possible implementation. Likewise, it should be noted that content acquired or produced, such as, for example, input signals, output signals, operations, results, etc. associated with example process 300 may be represented via one or more digital signals. It should also be appreciated that even though one or more operations are illustrated or described concurrently or with respect to a certain sequence, other sequences or concurrent operations may be employed. In addition, although the description below references particular aspects and/or features illustrated in certain other figures, one or more operations may be performed with other aspects and/or features.

Thus, as referenced generally at 302, example process 300 may, for example, begin with determining or defining a target application. For example, as alluded to previously, in some instances, a target application may depend, at least in part, on a nature of a problem to be solved. As was also discussed, in at least one implementation, a target application may comprise, for example, introducing a sufficient or otherwise suitable distribution of randomness into IoT-type devices, such as without reliance on RTCs. At times, determining or defining a target application may also involve determining appropriate synthesis or like tools and/or aspects, for example, so as to limit a search and/or solution space and also an applicable representation for such a space. For example, as will be seen, in some instances, limiting a search and/or solution space and also an applicable representation for such a space, such as in connection with determining or defining a target application may include determining an appropriate grammar capable of facilitating and/or supporting production or generation of a suitable number of Verilog hardware solutions having corresponding design patterns that may be implicitly difficult to decipher or comprehend. In certain simulations or experiments, it has been observed that a proper or suitable grammar to work from may be useful in terms of quality of an output. As was discussed, a grammar typically comprises a set of rules that describe syntax of sentences and expressions in a particular language. Thus, if a grammar for a target language is not correct or otherwise suitable for a target application, for example, it may be difficult to define a structure representative of a solution to a particular problem, which may result in output errors. Also, if a grammar is confusing, poorly documented, etc., then processing such a grammar may be operationally expensive, error-prone, etc. Thus, it may be useful to determine and/or obtain a sufficiently well-formed or otherwise suitable grammar that may, for example, be organized in a clearer and/or more consistent way.

Typically, although not necessarily, grammars may specify their rules in a top-down organization. For example, in some instances, top-level, complex items may be listed first, and their pieces may then may be detailed after a rule definition. A number of symbols used in a grammar may be more usefully or suitably defined, such as near the end of the grammar, for example. Thus, a grammar organized in such a way so as to comprise an appropriate candidate for subsequent pruning, such as for a suitable or desired functionality, for example, as discussed below, may be useful. In addition, in some instances, it may be useful to determine if a particular grammar of interest comprises a number of gaps, such as, for example, in the form of rules that are not defined and/or include ill-formed alternatives, rules that are not grammatical, not conforming to applicable rules of a grammar, accepted usage, standards, or the like. Also, at times, it may be useful to implement one or more evaluation operations, such as to determine whether these or like gaps may be suitable or appropriately filled or addressed, for example, such as for a resulting grammar to suitably work for a particular language of interest. By way of example but not limitation, in at least one implementation, it has been determined that, for a particular target application, such as to facilitate and/or support creating hardware randomness and/or enhancing obscurity at a suitable IoT scale, for example, it may be useful to limit or restrict a search space by a BNF representation of a Verilog HDL grammar, such as to implement a suitable or desired functionality. Further, it has also been determined that it may be useful to employ Python due, at least in part, to its handling of variables, content structures, sequencing, object orientation, and/or utilization of a more straightforward syntax similar to natural language, which may facilitate and/or support more effective and/or more efficient utilization of a particular grammatical evolution tool, such as PonyGE2, for example.

Thus, continuing with the above discussion, since a standard or suitable BNF grammar may no longer be available or accessible (e.g., obsolete, outdated, etc.), in some instances, it may, for example, be useful to obtain an EBNF grammar that may be capable of being appropriately expressed in the form of a BNF grammar. Since, as was indicated, an EBNF grammar may comprise a number of non-standard features in its syntax, for example, it may be useful to determine one or more applicable or appropriate standards that may be applicable or suitable for a target language, such as Verilog, for this example, as referenced via operation 304. Thus, here, an input specification, such as stored as one or more digital signals and/or states in a suitable memory may, for example, be accessed and evaluated so as to determine compliance with applicable or otherwise suitable language standards. As a way of illustration, on-line content comprising one or more EBNF-related standards may, for example, be accessed and analyzed for errors, gaps or omissions, inconsistencies, etc. in an associated grammar so as determine compliance with Verilog standards. In some instances, it may also be useful to determine, for example, whether a particular grammar of interest is comprehensive or otherwise suitable for conversion, grammatical evolution, and/or one or more other suitable processes. Thus, since a Python grammar is typically used for a Python parser in conjunction with one or more other supporting files, including a "token" computer file specifying a meaning of symbols available in Python, for example, at times, it may be useful to access such a file for the purpose of determining standards of a target language, among other tasks.

Having determined standards of a target language, example process 300 may proceed to operation 306, for example, so as to determine suitability of an EBNF grammar, which may be based, at least in part, on the determined standards. Thus, as illustrated, if it is determined that a particular EBNF grammar is suitable, such as to facilitate and/or support conversion, grammatical evolution, and/or one or more other appropriate processes, for example, example process 300 may proceed to operation 318, such as to output the EBNF grammar for further processing (e.g., at operation 204 of FIG. 2A, etc.). However, if it is determined that an EBNF grammar is not suitable, for example, example process 300 may proceed to operation 308, such as to access and/or analyze an applicable internal parser and/or compiler code or instructions for a suitable grammar. For example, since grammars may be used, at least in part, in a parse and/or compilation process, in some instances, it may be useful to access and/or evaluate code or instructions of an internal parser and/or compiler to determine whether a given grammar comprises a more complete, accurate, etc. representation of a target language. Thus, as referenced at 310, such a decision may be made, at least in part, via, for example, evaluating a grammar of an internal parser and/or compiler code or instructions for errors, gaps or omissions, inconsistencies, or the like, such as discussed above. Likewise, here, if it is determined that an EBNF grammar is suitable, example process 300 may proceed to operation 318, such as, for example, to output the grammar for further processing.

If no, however, example process 300 may proceed to operation 312, such as to access and/or analyze one or more open source EBNF and/or BNF grammars, for example, if available. For example, in some instances, a target language may not have a suitable grammar, such as in its specification, internal parser and/or compiler code or instructions, or the like. To illustrate, a specification for the LLVM intermediate representation (IR), as one example, may include a grammar that may be readily accessible, but may not be labeled as an official grammar due, at least in part, to its sparsity and, as such, may not be suitable for a target language. Thus, in some instances, it may be useful to access and/or analyze a grammar that may have been developed in open source, such as in connection with a particular open source project, for example. It should be noted, however, that, in certain simulations or experiments, it has been observed that open source grammars are typically non-standard, may have different syntax constraints and/or meaning, or the like and, as such, may be error-prone, difficult to tailor, process, etc. However, in some instances, such as if one or more open source EBNF and/or BNF grammars are available and/or accessible, these grammars may be evaluated, such as in a manner discussed above, for example, so as to determine their suitability for a target language.

Similarly, here, example process 300 may, for example, implement a decision operation, as referenced at 314, and may output a suitable EBNF grammar via operation 318, such as upon appropriate analysis and/or determination or, alternatively, may proceed to operation 316, at which point a suitable EBNF grammar may be generated, such as via one or more appropriate techniques. For example, in some instances, a suitable EBNF grammar may be generated via a set of instructions defining and/or expressing (e.g., formally, etc.) appropriate symbols (e.g., non-terminal, terminal, start symbols) and production rules, simplifying notation, if suitable or desired, or the like. As was indicated, at times, while generating a suitable EBNF grammar, it may, for example, be useful to implement one or more operations so as to prune the grammar for a desired functionality, such as an LFSR functionality, just to illustrate one possible implementation. It should be noted that, in some instances, it may be useful to generate a BNF grammar, such as instead of an EBNF grammar, for example. In such a case, an operation converting an EBNF grammar to a functionally equivalent or substantially similar BNF grammar, such as implemented in connection of operation 206 of FIG. 2A, for example, may be optional. Likewise, here, a generated EBNF grammar may, for example, be outputted, such as for further processing, as referenced generally at 318.

As was indicated, in some instances, it may, for example, be useful to further limit or restrict a search space defined via an EBNF grammar, such as to better or more precisely represent a suitable functionality of a target application. In some instances, it may, for example, also be useful to disregard and/or eliminate certain individual LFSR solutions, such as those that may not change after crossover, discussed below, those that may not produce a new individual LFRS solution after crossover, or the like. Thus, in an implementation, a suitable EBNF grammar may be pruned, such as for an LFSR functionality, for example, which, at times, may facilitate and/or support generation of more tailored, more compact, more fitted, etc. individual LFSR solutions. In this context, "pruning" refers to a process of removing one or more content structures (e.g., trees, sub-trees, syntactic items, rules, etc.) that may not be required or otherwise useful for a target application, such as, for example, content structures not required or otherwise useful to implement a particular functionality (e.g., an LFSR functionality, etc.), content structures having duplicate function arguments, or the like.

Figure 4:
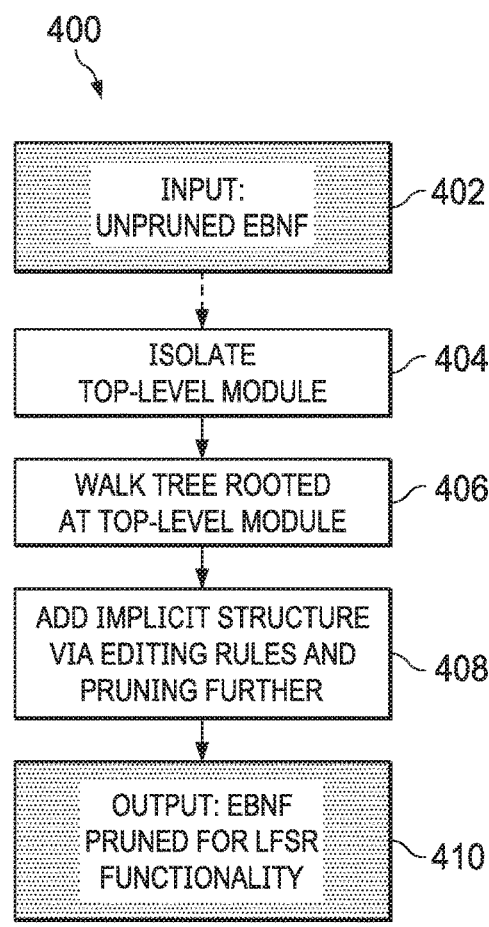
FIG. 4 is a flow diagram illustrating an implementation of an example process for pruning an EBNF for an LFSR functionality.

Thus, referring now to FIG. 4, which is a flow diagram illustrating an implementation of an example process 400 that may be performed, in whole or in part, to facilitate and/or support one or more operations and/or techniques for pruning an EBNF grammar for a desired functionality, such as an LFSR functionality, for example. As was indicated, in some instances, pruning an EBNF grammar may, for example, be implemented, at least in part, in connection with operation 204 of FIG. 2A. Likewise, it should be noted that content acquired or produced, such as, for example, input signals, output signals, operations, results, etc. associated with example process 400 may be represented via one or more digital signals. It should also be appreciated that even though one or more operations are illustrated or described concurrently or with respect to a certain sequence, other sequences or concurrent operations may be employed. In addition, although the description below references particular aspects and/or features illustrated in certain other figures, one or more operations may be performed with other aspects and/or features.

Thus, according to an implementation, while pruning an EBNF for a particular functionality, it may, for example, be useful to isolate one or more syntactic items required or otherwise suitable for that functionality to be available without any unnecessary items retained. For example, as discussed below, a requisite or otherwise suitable top-most-level structure or like structure (e.g., for other functionality, language, etc.) may be initially isolated. This particular structure may depend, at least in part, on an implementation and may comprise, for example, a method definition in Python, a class in Java, a module in Verilog, or the like, just to illustrate a few possible examples. In some instances, a rule definition for these or like structures may include, for example, a relatively complex tree of options rooted at them so as to allow for a number of different program structures. Thus, at times, it may be useful to follow lines or branches of corresponding tree structures, for example, and eliminate branches that are unnecessary or less than useful for a particular functionality. To illustrate, if a process is adding two numbers together unconditionally and returning them as an output, for example, one or more rules that describe how to define case statements or "if/else" constructs may be removed or pruned. At times, one or more alternatives from rules may also be removed so as to further prune or limit a search space, for example.

In some instances, such as while following a tree rooted at a top-level structure needed or otherwise useful for a given task, it may be useful, for example, to label and/or make note regarding which rules are touched during this process. In certain simulations or experiments, it has been observed that these rules may comprise, for example, one or more additional rules that were disconnected from an applicable tree structure. As such, these or like rules may not be needed or otherwise useful for a particular functionality and, thus, may also be removed or pruned, for example. At times, it may, for example, be useful to add implicit structure to a final grammar, such as once a needed or useful functionality has been isolated. This aspect may depend, at least in part, on a desired functionality and/or target application, for example, and may affect a final output of a grammar.

Thus, with this in mind, according to an implementation, example process 400 may begin at operation 402, such as with using a suitable grammar, such as an EBNF grammar obtained at operation 202 of FIG. 2A, for example, as an input. At operation 404, a particular top-level module, such as a top-level Verilog module may, for example, be isolated, as was indicated. In some instances, a top-level Verilog module may comprise, for example, HDL code or a portion thereof, such as defining Verilog syntax constraints via expected behavior inherent to and/or representative of a particular desired functionality, such as an LFSR functionality, just to illustrate one possible implementation. Typically, a Verilog module may comprise, for example, a basic unit of hierarchy, such as descriptive of appropriate boundaries, inputs and/or outputs, behavior (e.g., register transfer level logic, etc.), hierarchical design, or the like. Here, a rule for module declaration may be initially isolated, for example, since a module may serve as a top-level rule during a pruning process. It should be noted that within a Verilog grammar, a module declaration may be initially treated as a top-level rule, for example, so that a number of syntactic items connected to it as a tree root may remain sufficiently large. Subsequently, branches of a tree rooted at that root may, for example, be followed and pruned, as appropriate.

Having isolated a top-level Verilog module, at operation 406, a tree-walk in a suitable tree structure, such as a tree structure rooted at a top-level module, for example, may be performed. For example, a Verilog module declaration may be connected to a larger number of rules that may offer one or more additional functionalities. However, in some instances, it may, for example, be useful to tree-walk a smaller subset of these rules, such as to obtain an EBNF grammar that may be representative of particular desired functionality, such as an LFSR functionality. By way of example but not limitation, useful functionalities that may be retained to suitably express or represent an LFSR functionality in Verilog may include the following:

Establishing input variables.
Establishing output variables.
Establishing register variables.
Always blocks that trigger on a clock edge or at any change.
Begin/end structures.
If/else constructs.
Assigning to one variable from another variable, including when an assignment is a concatenation of two differently sized variables.
Case/endcase constructs, including cases themselves that all contain begin/end blocks.
The ~^, ~, ^, binary operators.
The == Boolean equality operator.
Getting a value of a single index in a variable size register.
An assign statement, including a functionality to include a lambda expression as a conditional assignment.
Syntax for setting a size of a variable to something greater than 1.

It should be noted, however, that these functionalities are provided as non-limiting examples, such as for purposes of illustration of building blocks that, in some instances, may serve as their own roots to trees in a Verilog grammar structure, for example. In addition, to properly or otherwise suitably express an LFSR, in some instances, it may be useful, for example, to retain one or more rules that may support one or more of the above functionalities in a pruned version. In some instances, it may also be useful to ensure or otherwise verify that rules reach terminal values, for example, so that they may be properly expressed in a more concrete form. Thus, one or more rules that may not be useful to implement an LFSR functionality and/or rules that may not support one or more of the above functionalities may be pruned or removed, for example, even if they are included in a tree rooted at a top-level rule, such as a module declaration. At times, rules that are not a part of this grammar tree may also be removed, for example, as they may lead to an unwanted output.

With regard to operation 408, an implicit structure may, for example, be added, such as via editing rules and pruning further. For example, since an EBNF grammar is context-free, as was indicated, it may refer to changes in syntactic structure of strings, rather than to elements therein for semantic correctness. This, if it is useful or desirable to generate a more rigid structure for an output of a grammar that may have suitable semantic consistency, for example, the grammar may be further edited so as to include this rigid structure in rule declarations themselves. It should be noted that, at times, it may also be useful to create a separate copy of a pruned grammar, such as prior to modifications, for example, in order to have a canvas for generating one or more different versions of a more structured grammar, which may be application-specific. It should be noted that, in some instances, such as if a larger number of sub-grammars is planned to be extracted from a given grammar, for example, then it may be useful to convert an EBNF grammar to a BNF first and then implement pruning from that, which may depend, at least in part, on a particular application, design flow, grammar, functionality, or the like. Thus, in an implementation, having added an implicit structure, an EBNF grammar pruned for an LFSR functionality may, for example, be outputted, as referenced at 410.

Figure 5:
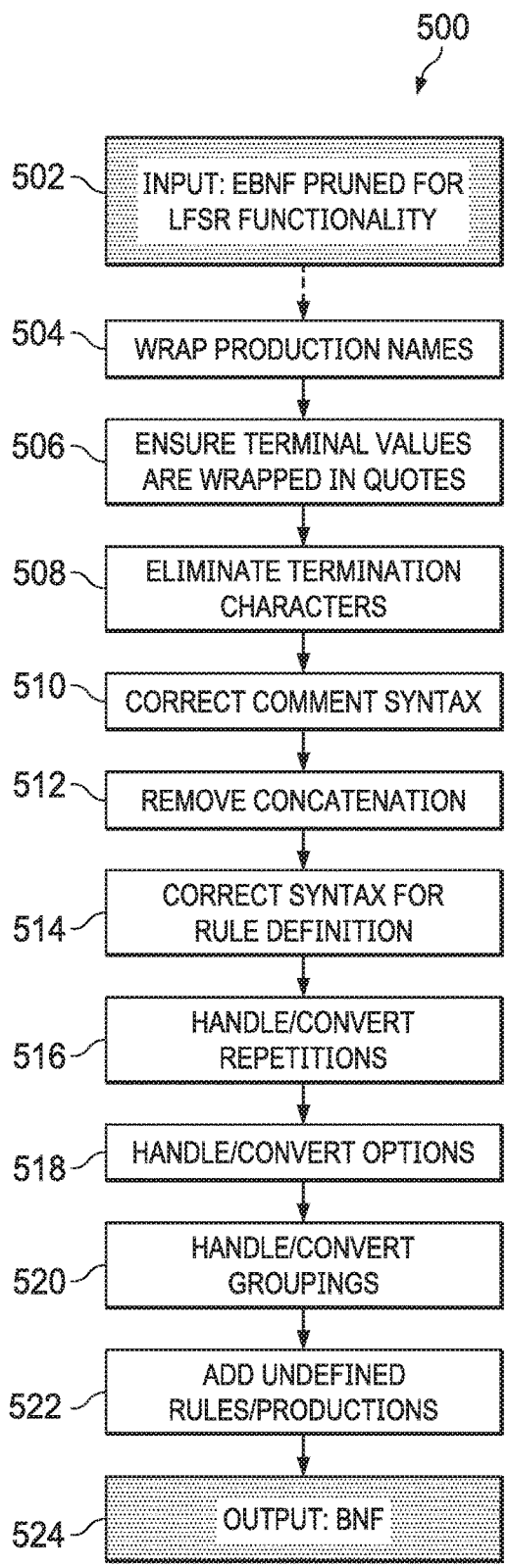
FIG. 5 is a flow diagram illustrating an implementation of an example process for converting an EBNF to a BNF.

FIG. 5 is a flow diagram illustrating an implementation of an example process 500 that may be performed, in whole or in part, to facilitate and/or support one or more operations and/or techniques for converting an EBNF grammar to a BNF grammar. As was indicated, example process 500 may be performed, at least in part, in connection with operation 206 of FIG. 2A, for example. Likewise, it should be noted that content acquired or produced, such as, for example, input signals, output signals, operations, results, etc. associated with example process 500 may be represented via one or more digital signals. It should also be appreciated that even though one or more operations are illustrated or described concurrently or with respect to a certain sequence, other sequences or concurrent operations may be employed. In addition, although the description below references particular aspects and/or features illustrated in certain other figures, one or more operations may be performed with other aspects and/or features.

Thus, example process 500 may begin, such as at operation 502, for example, with an appropriate input, such as an EBNF grammar pruned for an LFSR functionality, for this example. As indicated above, it has been observed that, in some instances, utilizing a grammar expressed via an extended version of Backus-Naur form may be less beneficial or suitable, such as, for example, for facilitating and/or supporting one or more operations or processes for grammatical evolution, among other operations. Thus, at times, it may, for example, be useful to convert a suitable EBNF grammar to a functionally equivalent or substantially similar BNF grammar. As was also discussed, typically, although not necessarily, a BNF grammar may comprise a more concise and/or clear set of rules. For example, BNF's productions or rule names are indicated by a text being wrapped by < > (e.g., <Rule>, <Another-Rule>, etc.). Also, BNF's production and rule names may, for example, be used, in whole or in part, within other production bodies as well, such as similarly with their < > wrapping. Further, BNF's terminals are contained within double quotes (" ") or single quotes (' '), and different options within a production are separated by the | symbol. A BNF's production may be defined via a production name, followed by '::=', for example, and then followed by a body of the production. BNF's comments are typically at the end of a line, for example, and begin with the ';' character.

An EBNF grammar, however, may have a larger number of complex rules. Consider, for example:

TABLE 1

Example EBNF rules.

| Definition | = or: or :=, depending on the type |
|---|---|
| Concatenation | , |
| Termination | ; |
| Alternation | \| |
| Optional | [ . . . ] |
| Repetition | { . . . } |
| Grouping | ( . . . ) |
| Terminal String | " . . . " or ' . . . ' |
| Comment | (* . . . *) |
| Special Sequence | ? . . . ? |
| Exception | — |

Additionally, an EBNF's production/rule names are typically not wrapped with the < > symbols, which, in some instances, may require a standard termination character and/or a different way of marking comments. At times, this aspect may, for example, prove to be relatively difficult to implement and/or change to fit into a suitable BNF pattern. As such, with a larger number of EBNF rules, in some instances, it may be desirable or useful to more concisely define a production without an undue number of options within a rule, for example. Thus, as discussed below, in at least one implementation, an EBNF grammar may be converted to a functionally equivalent or substantially similar BNF grammar, such as without changing internals of productions, for example, and/or implementing syntactic changes that may bring a structure of an EBNF grammar more in line with a BNF grammar format.

Thus, according to an implementation, as illustrated via an operation at 504, one or more production rules may, for example, be wrapped. For example, in an EBNF grammar, wrapping production names with < > brackets may be optional. As such, in some instances, operation 504 may also be optional, such as if a given EBNF grammar (e.g., an EBNF grammar inputted at operation 502, etc.) does not contain such brackets, for example. Otherwise, it may, for example, be useful to implement appropriate rule processing, such as to access all applicable or useful rules and, for every token that is not a terminal, wrap it with < >. Since an EBNF rules typically do not contain spaces, in some instances, these rules may, for example, be represented via a single unbroken string of characters.

Example process 500 may then proceed to operation 506 to ensure, such as to analyze and/or determine, for example, that applicable terminal values are wrapped in quotes. For example, in certain simulations or experiments, it has been observed that, in an EBNF grammar, terminal values may be bolded, such as instead of being wrapped in single or double quotes. Additionally, it has been observed that a collection of literals may be indicated via range statements or regex expressions. Thus, for a particular instance of a terminal value, it may, for example, be useful to analyze and/or determine that it is wrapped in either single quote or double quotes. At times, this may depend, at least in part, on an applicable convention, for example, and/or if quotes are capable of correctly representing inside content (e.g., "" and '"' are capable of representing single occurrences of the ' and " characters, etc.). In some instances, it may also be useful to enumerate range or regex expressions into all suitable combinations and/or options, for example.

With regard to operation 508, one or more termination characters may, for example, be eliminated or deleted. For example, in an EBNF grammar, a rule may be terminated by a ';' character, such as due, at least in part, to not wrapping production names. In certain simulations or experiments, it has been observed that these termination characters may not be needed or otherwise useful in a BNF grammar and, as such, may be deleted.

Continuing with the above discussion, at operation 510, comment syntax of an EBNF grammar may, for example be corrected. For example, comments in an EBNF grammar may typically be contained within a (* . . . *) structure, while comments within an BNF grammar may be at the end of a line and prepended by a ';' symbol. Thus, here, it may, for example, be useful to access all or applicable comments and, if any are contained within a line (e.g., have effective code both before and after a comment, etc.), split that single line into three, such as with the comment being positioned as the middle line. Then, for all or applicable comments, it may, for example, be useful to remove the prepending (* and replace it with ';'. Here, trailing for *) for all or suitable comments, such as if appropriate or applicable, so as to facilitate and/or support outputting a grammar that may be more precise and/or easier to process.

In an implementation, at operation 512, concatenation comprising an EBNF grammar may, for example, be removed. For example, an EBNF grammar typically represents concatenation of different elements within a single production option with a ',' symbol. In certain simulations or experiments, however, it has been observed that such concatenation may not be useful for a BNF grammar, such as to implement a desired functionality, for example. As such, here, this or like concatenation may be removed, for example, and appropriate elements may be listed in a sequential order, such as without a concatenation symbol.

With regard to operation 514, syntax for an EBNF rule definition may, for example, be corrected. For example, in an EBNF grammar, a standard notation for the beginning of a definition of a rule after a rule name has been stated is '='. However, in a particular simulation or experiment, it has been observed that this notation may be marked with a different set of characters, such as, for example, ":=", ":", "::==", "::=". It has also been observed that, in a BNF grammar, it may, for example, be useful to represent this notation via "::=". Thus, in some instances, it may be useful, for example, to analyze and/or determine that all or suitable instances of a definition notation are compliant with a BNF standard of "::=".

According to an implementation, example process 500 may further proceed to operation 516, during which repetitions may, for example, be handled, such as processed and/or converted. Typically, although not necessarily, repetitions in an EBNF grammar may be represented via the following structure: '{ }'. In this context, a "repetition" refers to one or more elements within curly braces that is being allowed to appear an arbitrary number of time, including not at all. For example, if within a rule there is a statement of '{<option>}' then the result of that production may contain 0, 1, or more instances of <option>. For a particular occurrence of this structure, a new rule may, for example, be created and/or appropriately labeled. For example, in some instances, it may be useful to label a new production with a name that includes an original name of items appearing within it with "_repetition" added at the end. A new rule may have three options for its body, such as, for example:

Empty or ' '
A single occurrence of items within a repetition.
A single occurrence of items within a repetition and a recursive call to a new rule.

According to an implementation, a new rule may, for example, replace repetition syntax in a rule that contains a repetition. Thus, consider, for example:

Original Rule:
<rule>::=<constant>"terminal"{<parameter>}
New Rule(s):
<rule>::=<constant>"terminal"<parameter_repetition>
<parameter_repetition>::=''|<parameter>|<parameter>
<parameter_repetition>

In some instances, this may, for example, facilitate and/or support expressing the same or similar functionality as repetition syntax in an EBNF grammar, but with syntax available in and/or applicable to a BNF grammar. It should be noted that, once a new rule is defined, it may, for example, be useful to replace a given repetition with its rule counterpart so as to avoid creating duplicate productions.

Continuing with example process 500, at operation 518, one or more options may, for example, be handled, such as processed and/or converted. For example, syntax for an option in an EBNF grammar may comprise a text contained within a '[ . . . ]' construction. In some instances, an option syntax may, for example, indicate that items within the brackets may appear 0 or 1 times. To address this, at times, a process, such as similar to a process handling repetition discussed above may, for example be employed, in whole or in part. To illustrate, for a particular option, a new rule that may have two options within a body, such as one of them being empty and the other being a single instance of an inside of an option structure, for example, may be created. Similarly, any suitable rule name may be used herein, but, in some instances, it may be useful to label a new production with a name indicative of what is inside a particular option, for example, and adding "_option" at the end. Thus, consider, for example:

Original Rule:
<rule>::=<constant>[<name-parameter>]"terminal"
New Rule(s):
<rule>::=<constant><name-parameter_option>"terminal"
<name-parameter_option>::=''|<name-parameter>

Likewise, in some instances, generating new rules via this approach may facilitate and/or support expressing the same or similar functionality, such as partially or substantially, as option syntax in an EBNF grammar, for example, but with syntax available in and/or applicable to a BNF grammar. Similarly, here, it should be noted that, once a new rule is defined, it may be useful to replace a given repetition with its rule counterpart, for example, so as to avoid creating duplicate productions. For example, in at least one implementation, two options from a single option in an original rule may be created, such as to avoid creating another rule entirely. In such a case, such as if a specific option is used in several places, for example, it may be useful to replace those instances of the option with a new rule.

As further illustrated, example process 500 may proceed to operation 520, for example, to process, such as handle and/or convert one or more applicable groupings. Typically, although not necessarily, a grouping in an EBNF grammar may be represented by the '( . . . )' syntax in which a body of the grouping comprises a collection of items separated by '|' characters. While inside a grouping, for example, one of the items may be expressed at a time. For a particular grouping, depending on an implementation, the following approaches may, for example, be utilized, in whole or in part, or otherwise considered:

An alternate within an existing rule may be made, such as for a particular option in a grouping, where the alternate has only one of the options included in it; and/or
A new rule that has a body identical to the inside of the original grouping may be created.

Thus, consider, for example:
Original Rule:
<rule>::=<test>(<option1>|<option2>|<option3>)
New Rule with Added Alternatives:
<rule>::=<test><option1>|<test><option2>|<test><option3>
New Rules when an Additional Rule is Created:
<rule>::=<test><option1-option2-option3_grouping>
<option1-option2-option3_grouping>::=<option1>|<option2>|<option3>

In an implementation, such as depending, at least in part, on what is in a body of a rule to be adapted, it may be useful to add a new rule, such as instead of adding alternatives to an existing rule, for example. In some instances, such as if a new rule is generated, for example, it may also be useful to indicate options in a grouping and append "_grouping" at the end of the rule name.

With regard to operation 522, appropriate undefined rules or productions may, for example, be added. As was indicated, in some instances, an EBNF grammar for a target application may be incomplete, such as having rules that are used in a body of some other rule, but that rule is not defined in any other part of a specification or some content. For example, in certain simulations or experiments, it has been observed that a larger number of terminal options for a single rule may be expressed without enumerating all of them. At times, this may involve, for example, interpreting what a particular rule represents and/or defining it for a BNF converter. To illustrate, a standard Verilog EBNF may have rules that are not defined, such as, for example, <Any_ASCII_character>, Any_ASCII_character_except_white_space>, an <Any_ASCII_character_except_new_ line>, or the like. These or like rules may indicate what a corresponding rule may contain, for example, and defining it may involve introducing one or more applicable ASCII characters, at times, with exceptions, if appropriate. In some instances, this may facilitate and/or support converting a non-standard, incomplete, inaccurate, etc. EBNF grammar into a BNF grammar that may be more standard-compliant, more effective and/or more efficient to process, or the like, as was indicated.

In certain simulations or experiments, it has also been observed that an EBNF grammar may comprise special characters, such as characters contained within the '? ?' structure, for example. Generally, these or like special characters may not necessarily be comments, for example, and may be outside the scope of a typical EBNF standard. At times, these or like special characters may be included as a marker, for example, but, to implement these special characters, it may be useful to generate a new collection of rules to represent meaning of these or like special characters.

In some instances, such as optionally or alternatively, an augmented BNF (ABNF) grammar may, for example, be utilized herein, in whole or in part, or otherwise considered. It should be noted that one or more syntactical elements of such an ABNF, however, may be incompatible with those of a BNF grammar. As such, here, an ABNF may be used, at least in part, for one or more protocols specifications, such as similarly to an EBNF, for example, but may have different notations for choice, option, and/or repetition. As a way of illustration, for implementation purposes, some of the differences are illustrated below. Thus, consider, for example:

|  | EBNF Notation | ABNF Notation |
|---|---|---|
| Choice | \| | / |
| Repetition | { expansion } | *( expansion ) |

At times, an ABNF may also specify, for example, upper and/or lower bounds on a number of repetitions allowed for a syntactic item. For example, a repetition to be repeated n or more times may be preceded by n*. Further, a repetition to be repeated between n and m times may, for example, be preceded by n*m. As such, here, conversion from an ABNF grammar to a BNF grammar may, for example, be implemented, in whole or in part, in a manner similar to conversion from an EBNF grammar to a BNF grammar, as discussed above, while accounting for these or like aspects and/or differences.

As illustrated at 524, a suitable BNF grammar, such as a BNF grammar that may be functionally equivalent or substantially similar to an inputted EBNF grammar (e.g., at operation 502, etc.) may, for example, be outputted, at which point example process 500 may terminate. As indicated above, in an implementation, such a BNF grammar may comprise, for example, a subset of a Verilog BNF grammar that focuses on an LFSR area, may be simpler to process (e.g., parse, compile, etc.), may be more primed for use in a number of tools, such as for grammatical evolution applications, or the like. In some instances, it may, for example, be useful to verify correctness and/or validity of an outputted BNF grammar. For example, as was indicated, here, the PonyGE2 tool, accessible at https://github.com/PonyGE/PonyGE2, may be utilized, in whole or in part. As was also discussed, since PonyGE2 is built in Python, it has support for grammatical evolution of Python syntax. More specifically, in some instances, it may allow to make outputted code more effective and/or more efficient, such as for processing, for example, by parsing code breaks and/or making ranges in a grammar to be more concisely expressed.

Figure 6:
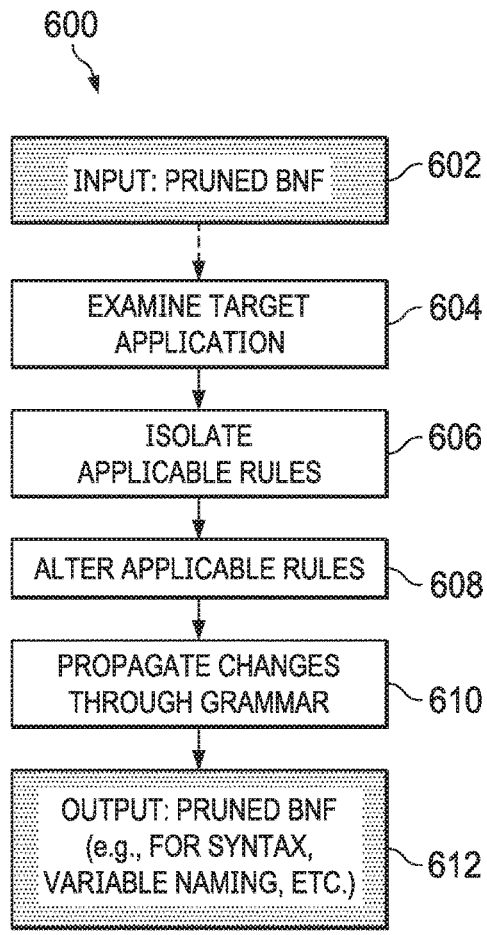
FIG. 6 is a flow diagram illustrating an implementation of an example process for editing a BNF grammar for syntactic structures.

Referring now to FIG. 6, which is a flow diagram illustrating an implementation of an example process 600 that may be performed, in whole or in part, to facilitate and/or support one or more operations and/or techniques for editing a BNF grammar for suitable syntactic structures. As was indicated, in some instances, example process 600 may be implemented, at least in part, in connection with operation 212 of FIG. 2A, for example. Likewise, it should be noted that content acquired or produced, such as, for example, input signals, output signals, operations, results, etc. associated with example process 600 may be represented via one or more digital signals. It should also be appreciated that even though one or more operations are illustrated or described concurrently or with respect to a certain sequence, other sequences or concurrent operations may be employed. In addition, although the description below references particular aspects and/or features illustrated in certain other figures, one or more operations may be performed with other aspects and/or features.

Thus, example process 600 may begin at operation 602, such as utilizing a pruned BNF grammar as input, for example, and may proceed to operation 604 to examine a target application. For example, as was indicated, a BNF grammar is context-free, meaning that it refers to changes in syntactic structure of strings rather than to elements therein for semantic correctness. This, if it is useful or desirable to generate a more rigid structure for an output of a grammar that may have suitable semantic consistency, for example, the grammar may be further edited so as to include this rigid structure in rule declarations themselves. It should be noted that, at times, it may also be useful to create a separate copy of a pruned grammar, such as prior to modifications, for example, in order to have a canvas for generating one or more different versions of a more structured grammar, which may be application-specific. It should also be appreciated that example process 600 may be used, in whole or in part, as a roadmap for isolating, assessing, and/or editing rules of a BNF grammar, for example, that may need or use one or more additional syntactic constraints, such as beyond those already imposed by one or more previous operations of example process 200 of FIG. 2A. Thus, in some instances, it may be useful to determine, for example, whether a target application may benefit from one or more additional changes for syntactic structures. For example, Verilog code or instructions of a target application may be examined or analyzed, such as via one or more passes over a given grammar to search for structures that may be consistent across a number of applicable versions of a target application. While some passes over a given grammar may isolate a desired functionality (e.g., an LFSR functionality, etc.) without adding context for a target application into the grammar, for example, implementing a sufficient number of passes so as to identify one or more syntax structures that may be fixed in the grammar to provide context may be a desirable goal.

With respect to operation 606, one or more applicable rules may, for example, be isolated. For example, once syntactic structures that may need to be constrained are identified, one or more top-level rules that describe a desired functionality, as well as any other applicable rules that may be affected by changing these rules may be isolated. In at least one implementation, these additional rules may include, for example, one or more rules that use a rule to be changed and/or one or more rules that may be used by such a rule.

At operation 608, one or more applicable rules, such as those isolated in connection with operation 606, for example, may be altered in a suitable manner, such as by injecting context for a target application into them. For example, in some instances, here, a rule may be replaced with a terminal value, one or more portions of a rule's definition may be removed so as to limit a search space of that rule, etc., which may depend, at least in part, on a target application, syntax structure, or the like. Additionally, if a rule to be altered has differing contexts in a target application, then the application may require or use, for example, duplicate rules with differing contexts. For common constrained constructs, such as conditional loops for specific portions of a given solution, for example, it may be useful to make multiple duplicates. It may also be useful to make a sufficient number of duplicates before editing an original rule for one or more contexts.

With regard to operation 610, one or more appropriate changes may, for example, be propagated through a given grammar. For example, as was indicated, one or more changes implemented at operation 608 may require changes to one or more subsequent rules that may be and/or have been used by a rule that was changed. Likewise, change propagation may be dependent, in whole or in part, on a target application and/or a grammar it is being pruned for, as well as changes implemented prior to such propagation. In some instances, such as if one or more duplicate rules had to be created for repeated constructs with different contexts in a target application, it may be useful to assess which rules should reference these newly constructed rules. For such a case, if may be required or otherwise useful to make duplicate rules to correctly use altered rules from a previous operation. To implement this, in some instances, a process similar to altering a first group of top-level rules discussed above may, for example, be used, in whole or in part. Such a process may be repeated recursively through all rules affected until there are no more rules that may need to be changed based on the previous group. Thus, in an implementation, having propagated changes through a given grammar, a BNF grammar pruned for syntactic structures may, for example, be outputted, as referenced generally at 612.

It should be noted that, in some instances, example process 600 may be implemented, in whole or in part, to edit a BNF grammar for variable names, such as in a similar fashion, but rather than covering entire syntactic structures that may need to be fixed for a target application, editing a BNF grammar for variable names may focus on fixing terminal values (e.g., numerical, stings, etc.). For example, here, a target application may be examined, such as to determine whether one or more additional changes for variable naming and/or constants beyond those already made by one or more previous operations may be warranted, such as in manner similar to operation 604 discussed above. Thus, here, applicable Verilog code or instructions may, for example, be analyzed for one or more constants that may be consistent across a number of suitable versions of a target application. Likewise, here, identifying where variables may be replaced by constant values and/or where variable names themselves may be fixed to a certain string, for example, may depend, in whole or in part, on a target application, as was also indicated. Similarly, one or more applicable rules may also be altered, and one or more changes may be propagated through a given grammar, such as in a similar manner, for example, so as to output a BNF grammar pruned for variable names.

As was indicated and will be seen, having one or more syntactical structures and/or variable names built into a grammar itself, such as for use with PonyGE2, for example, may provide advantages, which may include facilitating and/or supporting subsequent randomization of the structures within a particular hardware solution. For example, a grammatical evolution process may be capable of generating a final solution and a grammar-based genetic representation of that solution, such as comprising different rules from a grammar in a hierarchy, which may be advantageously leveraged to identify points where more randomness may be injected to the solution. Having one or more built-in syntactical structures may, for example, transform a more general grammar for the Verilog language to a grammar tailored for creating a particular target functionality, such as an LFSR functionality, as was indicated. As such, here, a grammar itself may, for example, be capable of creating a final solution (e.g., a hardware variant, etc.) for a problem (e.g., a target application, etc.).

Similarly, in some instances, having variable naming built into a grammar may also facilitate and/or support one or more subsequent randomization operations or processes, as will also be seen. For example, in at least one implementation, a grammar may be built in such a way that a particular variable name that may be randomized in the future is a rule with a terminal value that may end up as a leaf node in a derivation tree of a given solution. As will be seen, after a final solution and its representation have been created, these leaf node productions may be targeted, for example, and may be changed to one or more new randomized values. In some instances, this approach may, for example, provide more flexibility by allowing the same solution to be changed into a number of subsequent versions, if suitable or desired, such as without repeating one or more evolutionary runs.

At times, a grammar may, for example, be constructed so that randomization is built into the grammar itself, for example, meaning that one or more variable names that may be targeted may have static terminal values and may be used by the grammar itself, in whole or in part. In some instances, this approach may also provide advantages since no post-processing may be needed or otherwise useful to implement a randomized variable-naming process, for example. In certain simulations or experiments, it has been determined that, at times, it may be useful to change a grammar itself, such as to facilitate and/or support propagation of final variable naming changes to one or more appropriate individuals created from that grammar. Again, particular examples of randomization of a final solution, PonyGE2 run, a grammar-based genetic representation of a final hardware solution in a hierarchy, etc. will be discussed in greater detail below.

Figure 7:
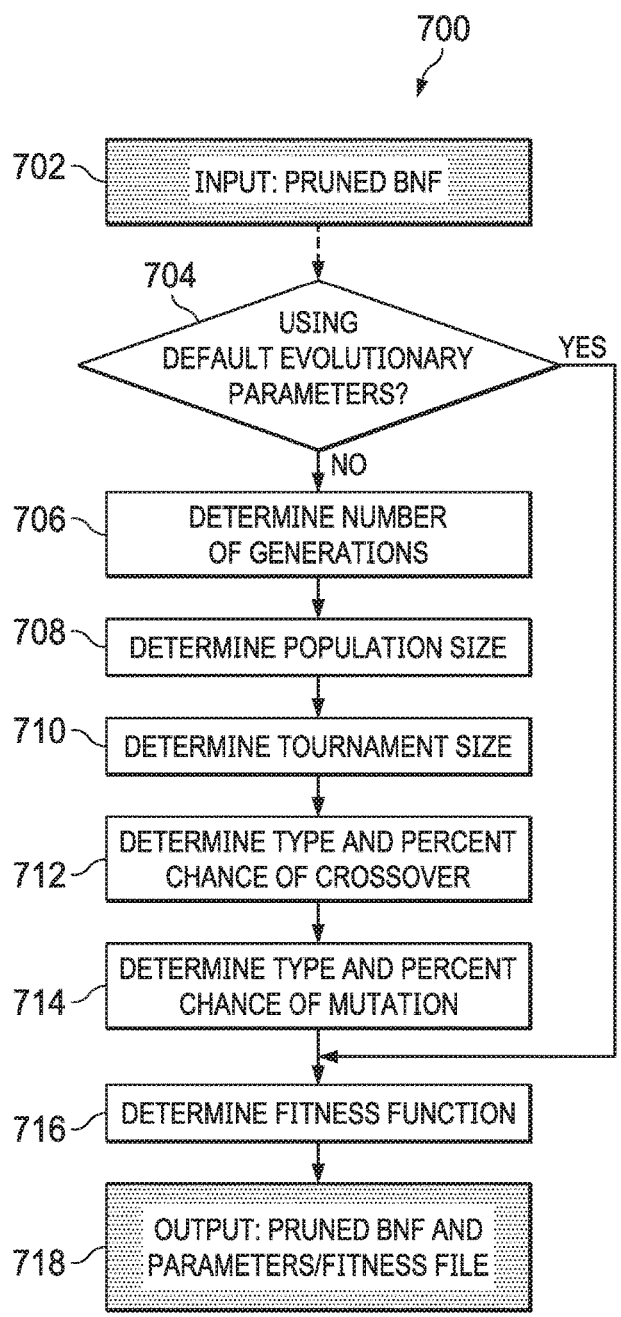
FIG. 7 is a flow diagram illustrating an implementation of an example process for inputting content into a grammatical evolution tool.

Referring now to FIG. 7, which is a flow diagram illustrating an implementation of an example process 700 that may be performed, in whole or in part, to facilitate and/or support one or more operations and/or techniques for feeding or inputting applicable electronic content into a grammatical evolution tool. As was indicated, in some instances, example process 700 may be implemented, at least in part, in connection with operation 222 of FIG. 2B, for example, and applicable content may include, for example, one or more digital signals comprising a subset of a syntactically correct Verilog BNF grammar edited for syntactic structures and/or variable names and tailored to a particular functionality, such as an LFSR functionality, as well as evolutionary criteria to facilitate and/or support grammatical evolution. As was also indicated, in at least one implementation, a grammatical evolution tool may comprise, for example, PonyGE2. Likewise, it should be noted that content acquired or produced, such as, for example, input signals, output signals, operations, results, etc. associated with example process 700 may be represented via one or more digital signals. It should also be appreciated that even though one or more operations are illustrated or described concurrently or with respect to a certain sequence, other sequences or concurrent operations may be employed. In addition, although the description below references particular aspects and/or features illustrated in certain other figures, one or more operations may be performed with other aspects and/or features.

Thus, example process 700 may begin at operation 702, such as utilizing a pruned or edited BNF grammar as input, for example, and may proceed to operation 704 to determine whether one or more default evolutionary parameters may be used herein, at least in part. As discussed above, PonyGE2 is a computing tool designed to enable grammatical evolution for a target language, such as Python, for example, utilizing a BNF style grammar. Typically, PonyGE2 may provide built-in or default parameters, such as via a parameter or configuration file, for example, that may be used, in whole or in part, for a number of evolutionary processing operations or runs. However, in some instances, such as for more effective and/or more efficient utilization of PonyGE2, it may, for example, be desirable or useful to define or tailor one or more evolutionary parameters to a specific task and/or application. For example, as discussed below, in some instances, desired evolutionary criteria and/or parameters may be specified via an input specification, external or otherwise, that may comprise a suitable computer file that may be accessed and/or used, in whole or in part, for one or more particular evolutionary runs. At times, one or more default evolutionary parameters may be employed, in whole or in part, to facilitate and/or support more effective and/or more efficient processing, such as if it is determined (e.g., experimentally, etc.) or otherwise expected that modifying default parameters may result in little or no difference to a particular end goal (e.g., less than statistically significant variation in hardware solutions, etc.), for example.

Thus, if one or more default evolutionary parameters are used, example process 700 may proceed to operation 716 so as to determine and/or define a fitness function, discussed in greater detail below. If no, however, example process 700 may, for example, determine and/or generate appropriate evolutionary parameters, such as part of generating specification criteria that may comprise a suitable computer file, as was indicated (e.g., file 224 of FIG. 2B, etc.). For example, example process 700 may proceed to operation 706, such as to determine and/or define a number of generations or evolutionary cycles. Typically, in the context of grammatical evolution, a "generation" refers to a specific processing step in an evolutionary population, in which individual solutions or simply "individuals" in the population undergo change, such as via crossover and/or mutation. Thus, an important or useful parameter of a grammatical evolutionary process may include, for example, a maximum number of generations processed before a final solution may be decided. During grammatical evolution, individuals of an evolutionary population may, for example, be evaluated based, at least in part, on their acceptability and/or suitability, such as via a fitness function score, also discussed in greater detail below. In this context, an "evolutionary population" or simply "population" refers to a set of individual solutions. Thus, in some instances, it may, for example, be useful to determine or establish a threshold at which an individual solution may have a fitness value or score that may be considered "good enough," such as sufficiently fit to be considered acceptable to comprise or represent a particular solution to a given problem.

Continuing with the above discussion, in some instances, such as without a maximum or otherwise sufficient number of generations, for example, it may be possible for a run of grammatical evolution to continue indefinitely. For example, sometimes a fitness value target may be too extreme, or a fitness function may not accurately capture a value of individuals. Thus, at times, it may be useful to determine and/or set a number of generations so as to allow for an adequate number of iterations of evolutionary cycles to achieve a particular solution, for example, but not so many that a grammatical evolution process may become unduly cumbersome, lengthy, and/or inefficient. Thus, in at least one simulation or experiment, it has been determined that a threshold value of 20 generations may be "good enough" or otherwise sufficient to facilitate and/or support creating a suitable or sufficient number of hardware solutions with an appropriate or otherwise suitable distribution of randomness, such as via associated APRSGs, as was indicated.

At operation 708, a population size may, for example, be determined. For example, as will be seen, one or more crossover, mutation, and/or selection operations may be carried out between individuals of a single population so that a number of individuals in any population may be capable of making a substantial or sufficient difference in a grammatical evolution process. To illustrate, having too few individuals in a population may decrease an amount of genetic diversity, which, in turn, may limit coverage of a search space, for example. However, a larger population may take substantially more computing resources and/or processing power, for example, and/or may introduce outliers of genetic information that may not be useful to a grammatical evolution process. Thus, in one particular simulation or experiment, it has been determined that a population size of 50 may be useful or otherwise sufficient to create suitable or acceptable variability between APRSGs on an IoT scale.

With regard to operation 710, a tournament size may, for example, be determined, such as for selecting individual candidates via a tournament selection approach. In this context, "selection" refers to a process where individuals in a current population are chosen to be starting parents for one or more subsequent generations. A "tournament selection" refers to a process in which more fit or fittest individuals from a current generation are selected via a tournament that is run between a group of individuals of a particular size (e.g., a tournament size). As such, a "tournament size" refers to a number of individuals in a particular tournament. A tournament selection approach, thus, may randomly select tournament size individuals from an overall population, for example, and may return the best or otherwise suitable individuals as winners of that tournament, such as for subsequent crossover and/or mutation. In this context, "crossover" refers to a process of creating new individuals by combining features of other individuals, and "mutation" refers to a process that stochastically changes specific features (e.g., individual bits, etc.) within individuals. Particular examples of crossover and mutation will be discussed in greater detail below. In some instances, a size of a tournament may affect speed and/or a selection quality of individuals. For example, increasing tournament size may increase an amount of computing and/or processing power a particular selection process may utilize, but may lessen a probability that weaker or less than suitable individuals may have their genotype selected and represented in the next generation. Thus, by way of example but not limitation, in certain simulations or experiments, it has been observed that, to create more suitable or otherwise acceptable variability between APRSGs, it may, for example, be useful to employ binary tournaments. Thus, in at least one implementation, a tournament size of 2 may be used, such as via comparing pairs of individuals and selecting the best of the two, for example.

According to an implementation, having determined a tournament size, example process 700 may, for example, proceed to operation 712, such as to determine a type and percent chance of crossover. As was indicated, in at least one implementation, a crossover process may, for example, randomly select one or more pairs of parents from a parent population created by an appropriate selection process. Here, unlike in a typical genetic evolution process, crossover may produce, for example, two children from these two parents. Crossover may operate over an entire parent population, for example, rather than on a specified percentage of that population, and may continue until generation-size children have been created. For example, crossover may take two individuals, split their genomes into sections at one or two locations, and may exchange sections of their genomes with one another. In this context, a "genome" refers to a content structure governing which production rules in a BNF grammar definition to be used to implement their mapping to an executable computer program written in a particular programming language. A genome may comprise, for example, a variable length binary string, a non-negative integer array, etc., may specify an order of constructing a derivation tree, and/or the like. As another crossover-related example, for two individuals of the same genome length, implementing fixed one-point crossover between them with the point of crossover being at the half-way point in the genome, for example, may result in two new individuals with each having half their genome from one parent and the other half from the other parent. Thus, in some instances, given two individuals, fixed one-point crossover may, for example, create two children by selecting the same point on both genomes for crossover to occur, meaning that genomes may remain of the same length after crossover.

A type of crossover (e.g., fixed two-point, variable one-point, variable two-point) may depend, at least in part, on a particular implementation, application, functionality, or the like. For example, in a particular simulation or experiment, variable one-point crossover was used. Thus, given two individuals, variable one-point crossover may, for example, be able to create two children by selecting a different point on each genome for crossover to occur. To illustrate, in some instances, a head of genome 0 may be combined with a tail of genome 1, for example, and a head of genome 1 may be combined with a tail of genome 0. In some instances, this may, for example, allow genomes to grow or shrink in length.

Continuing with the above discussion, in this context, a "percent chance of crossover" refers to a likelihood or probability that two selected individuals will have a crossover process applied to them in order to create two other individuals. Thus, a higher percent chance of crossover may mean, for example, that less parents will remain unchanged in the next generation. A percent chance of crossover may be defined or set via a suitable signal sample value and may depend, at least in part, on a particular implementation, application, functionality, or the like. At times, it may be useful to set this value relatively high so as to encourage genetic diversity in a population, such as for a higher exploratory capability, for example. For example, in a particular simulation or experiment, a value for a percent chance of crossover of 75% was used, such as for discovering "good enough" or otherwise suitable solutions in order to facilitate and/or support a sufficient or otherwise suitable distribution of randomness across a given number of APRSGs comprising IoT-type devices.

Example process 700 may then proceed to operation 714, such as to determine a type and percent chance of mutation. As was indicated, in the context of grammatical evolution, "mutation" refers to a process of making a random change to a single individual. As was also discussed, while crossover operates on pairs of selected parents to produce new children, mutation operates on an individual in a child population, for example, and/or, in some instances, after crossover has been applied. Thus, at times, mutation may be dependent, at least in part, on grammatical or like (e.g., application-specific, etc.) context in which it is being used. Since mutation is random, in some instances, it may be possible to create so-called "invalid" or less than suitable individuals, such as individuals that may not undergo a complete mapping to a set of terminals (e.g., an incomplete mapping, etc.). To address this (e.g., ensure that individuals may result in a valid program, etc.), at least in part, it may be useful to specify, such as via an appropriate input parameter, for example, that no invalid individuals are allowed. In certain simulations or experiments, it has also been observed that, at times, disabling a mutation operation, at least in part, may reduce computation and/or processing time, for example, while still ensuring that individuals created via grammatical evolution may not be invalid.

In a particular implementation, mutation may be implemented, in whole or in part, via making a particular change to an individual, such as, for example, via applying one or more so-called "mutation events" to an individual so as to change its genotype and/or phenotype in a suitable or desirable way. For purposes of explanation, a "mutation event" refers to a particular process and/or sub-process that facilitates and/or supports a mutation operation. These or like events may, for example, be stochastic in nature since they may rely on directed randomness, such as to facilitate and/or support evolutionary dynamics while advancing towards a desired or suitable goal. As was indicated, in the context of grammatical evolution, a genotype typically comprises an ordered list or array of bit strings (e.g., integer numbers, etc.) that may be coded for selecting rules from a given grammar, for example, and a phenotype may comprise its expression. It should be noted that mutation, even in smaller step sizes, may significantly change a phenotype (e.g., final code, etc.) behavior, for example, so a particular approach may depend, at least in part, on a target application, implementation, functionality, or the like. In some instances, one or more mutation events may be categorized as structural, such as those altering the length of a phenotype, for example, or nodal, such as those altering a value at a node of an applicable derivation tree, or any combination thereof. At times, nodal mutation may be capable of exploiting an existing solution, such as to maximize a fitness from it, for example, and structural mutation may be capable of more fully exploring a search space. Thus, if mutation is implemented, to facilitate and/or support one or more operations and/or techniques for creating and/or enhancing hardware obscurity via one or more randomization points, it may be useful to keep an applicable mutation parameter value or operator at a lower range, such as approximately between 5 and 10%, for example.

In an implementation, at operation 716, a suitable fitness function may, for example, be determined or defined. Typically, a "fitness function" refers to an objective or like function or process capable of evaluating how close a given result is to an optimum solution of a desired problem. For example, a fitness function may define or determine how effective a final output is, such as via computing or assigning a fitness value or score to the output. In the context of grammatical evolution, a fitness function may, for example, be used, in whole or in part, to select more fit individuals for inclusion in future populations. A fitness function may evaluate individuals against their designated task, for example, and may compute or assign a fitness value or score based, at least in part, on their performance. If a suitable or particular score is achieved (e.g., a score may be high for accuracy, but low for error, etc.), a grammatical evolution process may be considered to be complete. As such, in some instances, a fitness function may, for example, be used, at least in part, to evaluate and/or determine a best (e.g., optimum, etc.) or otherwise suitable individual solution from an applicable population.

As indicated above, in some instances, a target application may, for example, be defined to focus on a particular desired functionality, such as creating hardware variants of an LFRS in Verilog, just to illustrate one particular implementation. Thus, at times, instead of trying to achieve a certain behavioral goal and comparing results with other individual solutions against that goal (e.g., as in genetic evolution, etc.), a fitness function may be defined to focus on a particular desired functionality, such as, for example, creating a variety of LFSRs that may behave as expected but have sufficiently different patterns of behavior inherent to them. In some instances, a fitness function may also be defined, at least in part, to account for particular aspects of optimization search space, such as via one or more syntactical and/or variable naming constraints, for example, so as to facilitate and/or support providing or injecting appropriate context for a target application. As such, in at least one implementation, a fitness function may be defined more narrowly, such as aimed to generate an optimal or sufficient solution as well as a grammar-based genetic representation of that solution (e.g., a rules hierarchy, etc.), for example, so as to encourage expected LFSR behavior (e.g., via a higher score), to avoid (e.g., via a lower score or penalty, etc.) LFSRs that may devolve into incorrect and/or undesirable behavior, or the like. Some instances of such behavior may include, for example, outputting simple and/or predictable design patterns, which may be detrimental to security of associated IoT-type devices, as was indicated. In some instances, such as if a given grammar is being used more as a constraint to generate a solution of a specific form, for example, such as with little or no optimization of an output based on one or more constraints, then a fitness function may have less relevancy. Thus, at times, an output, regardless of its theoretical fitness, may comprise a valid solution, for example, and, as such, may be sufficient for creating a suitable version of a solution to a problem.

In a particular simulation or experiment, to evaluate for a particular desired functionality, such as whether an LFSR has a prescribed or suitable behavior, for example, a particular individual was simulated to generate approximately 1,000 numbers while a running average of a new addition to the entire number was run. Here, it has been observed that it may, for example, be desirable if a seed generator outputs approximately 50% of Zeroes and 50% of Ones. However, since achieving this output ratio consistently may be difficult or not be feasible, it has been determined that it may, for example, be useful for a fitness function to assign to an individual a fitness score of 100 if a plot of its numbers showed between 45% and 55% of Ones for the last 500 numbers in the run. Further, it has also been determined that it may be useful for a fitness function to assign to an individual a fitness score of Zero if a plot strayed out of the above margin for the same segment of outputs, for example. As such, in at least one simulation or experiment, a fitness function was defined to produce fitness scores utilizing the above approach, such as to facilitate and/or support promoting individuals that may be more fit in terms of representing an LFSR functionality. By way of example but not limitation, an implementation of an example fitness function 1500 that was determined or defined in connection with a particular simulation or experiment is illustrated in FIGS. 15A-15D.

As further illustrated at 718, in an implementation, example process 700 may terminate and may, for example, make available defined evolutionary criteria, such as via an associated specification comprising a suitable computer file, as was indicated, as well as outputted syntactically correct Verilog code or instructions (e.g., BNF grammar 228 of FIG. 2B, etc.), such as pruned or tailored to implement a desired functionality (e.g., an LFSR functionality, etc.), as input to PonyGE2 for further processing (e.g., at operation 230 of FIG. 2B, etc.). By way of another non-limiting example, a particular implementation of an example input specification 1000 comprising defined evolutionary criteria that were generated and/or used, at least in part, in connection with at least one simulation or experiment is illustrated in FIG. 16.

Figure 8A:
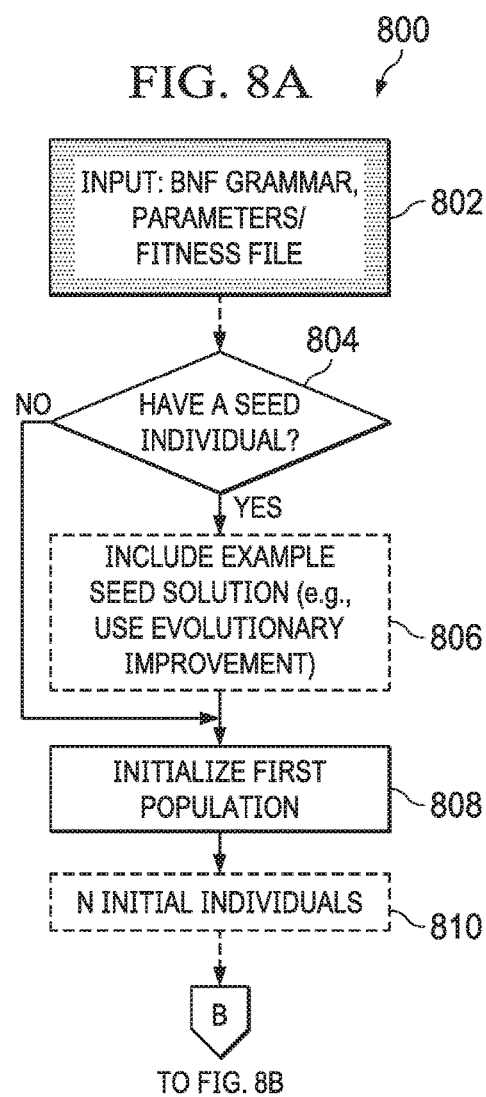
FIGS. 8A-8B is a flow diagram illustrating an implementation of an example process for grammatically evolving generations of individual hardware solutions.
Figure 8B:
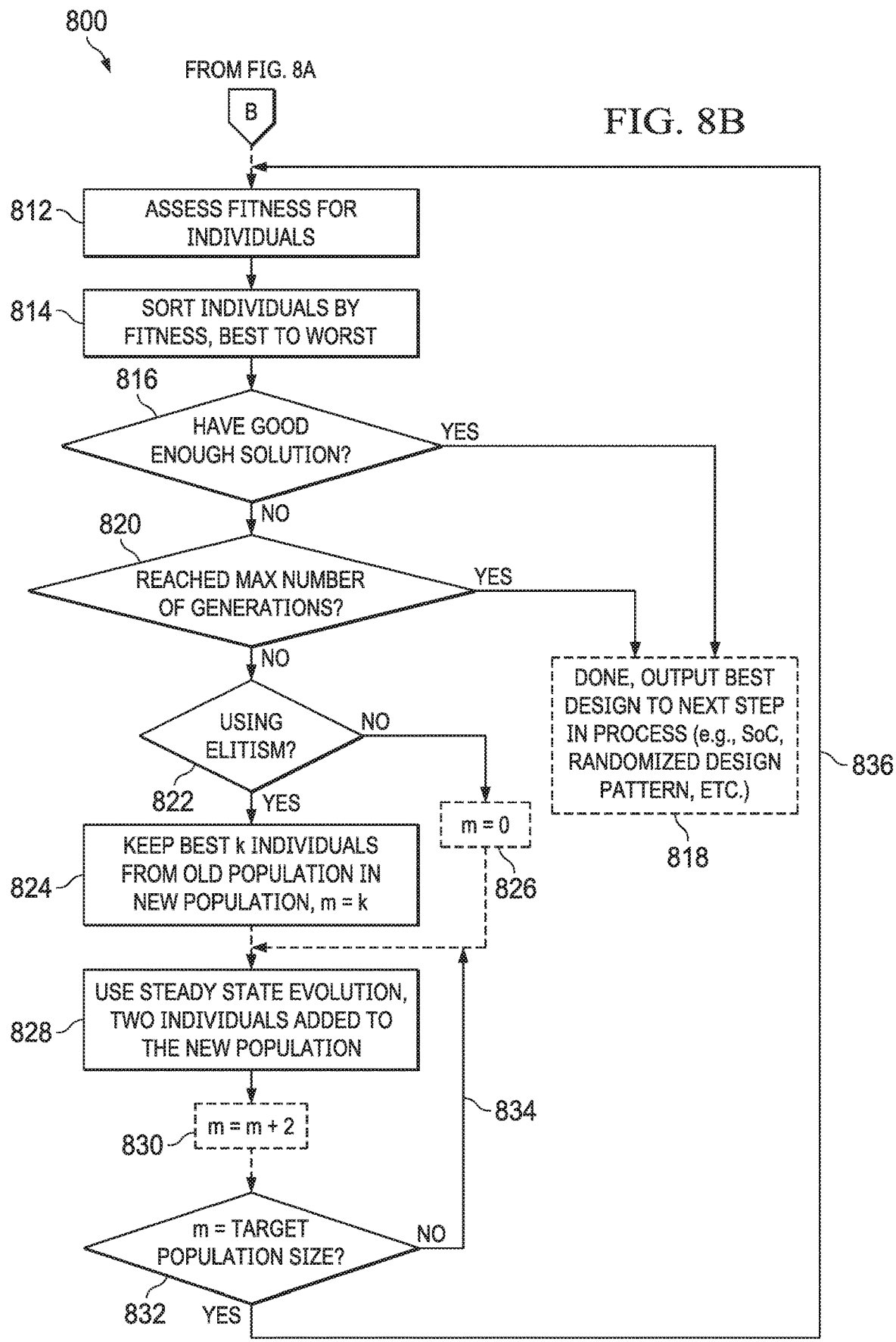

Continuing with the above discussion, FIGS. 8A and 8B are flow diagrams illustrating an implementation of an example process 800 that may be performed, in whole or in part, to grammatically evolve one or more suitable generations of individuals, such as to facilitate and/or support one or more operations and/or techniques for creating and/or enhancing hardware obscurity via one or more randomization points, such as for use in and/or with embedded computing devices, which may include, for example, IoT-type devices. As was indicated, in some instances, example process 800 may, for example, be implemented, at least in part, in connection with operation 230 of FIG. 2B. As was also discussed, here, a suitable grammatical evolution tool, such as PonyGE2, for example, may be utilized, in whole or in part, to select the "best" or otherwise suitable individuals based, at least in part, on a particular input. As was also indicated, in some instances, an input may comprise, for example, a syntactically correct BNF grammar, such as pruned or edited for syntactic structures and/or variable names (e.g., tailored Verilog code, etc.), such as supplied with defined evolutionary parameters and a fitness function, as discussed above. As also discussed, in some instances, selection to create a randomized individual may be implemented, at least in part, by choosing parents via binary tournaments, for example. Likewise, it should be noted that content acquired or produced, such as, for example, input signals, output signals, operations, results, etc. associated with example process 800 may be represented via one or more digital signals. It should also be appreciated that even though one or more operations are illustrated or described concurrently or with respect to a certain sequence, other sequences or concurrent operations may be employed. In addition, although the description below references particular aspects and/or features illustrated in certain other figures, one or more operations may be performed with other aspects and/or features.

Thus, as illustrated in FIG. 8A, in an implementation, example process 800 may begin at operation 802, for example, at which a suitable BNF grammar, one or more evolutionary parameters, and/or fitness function may be used, in whole or in part, as input, such as via one or more suitable files (e.g., parameter or configuration file 224 of FIG. 2B, fitness function file, etc.). Example process 800 may then proceed to operation 804, such as to determine if a seed individual has been provided, for example. In this context, a "seed individual" for a given problem refers to a possible, but, in some instances, suboptimal, solution to such a problem. As a way of explanation, if a seed individual has not been provided, for example, then an initial population may be created entirely from a given grammar. If a seed individual has been provided, however, then an initial population may, for example, be created by mutating from such a seed individual. In some instances, limiting a search space, such as via seeding a solution space with domain-specific knowledge (e.g., a seed individual), for example, may facilitate and/or support desirable behavior or design goal (e.g., behavior inherent to LFSRs, creating and/or adding randomness, etc.), such as via one or more evolutionary improvements.

Thus, continuing with the above discussion, in an implementation, if no seed individual is provided, example process 800 may, for example, proceed to operation 808, such as to initialize a first (e.g., initial) population, discussed below. If yes, however, example process 800 may include a particular solution, such as provided via a seed individual, for example, into an initialization process, as referenced generally at 806. For example, a provided seed solution may be used, in whole or in part, as an example for a particular desired solution (e.g., targeted example code, etc.). As such, in some instances, one or more grammatical evolution operations (e.g., PonyGE2 runs, etc.) may be implemented, at least in part, via mutating from a particular seed solution, such as via an evolutionary improvement, for example, rather than randomly initializing a first or initial population using a given grammar.

Thus, as illustrated, at operation 808, a first or initial population may, for example, be initialized. As alluded to previously, typically, in this context, "initialization" refers to a process of seeding a solution space with domain-specific knowledge, such as, for example, via populating a first or initial population with a number of appropriate and/or desired solutions. As a way of illustration, depending on an implementation, a first population may be initialized via generating a genome, also called random genome initialization, for example, or via generating a derivation tree, though other suitable approaches may be employed herein, in whole or in part. For purposes of explanation, random genome initialization may be implemented, in whole or in part, via generating one or more random genome strings, such as, for example, in the form of random strings of integers, just to illustrate one possible implementation. Further, initialization via a derivation tree generation may be implemented, in whole or in part, via building derivation trees, such as up to a specified maximum initialization depth limit, for example. In certain simulations or experiments, to initialize a first population, a random genome initialization approach was used, at least in part. More specifically, genome paths in a tailored Verilog grammar were randomly followed, such as to create N initial individual solutions, referenced generally at 810. By way of example but not limitation, initial individual solutions may be in the range between 5 and 10,000, which may depend, at least in part, on a particular implementation, application, design flow, grammar, functionality, or the like. In certain simulations or experiments, 500 to 1,000 initial individual solutions were created, though, again, claimed subject matter is not so limited.

Referring now to FIG. 8B, as illustrated, example process 800 may, for example, continue at operation 812, such as to access or obtain a fitness function for initial individual solutions. For example, as was indicated, a fitness function may be accessed or obtained electronically, such as via a particular file storing such a fitness function as one or more digital signals and/or states (e.g., file 224 of FIG. 2B, fitness function file, etc.). In some instances, a fitness function defined in connection with creating one or more specification criteria, such as discussed above, may be used herein, in whole or in part. Thus, a fitness function may evaluate a particular individual solution, for example, and may compute and/or assign a fitness value for such a solution, as was also discussed above.

With regard to operation 814, individual solutions may, for example, be sorted by their fitness, such as via a fitness function. For example, in at least one implementation, sorting individual solutions may include ranking such solutions, such as from best to worst. In some instances, this may facilitate and/or support maintaining a constant differential between the best and worst individuals, for example, while outliers may still be promoted, but may not dominate. Here, a number of approaches may be utilized, in whole or in part, which may depend on a nature of a fitness function. For example, if a fitness function is formulated as an error metric, then the lower the score, the better the individual solution. As another example, if a fitness function is formulated as an accuracy metric against some benchmark, for example, then the higher the score, the better the individual solution. In one particular simulation or experiment, a fitness function capable of facilitating and/or supporting a repeated generation of random numbers without converging to a repeating value (e.g., Zero, etc.) was used, such as to sort and/or rank individual solutions, meaning that the best or otherwise more suitable individuals may produce outcome values in the 45-50% range of Zeroes and Ones.

According to an implementation, example process 800 may proceed to operation 816 to determine whether a particular individual solution may be considered a "good enough" or otherwise suitable solution, such as for a target application. As was indicated, in at least one implementation, a target application may comprise generating a suitable number of hardware solutions for embedded computing devices, which may include IoT-type devices operating in resource constrained or like environments, for example, with sufficient or otherwise suitable distribution of randomness and/or having design patterns that may be more difficult to exploit by malicious parties. Thus, to facilitate and/or support such a determination, in some instances, a best individual solution, such as ranked in connection with operation 814, for example, may be compared against a suitable fitness threshold. For example, such a threshold may be determined and/or set experimentally and/or predefined, such as via a value indicating a number of candidate solutions that do not converge after continuous execution to a default value, meaning that they continue to produce unique numbers.

If it is determined that a best individual solution may be considered a "good enough" or otherwise suitable solution, such as via comparing a fitness value of such an individual against a fitness threshold, for example, example process 800 may terminate, as referenced generally at 818. For example, in certain simulations or experiments, such an evaluation was stopped once values produced fell within a 45-50% range of Zeroes and Ones and did not converge to a specific value after being executed multiple times, which may be representative of and/or considered to be a "best" design (e.g., a "good enough" solution, etc.). As also seen, a particular "good enough" or otherwise suitable solution representative of a "best" design may, for example, be outputted to an appropriate SoC, circuit, or like design flow. As discussed above, such a design may comprise and/or be part of a particular IoT-type device that may, for example, be capable of generating suitable random start-state initialization numbers and/or having a design pattern that may be more difficult to exploit by a malicious party.

In some instances, an evaluation with respect to a "good enough" or otherwise suitable solution, as discussed above, may also be stopped if, for example, a maximum number of generations is reached, as referenced via operation 820. Here, a maximum number of generations may be determined and/or set experimentally and/or predefined, which may depend, at least in part, on a particular application, design, goal, functionality, or the like. By way of example but not limitation, in certain simulations or experiments, it has been determined that a maximum number of generations between 20 and 50 may prove beneficial, such as to facilitate and/or support creating and/or enhancing hardware obscurity for a more secure deployment and/or operation of embedded computing devices including, for example, IoT-type devices operating in resource constrained or like environments.

Likewise, if yes, example process 800 may terminate, such as, for example, in connection with outputting a particular sufficiently randomized solution representative of a "best" design to an appropriate SoC, circuit, or like design flow, as discussed above. If no, however, such as if it is determined that a maximum number of generations has not yet been reached, such as utilizing an approach discussed above, example process 800 may proceed to operation 822, such as, for example, to determine whether elitism is used. For purposes of explanation, in this context, "elitism" refers to an evolutionary selection process in which best individuals in a parent population are copied over unchanged to a next generation. As such, in some instances, elitism may facilitate and/or support continuity of a best or suitable solution at particular stages through an evolutionary process, such as via keeping strongest or desirable entities in a population, for example, and may allow for a best or suitable solution to be updated at a particular generation. If elitism is used, best k individuals from a previous population may be retained in a new population, for example, and a target number of individuals minus the k number of elite individuals may be created during the rest of the evolutionary process for that generation. As such, at times, elitism may, for example, increase a probability or likelihood that a suitable aspect or attribute (e.g., an LFSR functionality, etc.) for a final solution may remain in a gene pool during an applicable or appropriate number of generation cycles.

Thus, in some instances, it may, for example, be useful to use elitism if certain aspects or attributes of a particular solution may be integral to or useful for a final solution so that these aspects or attributes will not be lost during an evolutionary process. As discussed below, at times, an elitist strategy may be implemented, at least in part, in conjunction with so-called "steady state" grammatical evolution, in which two individuals may be changed per generation, which, at times, may facilitate and/or support reaching a near-optimal or otherwise suitable result. For example, in such a case, a number of individuals may be selected, a crossover and/or mutation operation may be performed upon them, and an offspring may be returned directly into a population, such as replacing less fit individuals. In a tournament selection discussed above, a choice of individuals to be replaced may be limited to a member of a tournament, for example, and a selection process may also be probabilistically biased towards less fit individuals. On the other hand, if an elitist strategy is not employed, a completely random next generation may, for example, be generated. Thus, a decision whether to use elitism may, for example, be based, at least in part, on an evaluation of how much an evolutionary process may benefit from keeping particular individuals in a population, such as individuals that are considered to be "best," "very good," "good enough," or the like. In some instances, such an evaluation may, for example, be implemented, in whole or in part, via ranking individuals according to their respective fitness values, such as in connection with a fitness evaluation discussed above.

Thus, continuing with the above discussion, if elitism is used, example process 800 may, for example, keep the best k individuals from a previous population in a new population (e.g., m=k, where m denotes a total new population number), as referenced generally at 824. A number of such individuals may depend, at least in part, on a particular target application, implementation, functionality, or the like. For example, in certain simulations or experiments, between 5% and 10% of an entire population were kept as the best k individuals. Subsequently, example process 800 may proceed to operation 828, such as, for example, to maintain the best k individuals via a steady state evolutionary approach, as will be seen. If no elitism is used, however, no individuals from a previous generation may, for example, be copied to or included in the next generation (e.g., m=0, where m denotes a total new population number), as referenced generally at 826.

As was indicated, at operation 828, a steady state evolutionary approach or replacement may, for example, be implemented, in whole or in part. In this context, a "steady state" refers to a generational replacement or replication process in which individuals are evolved within a population, rather than via creating a completely new generation of a population. Thus, in at least one implementation, a steady state version of a tournament selection approach for selecting individuals to go through a crossover operator may, for example, be used, at least in part, or otherwise considered. For example, each tournament cycle may select from a few individuals an individual with a highest or otherwise suitable fitness value. After two tournaments are complete, winners from these tournaments may take part in a crossover operation, for example. In the case of one-point crossover discussed above, a single point may, for example, be chosen in both individuals, each individual may be split at that point, and two new individuals may be created, each with the beginning sequence of one parent and the end sequence of the other. Thus, every round of this tournament selection process may, for example, increase a size of a new population by 2 (e.g., m=m+2, where m denotes a total new population number), as referenced generally at 830.

In some instances, as illustrated via a loop at 834, this process may iterate until, for example, a target population size specified by input parameters for the PonyGE2 tool, as discussed above, is reached, as represented herein via a decision operation at 832. Thus, if a target population size has been reached (e.g., m=target population size, where m denotes a total new population number), as referenced via a loop at 836, example process 800 may return to operation 812, such as to access a fitness function, for example, and evaluate individuals for the end condition of an evolutionary process, among other processes. For example, individuals may be sorted by fitness, a determination regarding a "good enough" or otherwise suitable solution may be made, etc., such as in a manner discussed above in connection with operations 812-832, as appropriate and/or applicable.

Figure 9:
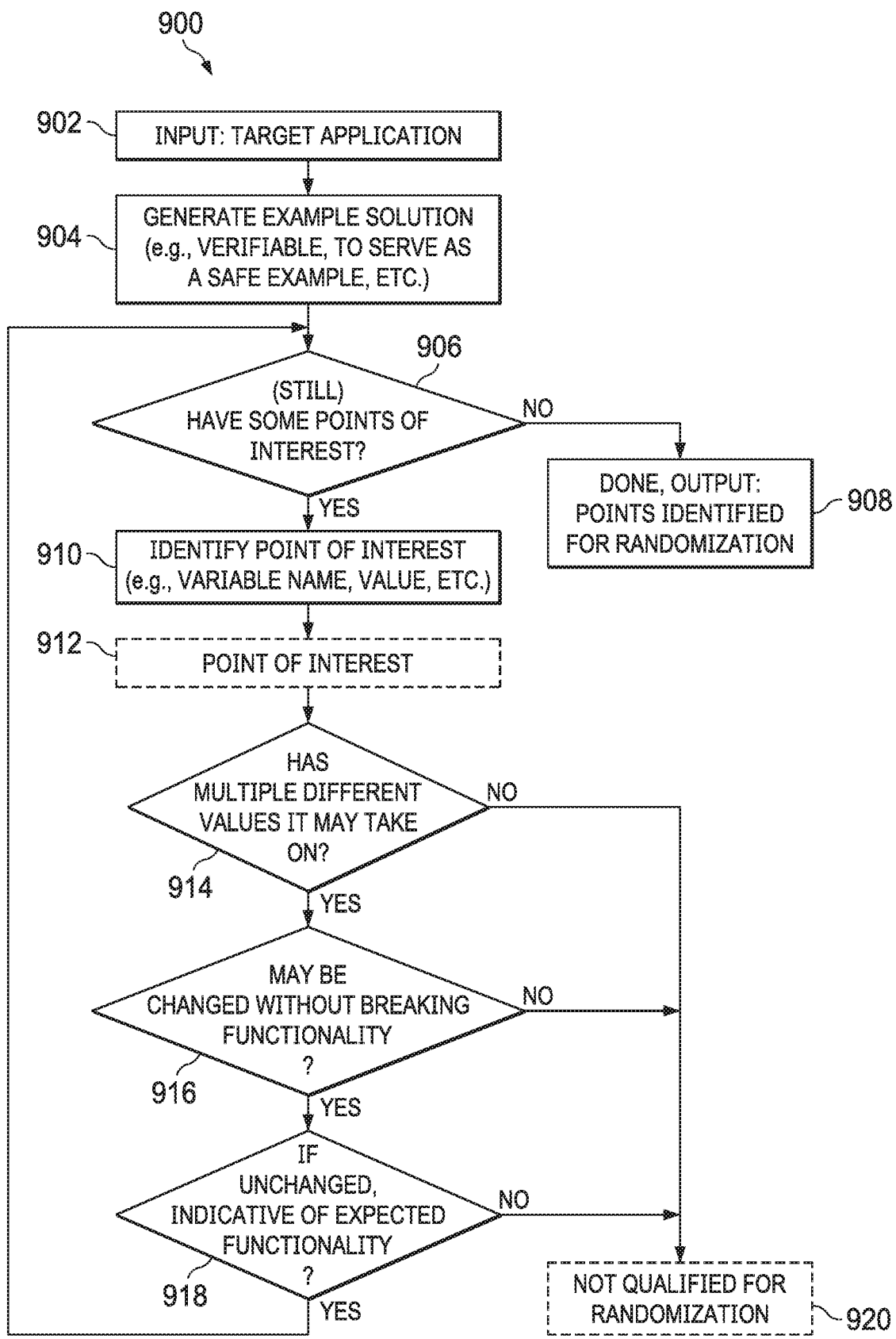
FIG. 9 is a flow diagram illustrating an implementation of an example process for identifying randomization points.

Referring now to FIG. 9, which is a flow diagram illustrating an implementation of an example process 900 that may be performed, in whole or in part, to facilitate and/or support one or more operations and/or techniques for identifying one or more randomization points. As was indicated, in some instances, example process 900 may be implemented, at least in part, in connection with operation 234 of FIG. 2B, for example. Similarly, it should be noted that content acquired or produced, such as, for example, input signals, output signals, operations, results, etc. associated with example process 900 may be represented via one or more digital signals. It should also be appreciated that even though one or more operations are illustrated or described concurrently or with respect to a certain sequence, other sequences or concurrent operations may be employed. In addition, although the description below references particular aspects and/or features illustrated in certain other figures, one or more operations may be performed with other aspects and/or features.

Thus, as referenced generally at 902, example process 900 may, for example, begin with determining or defining a target application, such as to be used as input. For example, as was indicated, a target application may depend, at least in part, on a nature of a problem to be solved. As was also discussed, in at least one implementation, a target application may comprise, for example, generating a suitable number of hardware solutions for embedded computing devices (e.g., IoT-type devices, etc.) with sufficient or otherwise suitable distribution of randomness. At times, determining or defining a target application may include, for example, obtaining an appropriate grammar, such as capable of facilitating and/or supporting generation of a suitable number of hardware solutions having corresponding design patterns that may be implicitly difficult to decipher or comprehend. Thus, here, a target application may, for example, be determined or defined using one or more approaches discussed above and may depend, at least in part, on a desired functionality (e.g., LFSR, etc.), SoC, design goal, design flow, or the like.

Continuing with example process 900, at operation 904, an example solution may, for example, be generated. In should be noted that, at times, it may be useful to verify that an example solution may be capable of functioning as intended, such as for a target application defined or determined at operation 902, for example, using one or more appropriate techniques, which may include those discussed above (e.g., post-processing steps within a script, unit tests, etc.). Thus, in some instances, such a verifiable solution may be used, in whole or in part, or serve as a "safe" example, such as a solution to a precise problem that may not solve and/or attempt to solve a different problem, for example, but has been verified to follow a correct and/or expected pattern of behavior for a target application. As was indicated, in at least one implementation, there are may be two primary outputs that may comprise a particular hardware variant, namely, a final solution and its grammar-based genetic representation, such as generated and/or implemented via a grammatical evolution process or run in connection with PonyGE2, for example. As discussed above, in some instances, a final solution may comprise, for example, syntactically correct Verilog code or instructions tailored to implement an LFSR functionality, just to illustrate one possible implementation. At times, a grammar-based genetic representation of that solution may comprise, for example, a hierarchy in the form of a derivation tree derived from appropriate Verilog grammar rules in a specified grammar, such as in connection with one or more evolutionary runs (e.g., via PonyGE2, etc.), as was indicated.

As was also discussed, a grammar may comprise, for example, a top-level rule or module that may act or serve as a base for appropriate elements that may adhere to that grammar, such as a root node of a tree. In at least one implementation, a given solution for that grammar may include this root node, for example, and may continue in a tree structure where a particular internal node of an associated tree comprises a rule/production and associated leaves comprise terminal values. Thus, an evolutionary tool, such as PonyGE2 may be capable to successfully implement a tree sequence for a particular solution given in an evolutionary run, for example, and may facilitate and/or support generation of an example solution, such as in the form of a raw derivation tree for a given grammar. As such, in some instances, a tree sequence and a derivation tree along with a given grammar may, for example, be used, at least in part, to arrive at or implement a tree representation of an applicable solution. By way of example but not limitation, an implementation of an example grammar, example solution, and example derivation tree that were generated in connection with a particular simulation or experiment are illustrated in FIG. 13.

As illustrated at 906, a decision may, for example, be made to determine whether a solution may be suitable for randomization. For example, a solution may be analyzed and/or processed so as to determine whether the solution comprises one or more points of interest, such as places or elements where randomness may be injected in order to make an associated design pattern harder to manipulate by malicious parties, as was indicated. Here, it may be determined whether a solution comprises one or more rules that have a single constant value, for example, since these rules may be good or otherwise suitable candidates for adding randomness, such as by changing the constant value in question to a different, randomly generated constant value. In some instances, this approach may, for example, be particularly useful for rules that were added constraints on variable naming, as was indicated. In some instances, it may, for example, be useful to assess whether one or more points of interest may be changeable without changing end behavior of a given solution. At times, a solution may also be analyzed and/or processed so as to determine whether a fixed value in the solution may take on one or more different values, for example, such as without changing end behavior outside a specification, which may also be indicative of a point of interest. If no, example process 900 may output one or more points of interest, such as from one or more prior iterations, for example, if applicable, as referenced generally at 908, so as to make appropriate randomization changes in a solution, as discussed below.

If yes, however, example process 900 may proceed to operation 910, for example, so as to identify a particular point of interest within a given solution. For example, here, example process 900 may identify a particular variable name, value, module, etc., such as to determine whether that variable name, value, module name, etc. may be capable of being randomized (e.g., qualify for randomization, etc.), as discussed below. Typically, although not necessarily, variable names may, for example, be used for randomization, in whole or in part, as long as places where these variable names are used share the same randomized names as not to change the end functionality of a given solution, as was indicated. With respect to module names and/or other static naming conventions, in some instances, these may also be randomized or changed, for example, as long as other modules that use those names match with a changed value, such as, again, to avoid changing a behavior of a final hardware solution from an original. For changes made to variable or module names, at times, it may, for example, be useful to account for constraints of a particular computer language being used. As discussed above, certain computer languages may have stricter syntax rules for what can and can't be used as variable names, for example, and, in some instances, may have reserved words that cannot be used. As such, it may be useful, for example, to account for these or like constraints upon making randomized changes. It should be noted that, in such a case, a solution may not be capable of being completely randomized, for example, but may be capable of partial or substantial randomization within a certain domain of constraints, which may be suitable or sufficient, such as for a particular target application. Thus, as referenced at 912, according to an implementation, based, at least in part, on one or more approaches described above, a particular point of interest may, for example, be selected.

With respect to operation 914, a decision may, for example, be made to determine whether a particular point of interest may be capable of taking on multiple different values. For example, in certain simulations or experiments, it has been observed that if there are a variety of patterns that a final solution may take, then the patterns may act as options within a grammatical evolution process. To illustrate, using an LFRS as an example, typically, although not necessarily, values assigned by an LFSR may take on exclusive ORs (XORs) of 2 or 4 values, for example, such as depending on a particular pattern chosen. As was indicated, at times, this may advantageously increase a number of possible final solutions for solutions of interest, such as LFSR solutions, for example. In some instances, to find such a point of interest, it may, for example, be useful to generate one or more base examples that are verifiable for a problem at hand and exemplify different patterns that a solution may take. These differences in patterns may then be translated into a Backus Naur Grammar (BNG) grammar option within a single rule, such as via taking domain knowledge of a problem and solution at hand in order to create a suitable grammar and/or fitness criteria, for example. Again, a particular approach may depend, at least in part, on a target application, functionality, design goal, etc. If no, meaning that if a particular point of interest cannot take on multiple different values (e.g., a value cannot be changed to a new randomized value, etc.), for example, then it may be determined that this point of interest is not qualified for randomization, and example process 900 may terminate, as referenced generally at 920.

If yes, however, it may be determined, for example, whether a particular randomization point chosen may have little or no effect on an expected functionality or behavior of a final solution, as referenced via a decision operation at 916. Here, one or more suitable approaches may be used, in whole or in part. For example, as discussed above, as long as a grammar used to create a tailored solution for a target application may be capable of creating valid individuals for a target language, then a positive decision may be made at operation 916. As was indicated, in some instances, such as to verify that a particular hardware solution may be capable of functioning as intended for a target application, it may, for example, be useful to implement one or more post-processing operations within an appropriate script to verify that the solution satisfies representative unit tests. At times, this may, for example, be implemented, at least in part, via a so-called "black box testing," such as via checking that input to output behavior of a solution is within an expected or otherwise suitable range for a given problem. Here, a suitable range may be determined and/or set experimentally and/or predefined, which may depend, at least in part, on a particular application, design, goal, functionality, or the like. As was also discussed, while, in some instances, a resulted BNF grammar itself may ensure that a hardware solution may be capable of following a correct design pattern for a target application, at times, one or more additional unit tests may, for example, be useful so as to more fully verify that the solution may be capable of functioning as intended. However, if it is determined that one or more changes to a particular point of interest may break or otherwise negatively affect an expected functionality or behavior of a final solution, such a point may be disqualified, for example, and example process 900 may terminate, as referenced generally at 920.

Continuing with example process 900, if it is determined that one or more changes to a particular point of interest may break or otherwise negatively affect an expected functionality or behavior of a final solution, at operation 918, a decision may, for example, be made to determine whether a point of interest, if unchanged, may be indicative of an expected functionality of a solution. For example, here, it may be determined whether a point of interest comprises and/or follows one or more conventional naming patterns, includes one or more explanatory comments, or the like. Thus, if it is determined, for example, that a point of interest for a solution comprises a value that offers little or no information to decipher its function, such as does not provide a clue as to its meaning and/or use in the solution, then example process 900 may terminate, as referenced at 920, since, in such a case, randomization may prove to be less beneficial and/or useful. If yes, however, such as if it is determined that a particular point of interest follows conventional naming, typical design pattern, etc., example process 900 may loop back to operation 906, for example, such as to implement operations 906, 910, 914, 916, and/or 918 in a manner discussed above, as appropriate. Thus, as illustrated, in some instances, example process 900 may iterate until, for example, a decision that a solution may no longer have points of interest suitable for randomization is reached, as represented herein via a decision operation at 906.

Figure 10:
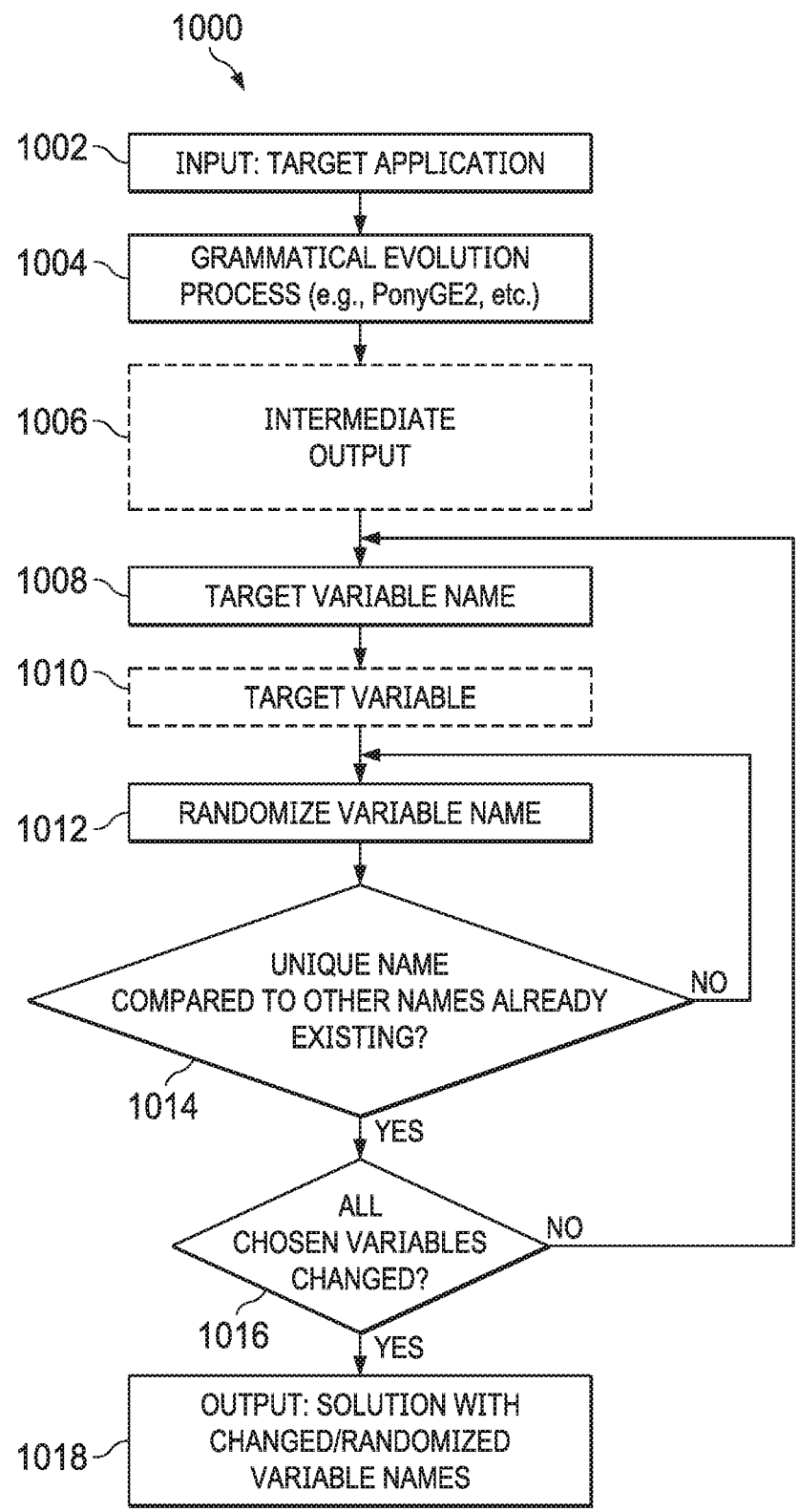
FIG. 10 is a flow diagram illustrating an implementation of an example process for adding randomness to a hardware solution.
Figure 15A:

Referring now to FIG. 10, which is a flow diagram illustrating an implementation of an example process 1000 that may be performed, in whole or in part, to facilitate and/or support one or more operations and/or techniques for adding or injecting randomness to a hardware solution. As was indicated, in some instances, example process 1000 may be implemented, at least in part, in connection with operation 236 of FIG. 2B, for example. It should be appreciated that, even though example process 1000 is illustrated in the context of variable name changes, such as for ease of discussion, any other suitable randomization changes, such as to a name module, static or other values, etc. may be implemented herein, in whole or in part, such as in a similar fashion. Similarly, it should be noted that content acquired or produced, such as, for example, input signals, output signals, operations, results, etc. associated with example process 1000 may be represented via one or more digital signals. It should also be appreciated that even though one or more operations are illustrated or described concurrently or with respect to a certain sequence, other sequences or concurrent operations may be employed. In addition, although the description below references particular aspects and/or features illustrated in certain other figures, one or more operations may be performed with other aspects and/or features.

Thus, in an implementation, as referenced at 1002, a target application may, for example, be determined or defined, such as to define an applicable or otherwise suitable input. Here, one or more approaches similar to those discussed above, such as in connection with operation 302 of FIG. 3 and/or operation 902 of FIG. 9 may, for example, be utilized, in whole or in part, just to illustrate a few possible implementations. Likewise, as referenced at operation 1004, in some instances, a grammatical evolution process may, for example, be implemented, such as in connection with one or more operations and/or techniques discussed above (e.g., operations 222 and/or 230 of FIG. 2B, etc.). As was also discussed, an intermediate output of a grammatical evolution process, as referenced generally at 1006, may comprise, for example, two primary outputs, such as a verified solution for a target application that adheres to its grammar and a grammar-based genetic representation of that solution in a particular hierarchy, such as a tree structure generated in connection with grammatical evolution process at operation 1004 (e.g., via PonyGE2, etc.). As also discussed above, such a tree structure may comprise, for example, one or more terminal variable name values as final leaf nodes in the tree structure. As was also indicated, in at least one implementation, this aspect may, for example, be built into a given grammar so that one or more specific variable names may be identified (e.g., at operation 234 of FIG. 2B, etc.) and/or used, at least in part, for randomization changes.

With regard to operation 1008, one or more variable names, such as those that have not yet been chosen, for example, may be targeted, such as in a manner similar to operations 906 and/or 910 of FIG. 9, as a few examples, so as to arrive at a particular target variable name 1010. As also illustrated, at operation 1012, such a variable name may, for example, be randomized. For example, a node associated with a target variable name and all other leaves of that node may be changed to a new value, such as within certain predefined constraints, as discussed above. As was also discussed, for variables that have string names, these names may be changed from their original value that may provide a clue into its meaning and/or use in a solution, for example, to a value that offers little or no information as to its function. At operation 1014, a determination may, for example, be made whether a randomized variable name is sufficiently different or unique, as compared to one or more other names that may already exist in a given solution. Here, any suitable content-matching or like processes or approaches (e.g., string-searching, pattern-matching, state-automation, globbing, etc.) may, for example, be used, in whole or in part, or otherwise considered. Thus, if no, example process 1000 may loop back to operation 1012, such as to randomize another target variable name, for example, so as to continue with a randomization process.

If, however, it is determined that a variable name is sufficiently different or unique, example process 1000 may proceed to operation 1016, such as to determine whether all chosen or suitable variable names have been changed, for example. Here, if no, meaning that if one or more variable names suitable for randomization are present, example process 1000 may, for example, loop back, such as to implement one or more appropriate iterations via operations 1008 through 1016, as discussed above. If it is determined, however, that all chosen or suitable variables have been changed, example process 1000 may, for example, output a final hardware solution with one or more changed or randomized variable names, as referenced at 1018. As such, a final hardware solution may, for example, be made more secure, such as via adding or injecting obscurity to the solution so as to arrive at an associated design pattern in order to facilitate and/or support a more secure deployment and/or operation of corresponding embedded computing devices, which may include IoT-type devices operating in resource constrained or like environments. Thus, as discussed herein, in some instances, a design pattern may comprise, for example, a verifiable design pattern capable of operating correctly with one or more obfuscated portions of a final solution so as to implement a target functionality of such a solution. By way of example but not limitation, an implementation of a syntactically correct LFSR-tailored Verilog code or instructions 1100 with typical coding conventions, including explanatory comments and proper variable naming, for example, that were used, at least in part, in connection with a particular simulation or experiment is illustrated in FIGS. 11A-11C. Further, for explanatory and/or comparison purposes, by way of another non-limiting example, an implementation of design patterns represented via a syntactically correct LFSR-tailored Verilog code or instructions 1200, such as randomized for variable naming, for example, in connection with at least one simulation or experiment is illustrated in FIGS. 12A-12C.

Accordingly, as discussed herein, one or more operations and/or techniques for creating and/or enhancing hardware obscurity via one or more randomization points may provide benefits. For example, in an implementation, a random number generation may be more difficult, or near impossible, to reverse-engineer since a design pattern itself may be obacerated. Further, according to an implementation, using points of interest to add or inject randomization into a final solution may, for example, make the solution more difficult to process, assess, evaluate, etc. Also, at times, one or more operations and/or techniques for creating and/or enhancing hardware obscurity via one or more randomization points may unduly increase time to exploit for malicious parties, which may, for example, be beneficial for associated security processes, firmware updates, electronic communications, etc. In addition, in some instances, one or more solutions for a given problem, such as randomized via one or more operations and/or techniques discussed herein, for example, may be used, in whole or in part, to facilitate and/or support more thorough, correct, effective, efficient, etc. testing of a particular or specified set of behaviors (e.g., a suite or validation testing, etc.), which, in turn, may facilitate and/or support more thorough, correct, effective, efficient, etc. solutions. Of course, such a description of certain aspects of one or more operations and/or techniques for creating and/or enhancing hardware obscurity via one or more randomization points and their benefits is merely an example, and claimed subject matter is not so limited.

In the context of the present disclosure, the term "connection," the term "component" and/or similar terms are intended to be physical but are not necessarily always tangible. Whether or not these terms refer to tangible subject matter, thus, may vary in a particular context of usage. As an example, a tangible connection and/or tangible connection path may be made, such as by a tangible, electrical connection, such as an electrically conductive path comprising metal or other electrical conductor, that is able to conduct electrical current between two tangible components. Likewise, a tangible connection path may be at least partially affected and/or controlled, such that, as is typical, a tangible connection path may be open or closed, at times resulting from influence of one or more externally derived signals, such as external currents and/or voltages, such as for an electrical switch. Non-limiting illustrations of an electrical switch include a transistor, a diode, etc. However, a "connection" and/or "component," in a particular context of usage, likewise, although physical, can also be non-tangible, such as a connection between a client and a server over a network, which generally refers to the ability for the client and server to transmit, receive, and/or exchange communications, as discussed in more detail later.

In a particular context of usage, such as a particular context in which tangible components are being discussed, therefore, the terms "coupled" and "connected" are used in a manner so that the terms are not synonymous. Similar terms may also be used in a manner in which a similar intention is exhibited. Thus, "connected" is used to indicate that two or more tangible components and/or the like, for example, are tangibly in direct physical contact. Thus, using the previous example, two tangible components that are electrically connected are physically connected via a tangible electrical connection, as previously discussed. However, "coupled," is used to mean that potentially two or more tangible components are tangibly in direct physical contact. Nonetheless, is also used to mean that two or more tangible components and/or the like are not necessarily tangibly in direct physical contact, but are able to co-operate, liaise, and/or interact, such as, for example, by being "optically coupled." Likewise, the term "coupled" may be understood to mean indirectly connected in an appropriate context. It is further noted, in the context of the present disclosure, the term physical if used in relation to memory, such as memory components or memory states, as examples, necessarily implies that memory, such memory components and/or memory states, continuing with the example, is tangible.

Additionally, in the present disclosure, in a particular context of usage, such as a situation in which tangible components (and/or similarly, tangible materials) are being discussed, a distinction exists between being "on" and being "over." As an example, deposition of a substance "on" a substrate refers to a deposition involving direct physical and tangible contact without an intermediary, such as an intermediary substance (e.g., an intermediary substance formed during an intervening process operation), between the substance deposited and the substrate in this latter example; nonetheless, deposition "over" a substrate, while understood to potentially include deposition "on" a substrate (since being "on" may also accurately be described as being "over"), is understood to include a situation in which one or more intermediaries, such as one or more intermediary substances, are present between the substance deposited and the substrate so that the substance deposited is not necessarily in direct physical and tangible contact with the substrate.

A similar distinction is made in an appropriate particular context of usage, such as in which tangible materials and/or tangible components are discussed, between being "beneath" and being "under." While "beneath," in such a particular context of usage, is intended to necessarily imply physical and tangible contact (similar to "on," as just described), "under" potentially includes a situation in which there is direct physical and tangible contact, but does not necessarily imply direct physical and tangible contact, such as if one or more intermediaries, such as one or more intermediary substances, are present. Thus, "on" is understood to mean "immediately over" and "beneath" is understood to mean "immediately under."

It is likewise appreciated that terms such as "over" and "under" are understood in a similar manner as the terms "up," "down," "top," "bottom," and so on, previously mentioned. These terms may be used to facilitate discussion, but are not intended to necessarily restrict scope of claimed subject matter. For example, the term "over," as an example, is not meant to suggest that claim scope is limited to only situations in which an embodiment is right side up, such as in comparison with the embodiment being upside down, for example. An example includes a flip chip, as one illustration, in which, for example, orientation at various times (e.g., during fabrication) may not necessarily correspond to orientation of a final product. Thus, if an object, as an example, is within applicable claim scope in a particular orientation, such as upside down, as one example, likewise, it is intended that the latter also be interpreted to be included within applicable claim scope in another orientation, such as right side up, again, as an example, and vice-versa, even if applicable literal claim language has the potential to be interpreted otherwise. Of course, again, as always has been the case in the specification of a patent application, particular context of description and/or usage provides helpful guidance regarding reasonable inferences to be drawn.

Unless otherwise indicated, in the context of the present disclosure, the term "or" if used to associate a list, such as A, B, or C, is intended to mean A, B, and C, here used in the inclusive sense, as well as A, B, or C, here used in the exclusive sense. With this understanding, "and" is used in the inclusive sense and intended to mean A, B, and C; whereas "and/or" can be used in an abundance of caution to make clear that all of the foregoing meanings are intended, although such usage is not required. In addition, the term "one or more" and/or similar terms is used to describe any feature, structure, characteristic, and/or the like in the singular, "and/or" is also used to describe a plurality and/or some other combination of features, structures, characteristics, and/or the like. Furthermore, the terms "first," "second" "third," and the like are used to distinguish different aspects, such as different components, as one example, rather than supplying a numerical limit or suggesting a particular order, unless expressly indicated otherwise. Likewise, the term "based on" and/or similar terms are understood as not necessarily intending to convey an exhaustive list of factors, but to allow for existence of additional factors not necessarily expressly described.

Furthermore, it is intended, for a situation that relates to implementation of claimed subject matter and is subject to testing, measurement, and/or specification regarding degree, to be understood in the following manner. As an example, in a given situation, assume a value of a physical property is to be measured. If, alternatively, reasonable approaches to testing, measurement, and/or specification regarding degree, at least with respect to the property, continuing with the example, is reasonably likely to occur to one of ordinary skill, at least for implementation purposes, claimed subject matter is intended to cover those alternatively reasonable approaches unless otherwise expressly indicated. As an example, if a plot of measurements over a region is produced and implementation of claimed subject matter refers to employing a measurement of slope over the region, but a variety of reasonable and alternative techniques to estimate the slope over that region exist, claimed subject matter is intended to cover those reasonable alternative techniques, even if those reasonable alternative techniques do not provide identical values, identical measurements or identical results, unless otherwise expressly indicated.

It is further noted that the terms "type" and/or "like," if used, such as with a feature, structure, characteristic, and/or the like, using "optical" or "electrical" as simple examples, means at least partially of and/or relating to the feature, structure, characteristic, and/or the like in such a way that presence of minor variations, even variations that might otherwise not be considered fully consistent with the feature, structure, characteristic, and/or the like, do not in general prevent the feature, structure, characteristic, and/or the like from being of a "type" and/or being "like," (such as being an "optical-type" or being "optical-like," for example) if the minor variations are sufficiently minor so that the feature, structure, characteristic, and/or the like would still be considered to be predominantly present with such variations also present. Thus, continuing with this example, the terms optical-type and/or optical-like properties are necessarily intended to include optical properties. Likewise, the terms electrical-type and/or electrical-like properties, as another example, are necessarily intended to include electrical properties. It should be noted that the specification of the present disclosure merely provides one or more illustrative examples and claimed subject matter is intended to not be limited to one or more illustrative examples; however, again, as has always been the case with respect to the specification of a patent application, particular context of description and/or usage provides helpful guidance regarding reasonable inferences to be drawn.

With advances in technology, it has become more typical to employ distributed computing and/or communication approaches in which portions of a process, such as signal processing of signal samples, for example, may be allocated among various devices, including one or more client devices, one or more server devices and/or one or more peer-to-peer devices, via a computing and/or communications network, for example. A network may comprise two or more devices, such as network devices and/or computing devices, and/or may couple devices, such as network devices and/or computing devices, so that signal communications, such as in the form of signal packets and/or signal frames (e.g., comprising one or more signal samples), for example, may be exchanged, such as between a server device, a client device and/or a peer-to-peer device, as well as other types of devices, including between wired and/or wireless devices coupled via a wired and/or wireless network, for example.

An example of a distributed computing system comprises the so-called Hadoop distributed computing system, which employs a map-reduce type of architecture. In the context of the present disclosure, the terms map-reduce architecture and/or similar terms are intended to refer to a distributed computing system implementation and/or embodiment for processing and/or for generating larger sets of signal samples employing map and/or reduce operations for a parallel, distributed process performed over a network of devices. A map operation and/or similar terms refer to processing of signals (e.g., signal samples) to generate one or more key-value pairs and to distribute the one or more pairs to one or more devices of the system (e.g., network). A reduce operation and/or similar terms refer to processing of signals (e.g., signal samples) via a summary operation (e.g., such as counting the number of students in a queue, yielding name frequencies, etc.). A system may employ such an architecture, such as by marshaling distributed server devices, executing various tasks in parallel, and/or managing communications, such as signal transfers, between various parts of the system (e.g., network), in an embodiment. As mentioned, one non-limiting, but well-known, example comprises the Hadoop distributed computing system. It refers to an open source implementation and/or embodiment of a map-reduce type architecture (available from the Apache Software Foundation, 1901 Munsey Drive, Forrest Hill, Md., 21050-2747), but may include other aspects, such as the Hadoop distributed file system (HDFS) (available from the Apache Software Foundation, 1901 Munsey Drive, Forrest Hill, Md., 21050-2747). In general, therefore, "Hadoop" and/or similar terms (e.g., "Hadoop-type," etc.) refer to an implementation and/or embodiment of a scheduler for executing larger processing jobs using a map-reduce architecture over a distributed system. Furthermore, in the context of the present disclosure, use of the term "Hadoop" is intended to include versions, presently known and/or to be later developed.

In the context of the present disclosure, the term "network device" refers to any device capable of communicating via and/or as part of a network and may comprise a computing device. While network devices may be capable of communicating signals (e.g., signal packets and/or frames), such as via a wired and/or wireless network, they may also be capable of performing operations associated with a computing device, such as arithmetic and/or logic operations, processing and/or storing operations (e.g., storing signal samples), such as in a non-transitory memory as tangible, physical memory states, and/or may, for example, operate as a server device and/or a client device in various embodiments. Network devices capable of operating as a server device, a client device and/or otherwise, may include, as examples, dedicated rack-mounted servers, desktop computers, laptop computers, set top boxes, tablets, netbooks, smart phones, wearable devices, integrated devices combining two or more features of the foregoing devices, and/or the like, or any combination thereof. As mentioned, signal packets and/or frames, for example, may be exchanged, such as between a server device and/or a client device, as well as other types of devices, including between wired and/or wireless devices coupled via a wired and/or wireless network, for example, or any combination thereof. It is noted that the terms, server, server device, server computing device, server computing platform and/or similar terms are used interchangeably. Similarly, the terms client, client device, client computing device, client computing platform and/or similar terms are also used interchangeably. While in some instances, for ease of description, these terms may be used in the singular, such as by referring to a "client device" or a "server device," the description is intended to encompass one or more client devices and/or one or more server devices, as appropriate. Along similar lines, references to a "database" are understood to mean, one or more databases and/or portions thereof, as appropriate.

It should be understood that for ease of description, a network device (also referred to as a networking device) may be embodied and/or described in terms of a computing device and vice-versa. However, it should further be understood that this description should in no way be construed so that claimed subject matter is limited to one embodiment, such as only a computing device and/or only a network device, but, instead, may be embodied as a variety of devices or combinations thereof, including, for example, one or more illustrative examples.

A network may also include now known, and/or to be later developed arrangements, derivatives, and/or improvements, including, for example, past, present and/or future mass storage, such as network attached storage (NAS), a storage area network (SAN), and/or other forms of device readable media, for example. A network may include a portion of the Internet, one or more local area networks (LANs), one or more wide area networks (WANs), wire-line type connections, wireless type connections, other connections, or any combination thereof. Thus, a network may be worldwide in scope and/or extent. Likewise, sub-networks, such as may employ differing architectures and/or may be substantially compliant and/or substantially compatible with differing protocols, such as network computing and/or communications protocols (e.g., network protocols), may interoperate within a larger network.

In the context of the present disclosure, the term sub-network and/or similar terms, if used, for example, with respect to a network, refers to the network and/or a part thereof. Sub-networks may also comprise links, such as physical links, connecting and/or coupling nodes, so as to be capable to communicate signal packets and/or frames between devices of particular nodes, including via wired links, wireless links, or combinations thereof. Various types of devices, such as network devices and/or computing devices, may be made available so that device interoperability is enabled and/or, in at least some instances, may be transparent. In the context of the present disclosure, the term "transparent," if used with respect to particular communicating devices of a network, refers to the devices communicating via the network in which the devices are able to communicate via one or more intermediate devices, such as of one or more intermediate nodes, but without the communicating devices necessarily specifying the one or more intermediate nodes and/or the one or more intermediate devices of the one or more intermediate nodes. Thus, a network may include the one or more intermediate nodes and/or the one or more intermediate devices of the one or more intermediate nodes in communications and the network may engage in communications via the one or more intermediate nodes and/or the one or more intermediate devices of the one or more intermediate nodes, but the network may operate as if such intermediate nodes and/or intermediate devices are not necessarily involved in communications between the particular communicating devices. For example, a router may provide a link and/or connection between otherwise separate and/or independent LANs.

In the context of the present disclosure, a "private network" refers to a particular, limited set of devices, such as network devices and/or computing devices, able to communicate with other devices, such as network devices and/or computing devices, in the particular, limited set, such as via signal packet and/or signal frame communications, for example, without a need for re-routing and/or redirecting signal communications. A private network may comprise a stand-alone network; however, a private network may also comprise a subset of a larger network, such as, for example, without limitation, all or a portion of the Internet. Thus, for example, a private network "in the cloud" may refer to a private network that comprises a subset of the Internet. Although signal packet and/or frame communications (e.g. signal communications) may employ intermediate devices of intermediate nodes to exchange signal packets and/or signal frames, those intermediate devices may not necessarily be included in the private network by not being a source or designated destination for one or more signal packets and/or signal frames, for example. It is understood in the context of the present disclosure that a private network may direct outgoing signal communications to devices not in the private network, but devices outside the private network may not necessarily be able to direct inbound signal communications to devices included in the private network.

The Internet refers to a decentralized global network of interoperable networks that comply with the Internet Protocol (IP). It is noted that there are several versions of the Internet Protocol. The term Internet Protocol, IP, and/or similar terms are intended to refer to any version, now known and/or to be later developed. The Internet includes local area networks (LANs), wide area networks (WANs), wireless networks, and/or long haul networks that, for example, may allow signal packets and/or frames to be communicated between LANs. The term World Wide Web (WWW or Web) and/or similar terms may also be used, although it refers to a part of the Internet that complies with the Hypertext Transfer Protocol (HTTP). For example, network devices may engage in an HTTP session through an exchange of appropriately substantially compatible and/or substantially compliant signal packets and/or frames. It is noted that there are several versions of the Hypertext Transfer Protocol. The term Hypertext Transfer Protocol, HTTP, and/or similar terms are intended to refer to any version, now known and/or to be later developed. It is likewise noted that in various places in this document substitution of the term Internet with the term World Wide Web ("Web") may be made without a significant departure in meaning and may, therefore, also be understood in that manner if the statement would remain correct with such a substitution.

Although claimed subject matter is not in particular limited in scope to the Internet and/or to the Web; nonetheless, the Internet and/or the Web may without limitation provide a useful example of an embodiment at least for purposes of illustration. As indicated, the Internet and/or the Web may comprise a worldwide system of interoperable networks, including interoperable devices within those networks. The Internet and/or Web has evolved to a self-sustaining facility accessible to potentially billions of people or more worldwide. Also, in an embodiment, and as mentioned above, the terms "WWW" and/or "Web" refer to a part of the Internet that complies with the Hypertext Transfer Protocol. The Internet and/or the Web, therefore, in the context of the present disclosure, may comprise a service that organizes stored digital content, such as, for example, text, images, video, etc., through the use of hypermedia, for example. It is noted that a network, such as the Internet and/or Web, may be employed to store electronic files and/or electronic documents.

The term "electronic file" and/or the term "electronic document" or the like are used throughout this document to refer to a set of stored memory states and/or a set of physical signals associated in a manner so as to thereby at least logically form a file (e.g., electronic) and/or an electronic document. That is, it is not meant to implicitly reference a particular syntax, format and/or approach used, for example, with respect to a set of associated memory states and/or a set of associated physical signals. If a particular type of file storage format and/or syntax, for example, is intended, it is referenced expressly. It is further noted an association of memory states, for example, may be in a logical sense and not necessarily in a tangible, physical sense. Thus, although signal and/or state components of a file and/or an electronic document, for example, are to be associated logically, storage thereof, for example, may reside in one or more different places in a tangible, physical memory, in an embodiment.

A Hyper Text Markup Language ("HTML"), for example, may be utilized to specify digital content and/or to specify a format thereof, such as in the form of an electronic file and/or an electronic document, such as a Web page, Web site, etc., for example. An Extensible Markup Language ("XML") may also be utilized to specify digital content and/or to specify a format thereof, such as in the form of an electronic file and/or an electronic document, such as a Web page, Web site, etc., in an embodiment. Of course, HTML and/or XML are merely examples of "markup" languages, provided as non-limiting illustrations. Furthermore, HTML and/or XML are intended to refer to any version, now known and/or to be later developed, of these languages. Likewise, claimed subject matter are not intended to be limited to examples provided as illustrations, of course.

In the context of the present disclosure, the term "Web site" and/or similar terms refer to Web pages that are associated electronically to form a particular collection thereof. Also, in the context of the present disclosure, "Web page" and/or similar terms refer to an electronic file and/or an electronic document accessible via a network, including by specifying a uniform resource locator (URL) for accessibility via the Web, in an example embodiment. As alluded to above, in one or more embodiments, a Web page may comprise digital content coded (e.g., via computer instructions) using one or more languages, such as, for example, markup languages, including HTML and/or XML, although claimed subject matter is not limited in scope in this respect. Also, in one or more embodiments, application developers may write code (e.g., computer instructions) in the form of JavaScript (or other programming languages), for example, executable by a computing device to provide digital content to populate an electronic document and/or an electronic file in an appropriate format, such as for use in a particular application, for example. Use of the term "JavaScript" and/or similar terms intended to refer to one or more particular programming languages are intended to refer to any version of the one or more programming languages identified, now known and/or to be later developed. Thus, JavaScript is merely an example programming language. As was mentioned, claimed subject matter is not intended to be limited to examples and/or illustrations.

As was indicated, in the context of the present disclosure, the terms "entry," "electronic entry," "document," "electronic document," "content", "digital content," "item," "object," and/or similar terms are meant to refer to signals and/or states in a physical format, such as a digital signal and/or digital state format, e.g., that may be perceived by a user if displayed, played, tactilely generated, etc. and/or otherwise executed by a device, such as a digital device, including, for example, a computing device, but otherwise might not necessarily be readily perceivable by humans (e.g., if in a digital format). Likewise, in the context of the present disclosure, digital content provided to a user in a form so that the user is able to readily perceive the underlying content itself (e.g., content presented in a form consumable by a human, such as hearing audio, feeling tactile sensations and/or seeing images, as examples) is referred to, with respect to the user, as "consuming" digital content, "consumption" of digital content, "consumable" digital content and/or similar terms. For one or more embodiments, an electronic document and/or an electronic file may comprise a Web page of code (e.g., computer instructions) in a markup language executed or to be executed by a computing and/or networking device, for example. In another embodiment, an electronic document and/or electronic file may comprise a portion and/or a region of a Web page. However, claimed subject matter is not intended to be limited in these respects.

Also, for one or more embodiments, an electronic document and/or electronic file may comprise a number of components. As previously indicated, in the context of the present disclosure, a component is physical, but is not necessarily tangible. As an example, components with reference to an electronic document and/or electronic file, in one or more embodiments, may comprise text, for example, in the form of physical signals and/or physical states (e.g., capable of being physically displayed and/or maintained as a memory state in a tangible memory). Typically, memory states, for example, comprise tangible components, whereas physical signals are not necessarily tangible, although signals may become (e.g., be made) tangible, such as if appearing on a tangible display, for example, as is not uncommon. Also, for one or more embodiments, components with reference to an electronic document and/or electronic file may comprise a graphical object, such as, for example, an image, such as a digital image, and/or subobjects, including attributes thereof, which, again, comprise physical signals and/or physical states (e.g., capable of being tangibly displayed and/or maintained as a memory state in a tangible memory). In an embodiment, digital content may comprise, for example, text, images, audio, video, haptic content and/or other types of electronic documents and/or electronic files, including portions thereof, for example.

Also, in the context of the present disclosure, the term parameters (e.g., one or more parameters) refer to material descriptive of a collection of signal samples, such as one or more electronic documents and/or electronic files, and exist in the form of physical signals and/or physical states, such as memory states. For example, one or more parameters, such as referring to an electronic document and/or an electronic file comprising an image, may include, as examples, time of day at which an image was captured, latitude and longitude of an image capture device, such as a camera, for example, etc. In another example, one or more parameters relevant to digital content, such as digital content comprising a technical article, as an example, may include one or more authors, for example. Claimed subject matter is intended to embrace meaningful, descriptive parameters in any format, so long as the one or more parameters comprise physical signals and/or states, which may include, as parameter examples, collection name (e.g., electronic file and/or electronic document identifier name), technique of creation, purpose of creation, time and date of creation, logical path if stored, coding formats (e.g., type of computer instructions, such as a markup language) and/or standards and/or specifications used so as to be protocol compliant (e.g., meaning substantially compliant and/or substantially compatible) for one or more uses, and so forth.

Signal packet communications and/or signal frame communications, also referred to as signal packet transmissions and/or signal frame transmissions (or merely "signal packets" or "signal frames"), may be communicated between nodes of a network, where a node may comprise one or more network devices and/or one or more computing devices, for example. As an illustrative example, but without limitation, a node may comprise one or more sites employing a local network address, such as in a local network address space. Likewise, a device, such as a network device and/or a computing device, may be associated with that node. It is also noted that in the context of this disclosure, the term "transmission" is intended as another term for a type of signal communication that may occur in any one of a variety of situations. Thus, it is not intended to imply a particular directionality of communication and/or a particular initiating end of a communication path for the "transmission" communication. For example, the mere use of the term in and of itself is not intended, in the context of the present disclosure, to have particular implications with respect to the one or more signals being communicated, such as, for example, whether the signals are being communicated "to" a particular device, whether the signals are being communicated "from" a particular device, and/or regarding which end of a communication path may be initiating communication, such as, for example, in a "push type" of signal transfer or in a "pull type" of signal transfer. In the context of the present disclosure, push and/or pull type signal transfers are distinguished by which end of a communications path initiates signal transfer.

Thus, a signal packet and/or frame may, as an example, be communicated via a communication channel and/or a communication path, such as comprising a portion of the Internet and/or the Web, from a site via an access node coupled to the Internet or vice-versa. Likewise, a signal packet and/or frame may be forwarded via network nodes to a target site coupled to a local network, for example. A signal packet and/or frame communicated via the Internet and/or the Web, for example, may be routed via a path, such as either being "pushed" or "pulled," comprising one or more gateways, servers, etc. that may, for example, route a signal packet and/or frame, such as, for example, substantially in accordance with a target and/or destination address and availability of a network path of network nodes to the target and/or destination address. Although the Internet and/or the Web comprise a network of interoperable networks, not all of those interoperable networks are necessarily available and/or accessible to the public.

In the context of the particular disclosure, a network protocol, such as for communicating between devices of a network, may be characterized, at least in part, substantially in accordance with a layered description, such as the so-called Open Systems Interconnection (OSI) seven layer type of approach and/or description. A network computing and/or communications protocol (also referred to as a network protocol) refers to a set of signaling conventions, such as for communication transmissions, for example, as may take place between and/or among devices in a network. In the context of the present disclosure, the term "between" and/or similar terms are understood to include "among" if appropriate for the particular usage and vice-versa. Likewise, in the context of the present disclosure, the terms "compatible with," "comply with" and/or similar terms are understood to respectively include substantial compatibility and/or substantial compliance.

A network protocol, such as protocols characterized substantially in accordance with the aforementioned OSI description, has several layers. These layers are referred to as a network stack. Various types of communications (e.g., transmissions), such as network communications, may occur across various layers. A lowest level layer in a network stack, such as the so-called physical layer, may characterize how symbols (e.g., bits and/or bytes) are communicated as one or more signals (and/or signal samples) via a physical medium (e.g., twisted pair copper wire, coaxial cable, fiber optic cable, wireless air interface, combinations thereof, etc.). Progressing to higher-level layers in a network protocol stack, additional operations and/or features may be available via engaging in communications that are substantially compatible and/or substantially compliant with a particular network protocol at these higher-level layers. For example, higher-level layers of a network protocol may, for example, affect device permissions, user permissions, etc.

A network and/or sub-network, in an embodiment, may communicate via signal packets and/or signal frames, such via participating digital devices and may be substantially compliant and/or substantially compatible with, but is not limited to, now known and/or to be developed, versions of any of the following network protocol stacks: ARCNET, AppleTalk, ATM, Bluetooth, DECnet, Ethernet, FDDI, Frame Relay, HIPPI, IEEE 1394, IEEE 802.11, IEEE-488, Internet Protocol Suite, IPX, Myrinet, OSI Protocol Suite, QsNet, RS-232, SPX, System Network Architecture, Token Ring, USB, and/or X.25. A network and/or sub-network may employ, for example, a version, now known and/or later to be developed, of the following: TCP/IP, UDP, DECnet, NetBEUI, IPX, AppleTalk and/or the like. Versions of the Internet Protocol (IP) may include IPv4, IPv6, and/or other later to be developed versions.

Regarding aspects related to a network, including a communications and/or computing network, a wireless network may couple devices, including client devices, with the network. A wireless network may employ stand-alone, ad-hoc networks, mesh networks, Wireless LAN (WLAN) networks, cellular networks, and/or the like. A wireless network may further include a system of terminals, gateways, routers, and/or the like coupled by wireless radio links, and/or the like, which may move freely, randomly and/or organize themselves arbitrarily, such that network topology may change, at times even rapidly. A wireless network may further employ a plurality of network access technologies, including a version of Long Term Evolution (LTE), WLAN, Wireless Router (WR) mesh, 2nd, 3rd, or 4th generation (2G, 3G, or 4G) cellular technology and/or the like, whether currently known and/or to be later developed. Network access technologies may enable wide area coverage for devices, such as computing devices and/or network devices, with varying degrees of mobility, for example.

A network may enable radio frequency and/or other wireless type communications via a wireless network access technology and/or air interface, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, ultra-wideband (UWB), IEEE 802.11 (including, but not limited to, IEEE 802.11b/g/n), and/or the like. A wireless network may include virtually any type of now known and/or to be developed wireless communication mechanism and/or wireless communications protocol by which signals may be communicated between devices, between networks, within a network, and/or the like, including the foregoing, of course.

Figure 17:
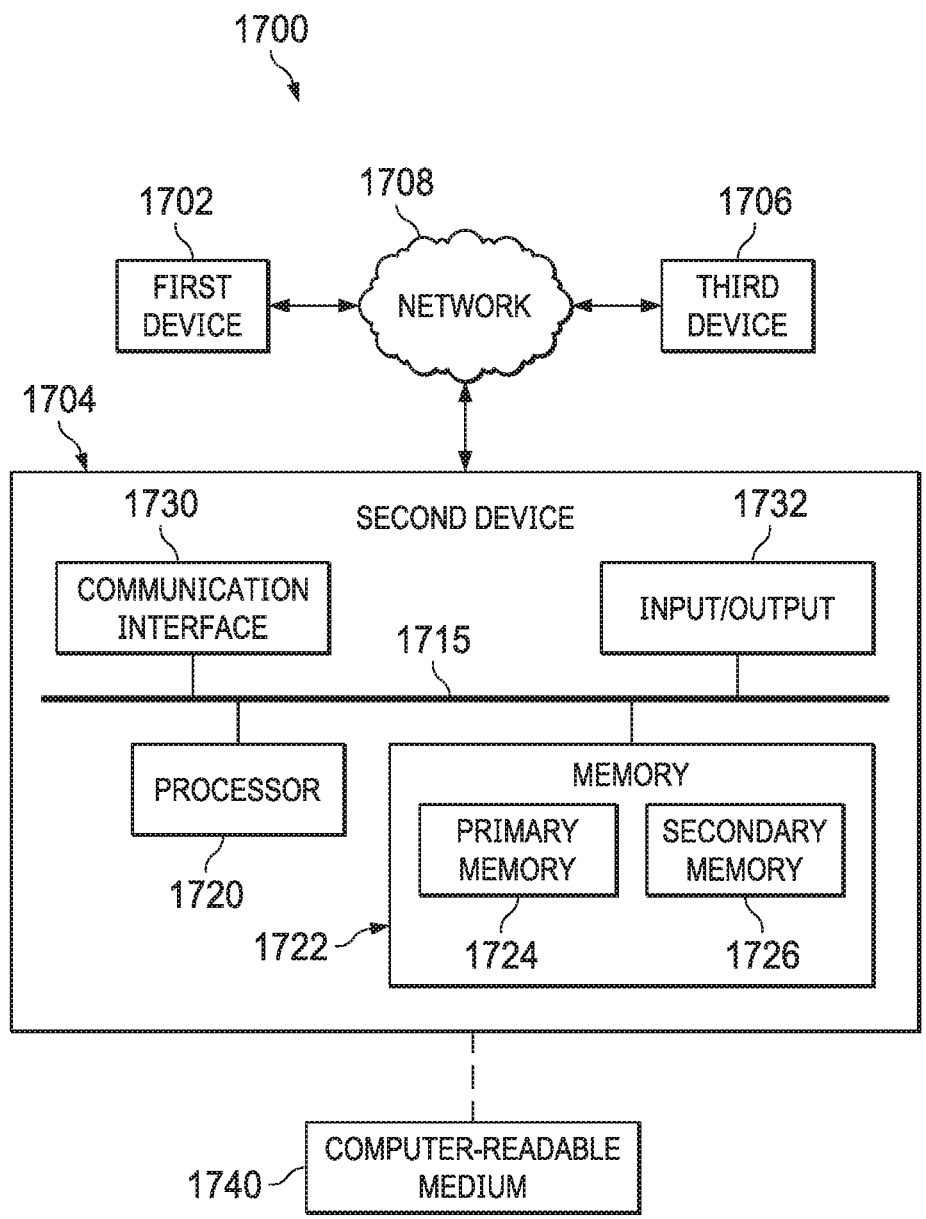
FIG. 17 is a schematic diagram illustrating an implementation of an example computing environment.

In one example embodiment, as shown in FIG. 17, a system embodiment may comprise a local network (e.g., a second device 1704 and a computer-readable medium 1740) and/or another type of network, such as a computing and/or communications network. For purposes of illustration, therefore, FIG. 17 shows an embodiment 1700 of a system that may be employed to implement either type or both types of networks. Network 1708 may comprise one or more network connections, links, processes, services, applications, and/or resources to facilitate and/or support communications, such as an exchange of communication signals, for example, between a computing device, such as 1702, and another computing device, such as 1706, which may, for example, comprise one or more client computing devices and/or one or more server computing device. By way of example, but not limitation, network 1708 may comprise wireless and/or wired communication links, telephone and/or telecommunications systems, Wi-Fi networks, Wi-MAX networks, the Internet, a local area network (LAN), a wide area network (WAN), or any combinations thereof.

Example devices in FIG. 17 may comprise features, for example, of a client computing device and/or a server computing device, in an embodiment. It is further noted that the term computing device, in general, whether employed as a client and/or as a server, or otherwise, refers at least to a processor and a memory connected by a communication bus. Likewise, in the context of the present disclosure at least, this is understood to refer to sufficient structure within the meaning of 35 § USC 112 (f) so that it is specifically intended that 35 § USC 112 (f) not be implicated by use of the term "computing device" and/or similar terms; however, if it is determined, for some reason not immediately apparent, that the foregoing understanding cannot stand and that 35 § USC 112 (f) therefore, necessarily is implicated by the use of the term "computing device" and/or similar terms, then, it is intended, pursuant to that statutory section, that corresponding structure, material and/or acts for performing one or more functions be understood and be interpreted to be described at least in FIGS. 1 and 17 of the present disclosure.

Referring now to FIG. 17, in an embodiment, first and third devices 1702 and 1706 may be capable of rendering a graphical user interface (GUI) for a network device and/or a computing device, for example, so that a user-operator may engage in system use. Device 1704 may potentially serve a similar function in this illustration. Likewise, in FIG. 17, computing device 1702 ('first device' in figure) may interface with computing device 1704 ('second device' in figure), which may, for example, also comprise features of a client computing device and/or a server computing device, in an embodiment. Processor (e.g., processing device) 1720 and memory 1722, which may comprise primary memory 1724 and secondary memory 1726, may communicate by way of a communication bus 1715, for example. The term "computing device," in the context of the present disclosure, refers to a system and/or a device, such as a computing apparatus, that includes a capability to process (e.g., perform computations) and/or store digital content, such as electronic files, electronic documents, measurements, text, images, video, audio, etc. in the form of signals and/or states. Thus, a computing device, in the context of the present disclosure, may comprise hardware, software, firmware, or any combination thereof (other than software per se). Computing device 1704, as depicted in FIG. 17, is merely one example, and claimed subject matter is not limited in scope to this particular example.

For one or more embodiments, a computing device may comprise, for example, any of a wide range of digital electronic devices, including, but not limited to, desktop and/or notebook computers, high-definition televisions, digital versatile disc (DVD) and/or other optical disc players and/or recorders, game consoles, satellite television receivers, cellular telephones, tablet devices, wearable devices, personal digital assistants, mobile audio and/or video playback and/or recording devices, or any combination of the foregoing. Further, unless specifically stated otherwise, a process as described, such as with reference to flow diagrams and/or otherwise, may also be executed and/or affected, in whole or in part, by a computing device and/or a network device. A device, such as a computing device and/or network device, may vary in terms of capabilities and/or features. Claimed subject matter is intended to cover a wide range of potential variations. For example, a device may include a numeric keypad and/or other display of limited functionality, such as a monochrome liquid crystal display (LCD) for displaying text, for example. In contrast, however, as another example, a web-enabled device may include a physical and/or a virtual keyboard, mass storage, one or more accelerometers, one or more gyroscopes, global positioning system (GPS) and/or other location-identifying type capability, and/or a display with a higher degree of functionality, such as a touch-sensitive color 2D or 3D display, for example.

As suggested previously, communications between a computing device and/or a network device and a wireless network may be in accordance with known and/or to be developed network protocols including, for example, global system for mobile communications (GSM), enhanced data rate for GSM evolution (EDGE), 802.11b/g/n/h, etc., and/or worldwide interoperability for microwave access (WiMAX). A computing device and/or a networking device may also have a subscriber identity module (SIM) card, which, for example, may comprise a detachable or embedded smart card that is able to store subscription content of a user, and/or is also able to store a contact list. A user may own the computing device and/or network device or may otherwise be a user, such as a primary user, for example. A device may be assigned an address by a wireless network operator, a wired network operator, and/or an Internet Service Provider (ISP). For example, an address may comprise a domestic or international telephone number, an Internet Protocol (IP) address, and/or one or more other identifiers. In other embodiments, a computing and/or communications network may be embodied as a wired network, wireless network, or any combinations thereof.

A computing and/or network device may include and/or may execute a variety of now known and/or to be developed operating systems, derivatives and/or versions thereof, including computer operating systems, such as Windows, iOS, Linux, a mobile operating system, such as iOS, Android, Windows Mobile, and/or the like. A computing device and/or network device may include and/or may execute a variety of possible applications, such as a client software application enabling communication with other devices. For example, one or more messages (e.g., content) may be communicated, such as via one or more protocols, now known and/or later to be developed, suitable for communication of e-mail, short message service (SMS), and/or multimedia message service (MMS), including via a network, such as a social network, formed at least in part by a portion of a computing and/or communications network, including, but not limited to, Facebook, LinkedIn, Twitter, Flickr, and/or Google+, to provide only a few examples. A computing and/or network device may also include executable computer instructions to process and/or communicate digital content, such as, for example, textual content, digital multimedia content, and/or the like. A computing and/or network device may also include executable computer instructions to perform a variety of possible tasks, such as browsing, searching, playing various forms of digital content, including locally stored and/or streamed video, and/or games such as, but not limited to, fantasy sports leagues. The foregoing is provided merely to illustrate that claimed subject matter is intended to include a wide range of possible features and/or capabilities.

In FIG. 17, computing device 1702 may provide one or more sources of executable computer instructions in the form physical states and/or signals (e.g., stored in memory states), for example. Computing device 1702 may communicate with computing device 1704 by way of a network connection, such as via network 1708, for example. As previously mentioned, a connection, while physical, may not necessarily be tangible. Although computing device 1704 of FIG. 17 shows various tangible, physical components, claimed subject matter is not limited to computing devices having only these tangible components as other implementations and/or embodiments may include alternative arrangements that may comprise additional tangible components or fewer tangible components, for example, that function differently while achieving similar results. Rather, examples are provided merely as illustrations. It is not intended that claimed subject matter be limited in scope to illustrative examples.

Memory 1722 may comprise any non-transitory storage mechanism. Memory 1722 may comprise, for example, primary memory 1724 and secondary memory 1726, additional memory circuits, mechanisms, or combinations thereof may be used. Memory 1722 may comprise, for example, random access memory, read only memory, etc., such as in the form of one or more storage devices and/or systems, such as, for example, a disk drive including an optical disc drive, a tape drive, a solid-state memory drive, etc., just to name a few examples.

Memory 1722 may be utilized to store a program of executable computer instructions. For example, processor 1720 may fetch executable instructions from memory and proceed to execute the fetched instructions. Memory 1722 may also comprise a memory controller for accessing device readable-medium 1740 that may carry and/or make accessible digital content, which may include code, and/or instructions, for example, executable by processor 1720 and/or some other device, such as a controller, as one example, capable of executing computer instructions, for example. Under direction of processor 1720, a non-transitory memory, such as memory cells storing physical states (e.g., memory states), comprising, for example, a program of executable computer instructions, may be executed by processor 1720 and able to generate signals to be communicated via a network, for example, as previously described. Generated signals may also be stored in memory, also previously suggested.

Memory 1722 may store electronic files and/or electronic documents, such as relating to one or more users, and may also comprise a device-readable medium that may carry and/or make accessible content, including code and/or instructions, for example, executable by processor 1720 and/or some other device, such as a controller, as one example, capable of executing computer instructions, for example. As previously mentioned, the term electronic file and/or the term electronic document are used throughout this document to refer to a set of stored memory states and/or a set of physical signals associated in a manner so as to thereby form an electronic file and/or an electronic document. That is, it is not meant to implicitly reference a particular syntax, format and/or approach used, for example, with respect to a set of associated memory states and/or a set of associated physical signals. It is further noted an association of memory states, for example, may be in a logical sense and not necessarily in a tangible, physical sense. Thus, although signal and/or state components of an electronic file and/or electronic document, are to be associated logically, storage thereof, for example, may reside in one or more different places in a tangible, physical memory, in an embodiment.

Algorithmic descriptions and/or symbolic representations are examples of techniques used by those of ordinary skill in the signal processing and/or related arts to convey the substance of their work to others skilled in the art. An algorithm is, in the context of the present disclosure, and generally, is considered to be a self-consistent sequence of operations and/or similar signal processing leading to a desired result. In the context of the present disclosure, operations and/or processing involve physical manipulation of physical quantities. Typically, although not necessarily, such quantities may take the form of electrical and/or magnetic signals and/or states capable of being stored, transferred, combined, compared, processed and/or otherwise manipulated, for example, as electronic signals and/or states making up components of various forms of digital content, such as signal measurements, text, images, video, audio, etc.

It has proven convenient at times, principally for reasons of common usage, to refer to such physical signals and/or physical states as bits, values, elements, parameters, symbols, characters, terms, numbers, numerals, measurements, content and/or the like. It should be understood, however, that all of these and/or similar terms are to be associated with appropriate physical quantities and are merely convenient labels. Unless specifically stated otherwise, as apparent from the preceding discussion, it is appreciated that throughout this specification discussions utilizing terms such as "processing," "computing," "calculating," "determining", "establishing", "obtaining", "identifying", "selecting", "generating", and/or the like may refer to actions and/or processes of a specific apparatus, such as a special purpose computer and/or a similar special purpose computing and/or network device. In the context of this specification, therefore, a special purpose computer and/or a similar special purpose computing and/or network device is capable of processing, manipulating and/or transforming signals and/or states, typically in the form of physical electronic and/or magnetic quantities, within memories, registers, and/or other storage devices, processing devices, and/or display devices of the special purpose computer and/or similar special purpose computing and/or network device. In the context of this particular disclosure, as mentioned, the term "specific apparatus" therefore includes a general purpose computing and/or network device, such as a general purpose computer, once it is programmed to perform particular functions, such as pursuant to program software instructions.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and/or storage of charge or a release of stored charge. Likewise, in other memory devices, a change of state may comprise a physical change, such as a transformation in magnetic orientation. Likewise, a physical change may comprise a transformation in molecular structure, such as from crystalline form to amorphous form or vice-versa. In still other memory devices, a change in physical state may involve quantum mechanical phenomena, such as, superposition, entanglement, and/or the like, which may involve quantum bits (qubits), for example. The foregoing is not intended to be an exhaustive list of all examples in which a change in state from a binary one to a binary zero or vice-versa in a memory device may comprise a transformation, such as a physical, but non-transitory, transformation. Rather, the foregoing is intended as illustrative examples.

Referring again to FIG. 17, processor 1720 may comprise one or more circuits, such as digital circuits, to perform at least a portion of a computing procedure and/or process. By way of example, but not limitation, processor 1720 may comprise one or more processors, such as controllers, microprocessors, microcontrollers, application specific integrated circuits, digital signal processors, programmable logic devices, field programmable gate arrays, the like, or any combination thereof. In various implementations and/or embodiments, processor 1720 may perform signal processing, typically substantially in accordance with fetched executable computer instructions, such as to manipulate signals and/or states, to construct signals and/or states, etc., with signals and/or states generated in such a manner to be communicated and/or stored in memory, for example.

FIG. 17 also illustrates device 1704 as including a component 1732 operable with input/output devices, for example, so that signals and/or states may be appropriately communicated between devices, such as device 1704 and an input device and/or device 1704 and an output device. A user may make use of an input device, such as a computer mouse, stylus, track ball, keyboard, and/or any other similar device capable of receiving user actions and/or motions as input signals. Likewise, a user may make use of an output device, such as a display, a printer, etc., and/or any other device capable of providing signals and/or generating stimuli for a user, such as visual stimuli, audio stimuli and/or other similar stimuli.

In the preceding description, various aspects of claimed subject matter have been described. For purposes of explanation, specifics, such as amounts, systems and/or configurations, as examples, were set forth. In other instances, well-known features were omitted and/or simplified so as not to obscure claimed subject matter. While certain features have been illustrated and/or described herein, many modifications, substitutions, changes and/or equivalents will now occur to those skilled in the art. It is, therefore, to be understood that the appended claims are intended to cover all modifications and/or changes as fall within claimed subject matter.

What is claimed is:

1. A method for enhancing obscurity of a plurality of hardware solutions, the method comprising:
    electronically restricting a search space defined by a Backus-Naur form (BNF) representation of a computer programming language to impose one or more context-sensitive constraints on the search space by pruning an extended BNF grammar while preserving at least a linear feedback shift register (LFSR) functionality;
    electronically generating a grammar-based genetic representation of at least one of the plurality of hardware solutions based, at least in part, on an application of evolutionary criteria to the restricted search space; and
    electronically performing one or more randomization operations to transform the at least one of the plurality of hardware solutions into a design pattern having one or more obfuscated portions based, at least in part, on the grammar-based genetic representation.

2. The method of claim 1, wherein the one or more obfuscated portions is to at least partially obscure the LFSR functionality in the at least one of the plurality of hardware solutions.

3. The method of claim 2, wherein the design pattern comprises a verifiable design pattern capable of operating correctly with the one or more obfuscated portions to implement the LFSR functionality the at least one of the plurality of hardware solutions.

4. The method of claim 1, wherein the one or more context-sensitive constraints comprise: one or more syntactic constraints or one or more variable naming constraints; or any combination thereof.

5. The method of claim 1, wherein the electronically restricting the search space comprises:
    obtaining a syntactically correct form of the BNF representation; and
    pruning the syntactically correct form of the BNF representation for semantic consistency.

6. The method of claim 5, wherein the pruning the syntactically correct form of the BNF representation for the semantic consistency comprises editing the search space for: one or more syntactic structures; one or more variable names or one or more constants; or any combination thereof.

7. The method of claim 1, wherein the electronically performing the one or more randomization operations comprises:
    identifying one or more randomization points in the at least one of the plurality of hardware solutions; and
    injecting randomness into the at least one of the plurality of hardware solutions based, at least in part, on the one or more randomization points.

8. The method of claim 7, wherein the one or more randomization points comprise the one or more obfuscated portions of the design pattern.

9. The method of claim 1, wherein the grammar-based genetic representation of at least one of the plurality of hardware solutions comprises a syntactically correct randomized form of the BNF representation.

10. The method of claim 9, wherein the syntactically correct randomized form of the BNF representation is tailored to implement, at least in part, the LFSR functionality of the at least one of the plurality of hardware solutions.

11. The method of claim 1, wherein the evolutionary criteria is applied via one or more grammatical evolution operations.

12. The method of claim 11, wherein the one or more grammatical evolution operations are implemented, at least in part, via a grammatical evolution tool.

13. The method of claim 12, wherein the grammatical evolution tool comprises PonyGE2.

14. The method of claim 1, wherein the evolutionary criteria comprises: a number of generations; a size of a population; a percent chance of crossover; a percent chance of mutation or a fitness function; or any combination thereof.

15. The method of claim 1, wherein the electronically restricting the search space comprises:
    defining the evolutionary criteria to encourage expected patterns of electronic behavior inherent to the plurality of hardware solutions; and
    pruning the search space to obtain a syntactically correct form of the BNF representation capable of implementing, at least in part, the expected patterns of electronic behavior based, at least in part, on the defined evolutionary criteria.

16. The method of claim 15, wherein the evolutionary criteria is defined to facilitate a predetermined variation of starting states across the plurality of hardware solutions.

17. The method of claim 1, wherein the one or more context-sensitive constraints are imposed to facilitate a context-aware application of the search space during: one or more grammatical evolution operations or the one or more randomization operations; or any combination thereof.

18. The method of claim 1, wherein the grammar-based genetic representation comprises Verilog grammar rules organized in a particular hierarchy.

19. The method of claim 18, wherein the particular hierarchy comprises a derivation tree.

20. An apparatus comprising:
    one or more processors coupled to a memory, the one or more processors to:
        electronically restrict a search space to be defined by a Backus-Naur form (BNF) representation of a computer programming language to impose one or more context-sensitive constraints on the search space by pruning an extended BNF grammar while preserving at least a linear feedback shift register (LFSR) functionality;

electronically generate a grammar-based genetic representation of at least one of a plurality of hardware solutions based, at least in part, on an application of evolutionary criteria to the restricted search space; and electronically perform one or more randomization operations to transform the at least one of the plurality of hardware solutions into a design pattern that includes one or more obfuscated portions based, at least in part, on the grammar-based genetic representation.

21. The apparatus of claim 20, wherein the one or more obfuscated portions is to at least partially obscure the LFSR functionality of the at least one of the plurality of hardware solutions, and wherein the design pattern to comprise a verifiable design pattern capable to operate correctly with the one or more obfuscated portions to implement the LFSR functionality of the at least one of the plurality of hardware solutions.

22. The apparatus of claim 20, wherein the one or more processors to the electronically restrict the search space further to:

obtain a syntactically correct form of the BNF representation; and prune the syntactically correct form of the BNF representation for semantic consistency for: one or more syntactic structures; one or more variable names or one or more constants; or any combination thereof.

23. A non-transitory storage medium having instructions executable by a processor to:

electronically restrict a search space to be defined by a Backus-Naur form (BNF) representation of a computer programming language to impose one or more context-sensitive constraints on the search space by pruning an extended BNF grammar while preserving at least a linear feedback shift register (LFSR) functionality;

electronically generate a grammar-based genetic representation of at least one of a plurality of hardware solutions based, at least in part, on an application of evolutionary criteria to the restricted search space; and electronically perform one or more randomization operations to transform the at least one of the plurality of hardware solutions into a design pattern that includes one or more obfuscated portions based, at least in part, on the grammar-based genetic representation.

24. The non-transitory storage medium of claim 23, wherein the one or more obfuscated portions is to at least partially obscure the LFSR functionality of the at least one of the plurality of hardware solutions, and wherein the design pattern to comprise a verifiable design pattern capable to operate correctly with the one or more obfuscated portions to implement the LFSR functionality of the at least one of the plurality of hardware solutions.

* * * * *